United States Patent
Stiba et al.

(10) Patent No.: US 9,868,456 B2
(45) Date of Patent: Jan. 16, 2018

(54) STROLLER WITH SECONDARY SEATING

(71) Applicant: Austlen Baby Co., Berwyn, PA (US)

(72) Inventors: Leslie Stiba, Pflugerville, TX (US); Patrick William Laffan, Berwyn, PA (US); Zheng Rong, Valparaiso, IN (US); Christopher Wiencek, Fleetwood, PA (US); Mark Petro-Roy, Lansdale, PA (US); Cameron Dye, Philadelphia, PA (US)

(73) Assignee: Austlen Baby Co., Berwyn, PA (US)

( * ) Notice: Subject to any disclaimer, the term of this patent is extended or adjusted under 35 U.S.C. 154(b) by 0 days.

(21) Appl. No.: 14/618,775

(22) Filed: Feb. 10, 2015

(65) Prior Publication Data

US 2015/0217792 A1 Aug. 6, 2015

Related U.S. Application Data

(63) Continuation-in-part of application No. 14/069,169, filed on Oct. 31, 2013.

(Continued)

(51) Int. Cl.
*B62B 7/06* (2006.01)
*B62B 7/00* (2006.01)
(Continued)

(52) U.S. Cl.
CPC .............. *B62B 7/008* (2013.01); *B62B 7/062* (2013.01); *B62B 7/10* (2013.01); *B62B 9/20* (2013.01);
(Continued)

(58) Field of Classification Search
CPC ........... B62B 7/064; B62B 7/10; B62B 7/105; B62B 7/062; B62B 7/08; B62B 7/008
See application file for complete search history.

(56) References Cited

U.S. PATENT DOCUMENTS 4,878,680 A 11/1989 Molnar
4,896,894 A 1/1990 Singletary
(Continued)

FOREIGN PATENT DOCUMENTS

DE 1 605 870 1/1971
FR 2832374 A1 5/2003
(Continued)

OTHER PUBLICATIONS

International Search Report and Written Opinion dated Aug. 22, 2016, directed to International Application No. PCT/US2016/016988; 19 pages.

(Continued)

*Primary Examiner* — Emma K Frick
(74) *Attorney, Agent, or Firm* — DLA Piper LLP (US)

(57) ABSTRACT

A stroller system including an expandable base and two frame members is discussed. The stroller system is configured for dual occupancy and provides an expandable cargo area to a user. The first and second seats coupled to their respective frame members may be modular in nature. The second seat may also include a bench seat with optional secondary support structures. The two frame members are configured to fold independently of one another. The mechanical apparatus of the dual occupancy stroller including locking and actuator mechanisms are discussed. Additionally, the mechanism by which the front frame member folds is discussed.

The disclosed stroller is capable of simultaneously carrying multiple children with a cargo area that can be extended or retracted and can carry a heavy load. The stroller is able to easily fold to a stowed state.

32 Claims, 76 Drawing Sheets

Related U.S. Application Data

(60) Provisional application No. 61/720,605, filed on Oct. 31, 2012.

(51) Int. Cl.
| | |
|---|---|
| *B62B 7/10* | (2006.01) |
| *B62B 9/20* | (2006.01) |
| *B62B 9/26* | (2006.01) |
| *B62B 9/28* | (2006.01) |
| B62B 5/08 | (2006.01) |
| B62B 5/06 | (2006.01) |

(52) U.S. Cl.
CPC .............. *B62B 9/26* (2013.01); *B62B 9/28* (2013.01); *B62B 5/065* (2013.01); *B62B 5/087* (2013.01); *B62B 2206/02* (2013.01)

(56) References Cited

U.S. PATENT DOCUMENTS

| | | | |
|---|---|---|---|
| 5,197,753 A * | 3/1993 | Liu | B62B 7/08 |
| | | | 280/642 |
| 5,360,221 A | 11/1994 | Chai | |
| 5,478,096 A | 12/1995 | Ting | |
| 5,544,904 A | 8/1996 | Maher | |
| 5,709,400 A * | 1/1998 | Bonnier | B62B 7/08 |
| | | | 280/47.38 |
| 5,725,238 A * | 3/1998 | Huang | B62B 7/08 |
| | | | 280/302 |
| 6,170,854 B1 | 1/2001 | Maher et al. | |
| 6,378,891 B1 | 4/2002 | Maher | |
| 6,523,840 B1 | 2/2003 | Koppes et al. | |
| 6,669,212 B2 | 12/2003 | Porter | |
| 6,676,140 B1 | 1/2004 | Gondobintoro | |
| 6,715,783 B1 * | 4/2004 | Hanson | B62B 7/10 |
| | | | 280/47.38 |
| 7,188,858 B2 | 3/2007 | Hartenstine et al. | |
| 7,311,323 B1 | 12/2007 | Lan | |
| 7,527,283 B2 * | 5/2009 | Horacek | B62B 7/068 |
| | | | 280/29 |
| 7,562,895 B2 * | 7/2009 | Santamaria | B62B 7/068 |
| | | | 280/47.38 |
| 8,070,180 B2 | 12/2011 | Stiba | |
| 8,104,788 B2 * | 1/2012 | Cone, II | B62B 7/08 |
| | | | 280/642 |
| 8,186,706 B2 * | 5/2012 | Dotsey | B62B 7/10 |
| | | | 280/47.38 |
| D671,040 S * | 11/2012 | Lin | D12/129 |
| 8,342,562 B2 * | 1/2013 | Chaudeurge | B60B 33/0039 |
| | | | 280/642 |
| 8,366,141 B2 | 2/2013 | Crisp | |
| 8,696,016 B2 * | 4/2014 | Homan | B62B 7/105 |
| | | | 280/47.34 |
| 8,998,241 B1 * | 4/2015 | Cheng | B62B 7/062 |
| | | | 280/47.38 |
| 9,174,661 B2 * | 11/2015 | Li | B62B 7/08 |
| 9,327,750 B2 * | 5/2016 | Yi | B62B 3/022 |
| 9,393,983 B2 * | 7/2016 | Bost | B62B 7/004 |
| 9,403,549 B2 * | 8/2016 | Driessen | B62B 7/10 |
| 2003/0193172 A1 * | 10/2003 | Lin | B62B 7/10 |
| | | | 280/642 |
| 2006/0103085 A1 | 5/2006 | Sanchez | |
| 2007/0069504 A1 | 3/2007 | Lan | |
| 2007/0164538 A1 * | 7/2007 | Yeh | B62B 7/062 |
| | | | 280/642 |
| 2008/0054601 A1 * | 3/2008 | Li | B62B 7/08 |
| | | | 280/642 |
| 2008/0106070 A1 * | 5/2008 | Lan | B62B 7/10 |
| | | | 280/647 |
| 2009/0315300 A1 | 12/2009 | Stiba | |
| 2010/0001492 A1 * | 1/2010 | Driessen | B62B 7/145 |
| | | | 280/642 |
| 2010/0123298 A1 * | 5/2010 | Huang | B62B 7/083 |
| | | | 280/647 |
| 2010/0127480 A1 * | 5/2010 | Ahnert | B62B 7/08 |
| | | | 280/647 |
| 2011/0062681 A1 * | 3/2011 | Tsai | B62B 7/064 |
| | | | 280/642 |
| 2012/0319382 A1 * | 12/2012 | Lin | B62B 7/10 |
| | | | 280/647 |
| 2013/0087993 A1 | 4/2013 | Jacquet et al. | |
| 2013/0234419 A1 | 9/2013 | Yang et al. | |
| 2014/0028003 A1 | 1/2014 | Saville et al. | |
| 2014/0346756 A1 | 11/2014 | Laffan et al. | |

FOREIGN PATENT DOCUMENTS

| | | |
|---|---|---|
| GB | 2262914 | 11/1991 |
| WO | 2013/149641 | 10/2013 |
| WO | 2014/042524 | 3/2014 |
| WO | 2015/003227 | 1/2015 |

OTHER PUBLICATIONS

Office Action dated Aug. 7, 2015 from corresponding U.S. Appl. No. 14/069,169.

Invitation to Pay Additional Fees dated Apr. 26, 2016, from corresponding PCT Application No. PCT/US16/16988.

Extended European Search Report from corresponding European Application No. EP 4856845A, dated May 9, 2017.

\* cited by examiner

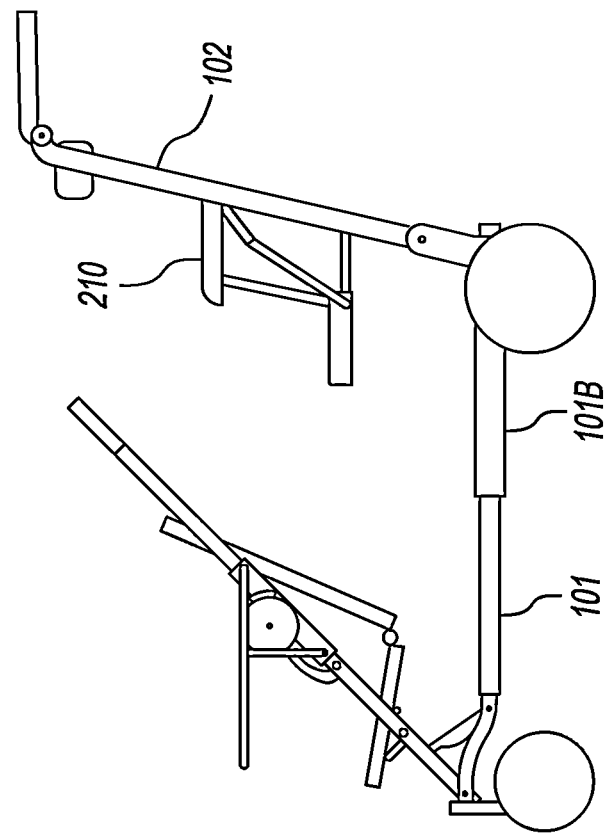
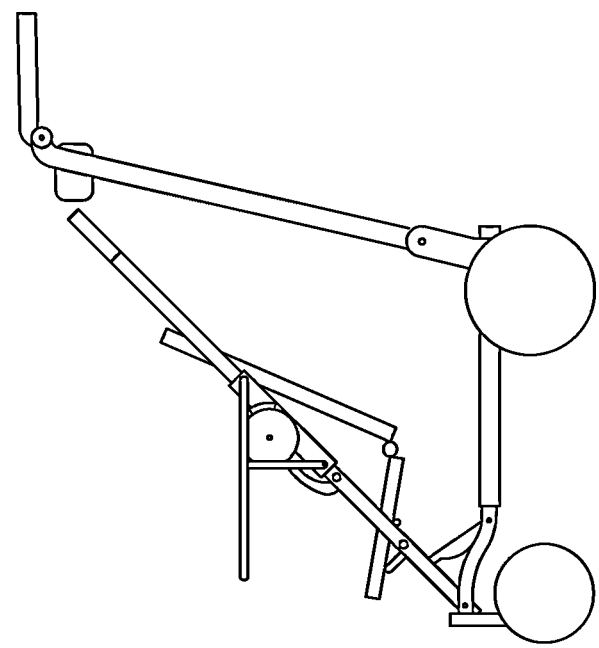
FIG. 13

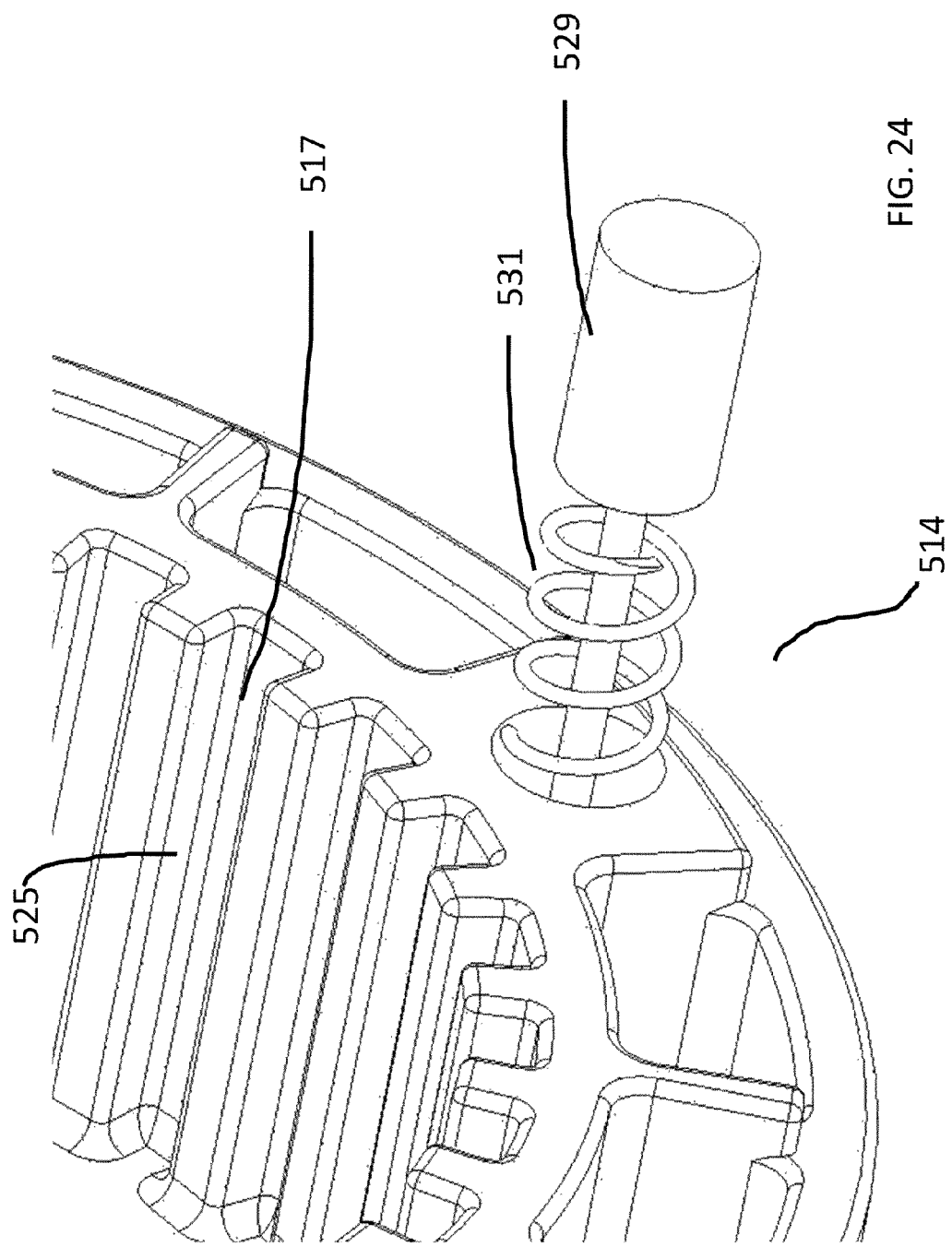

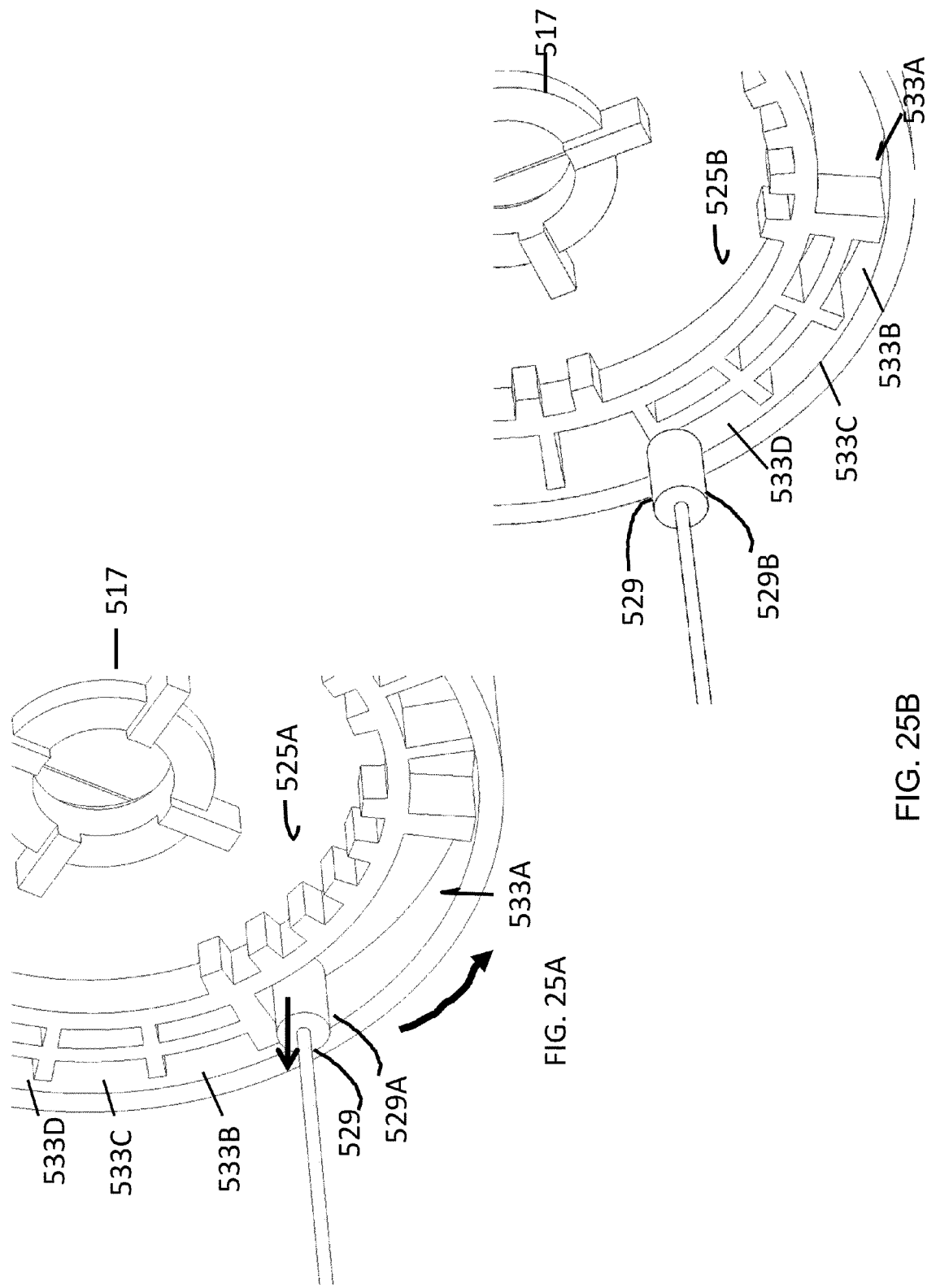

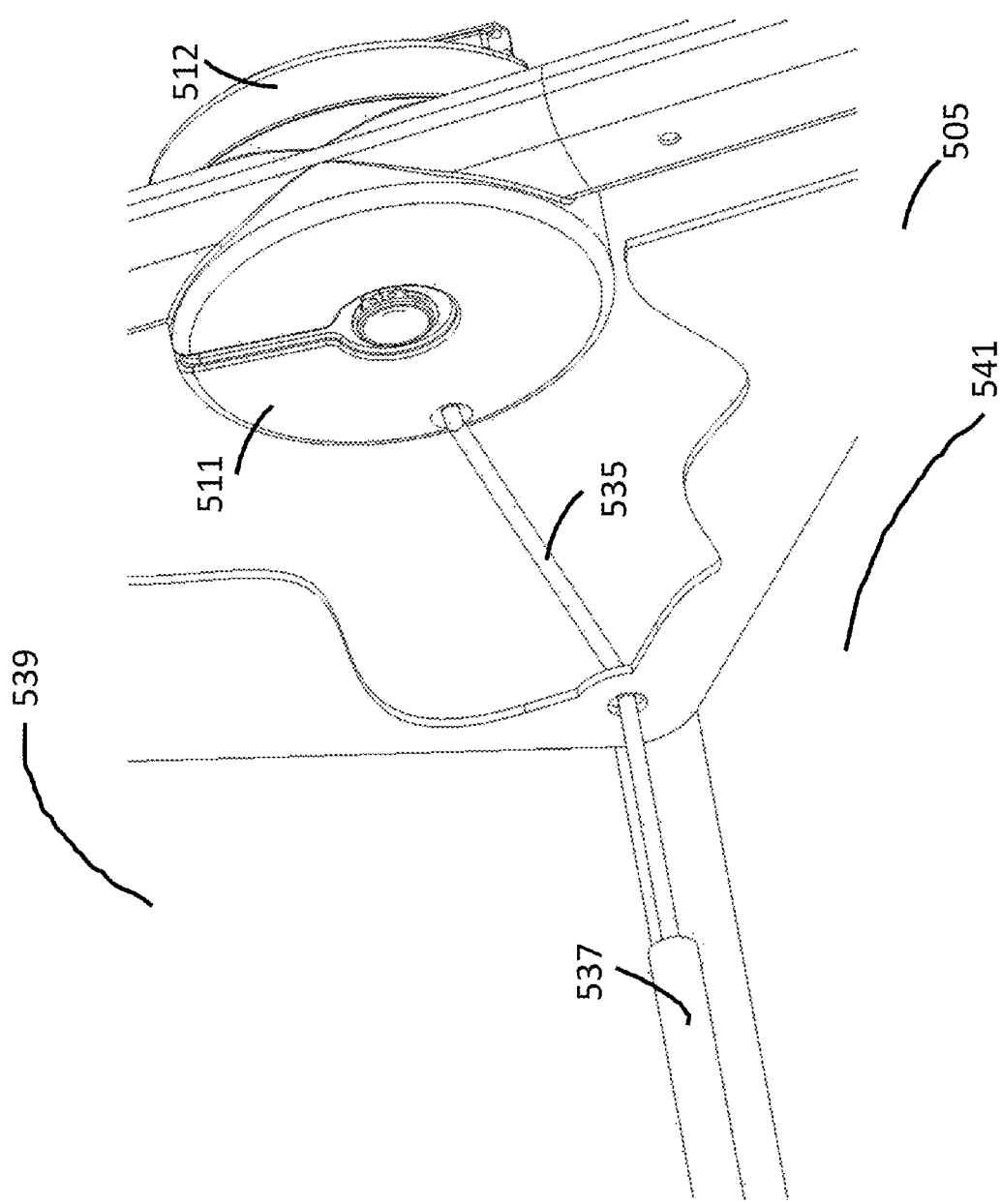

7b. Seat deployed

7a. Seat stowed

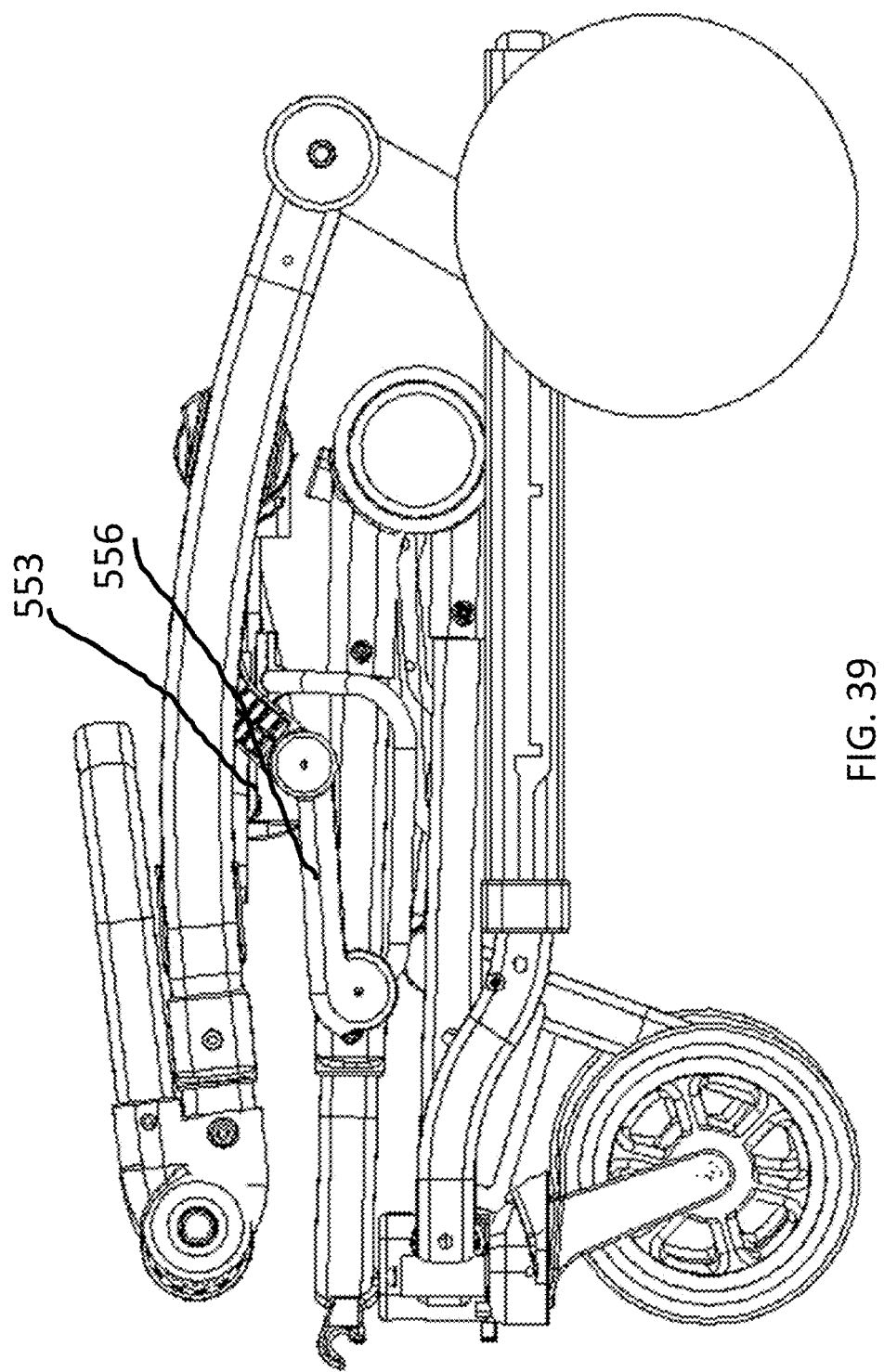

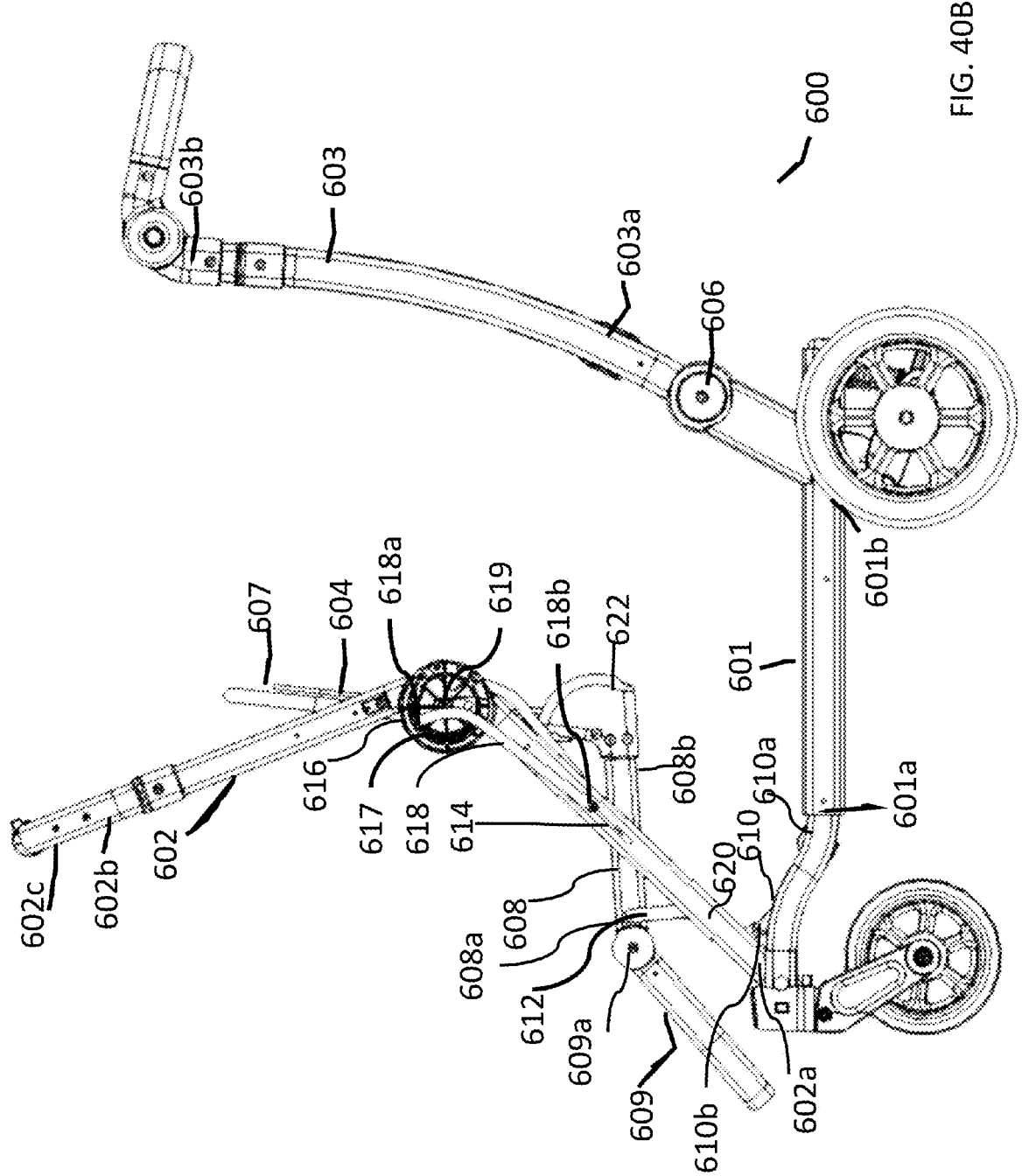

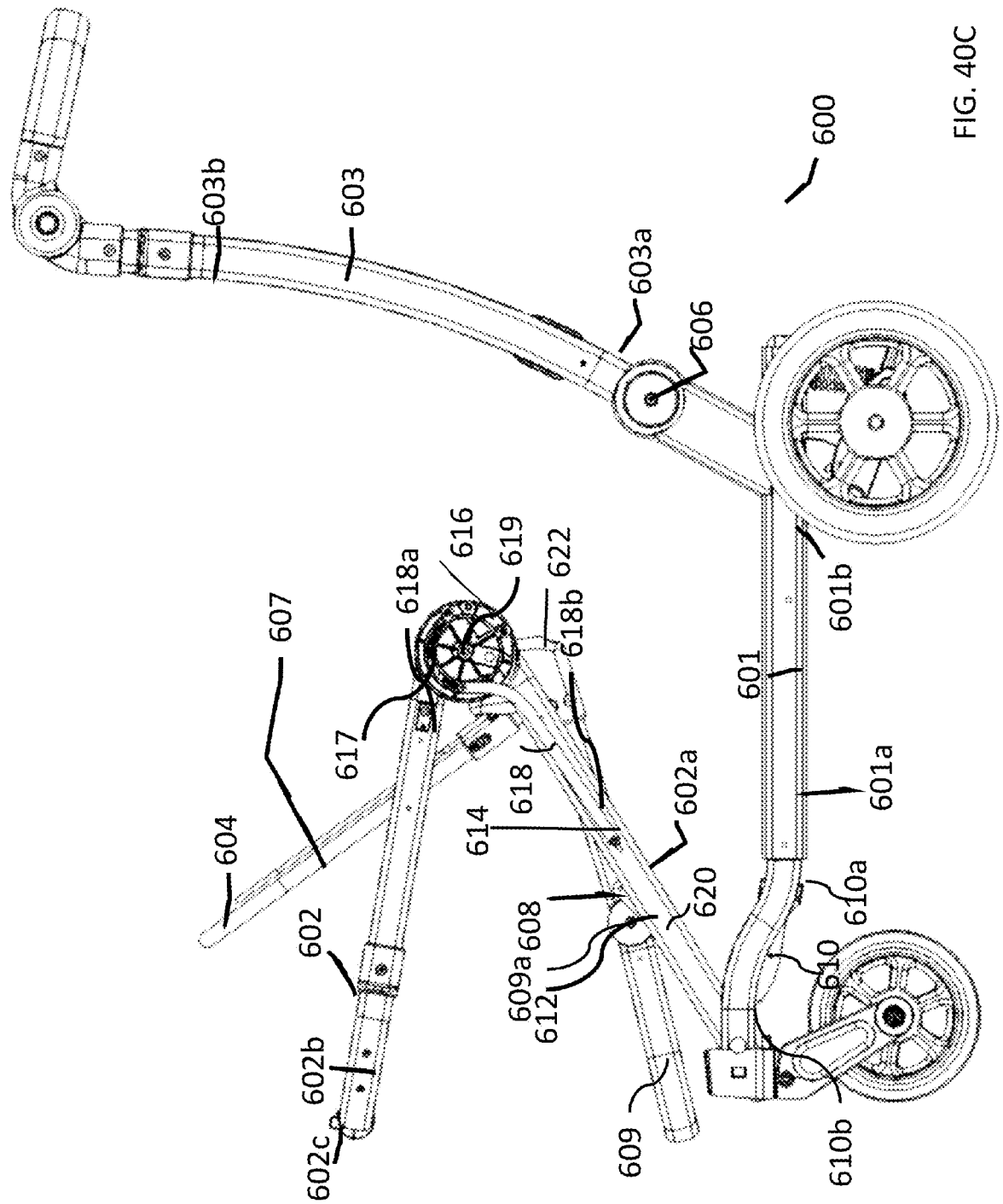

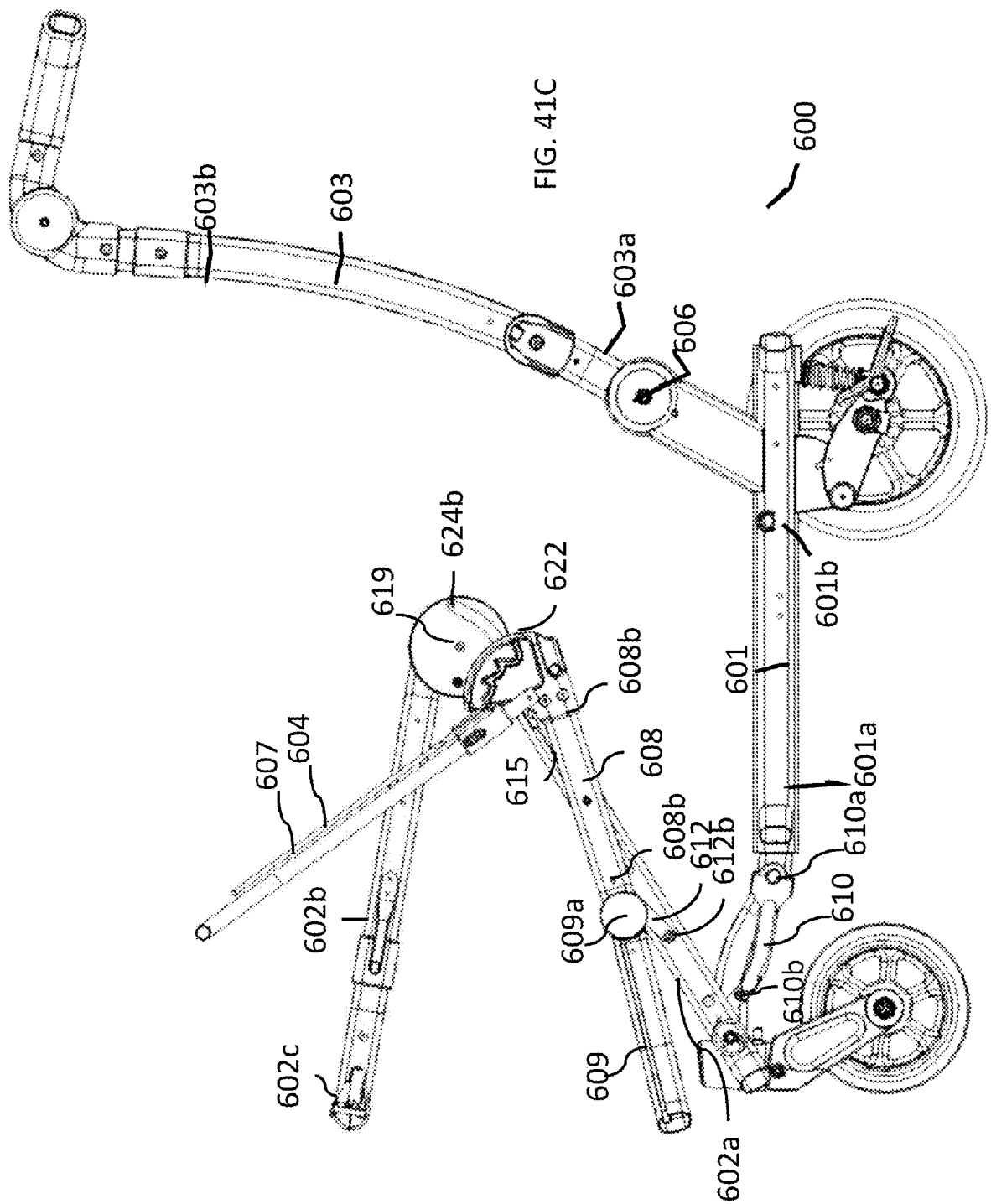

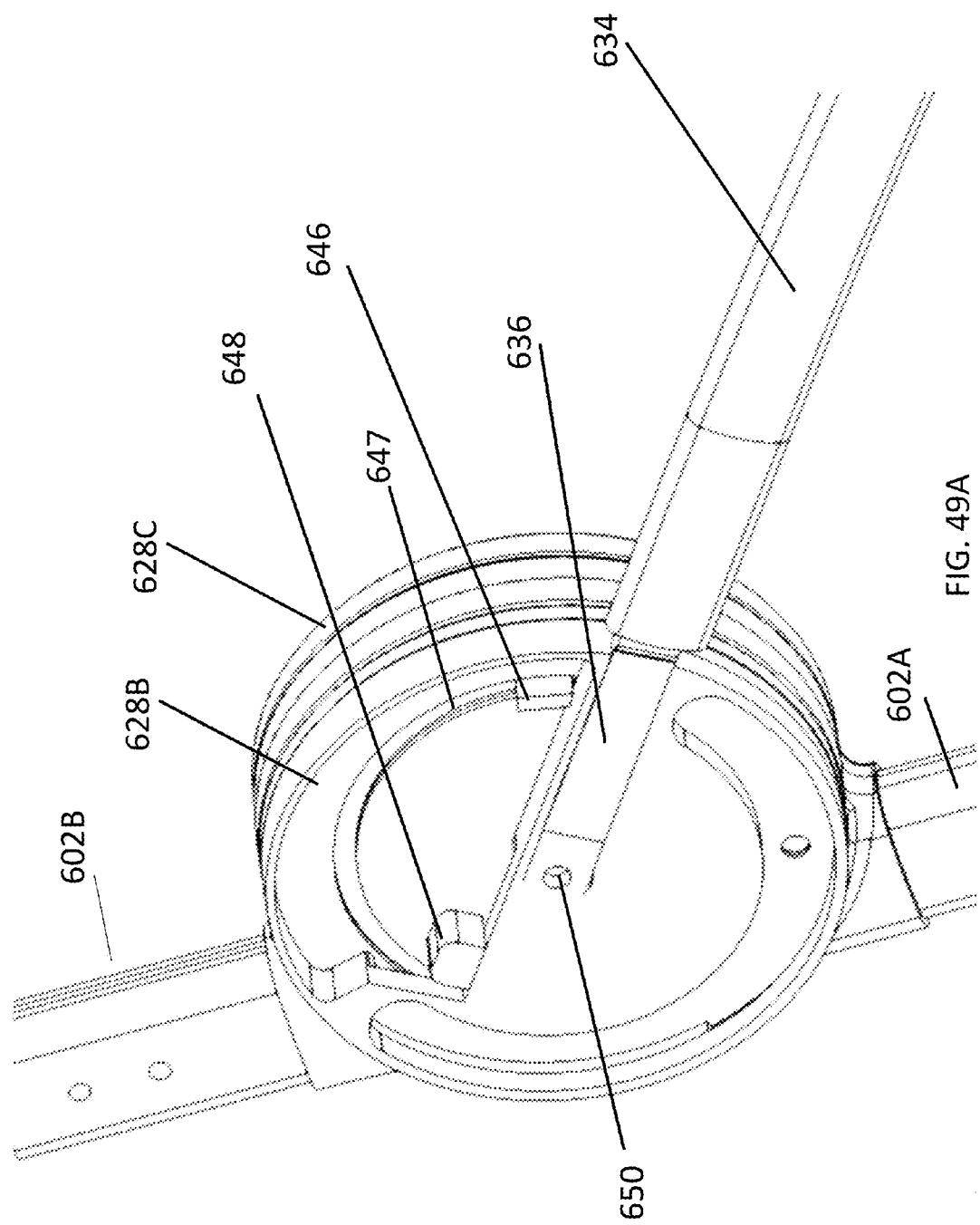

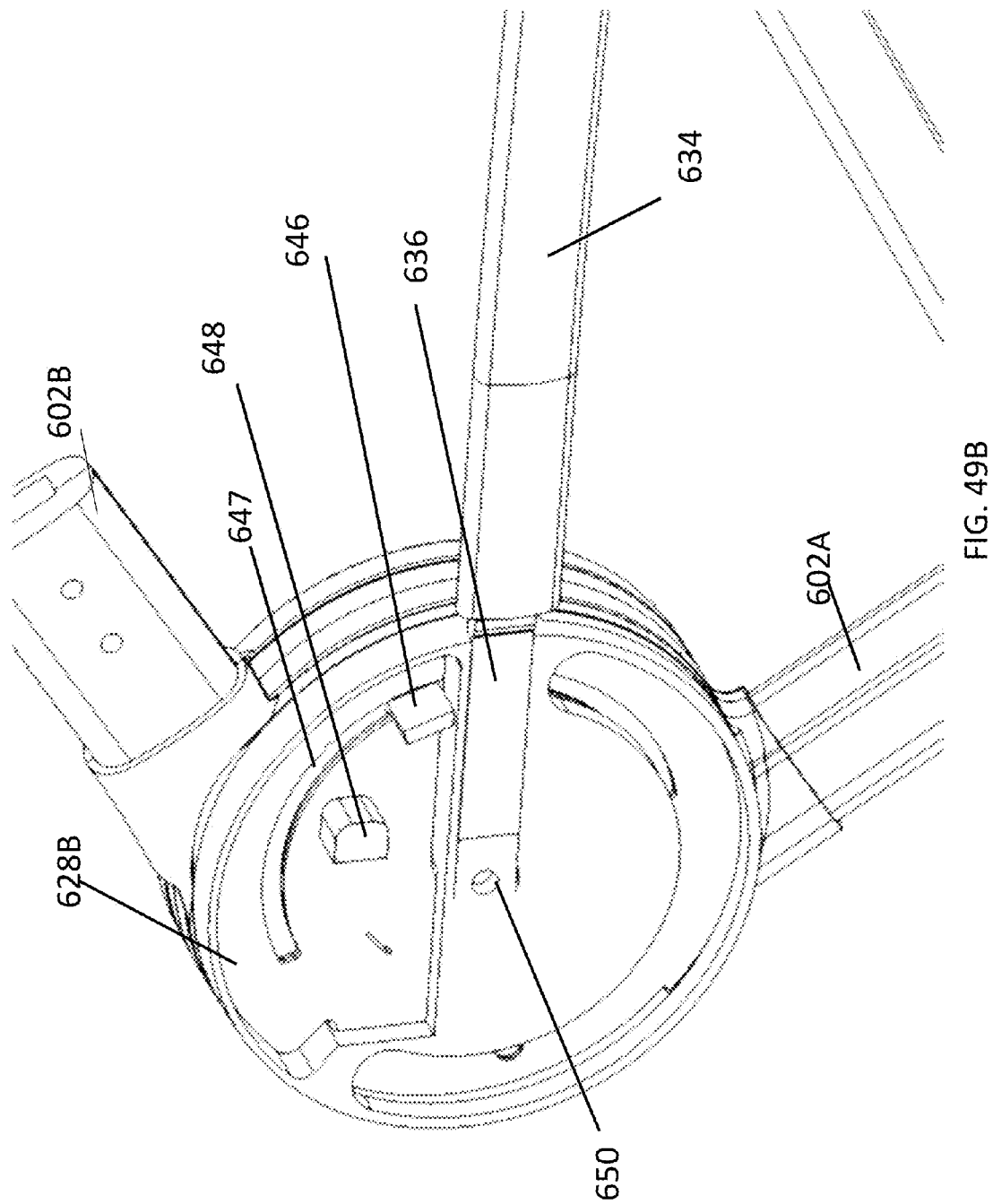

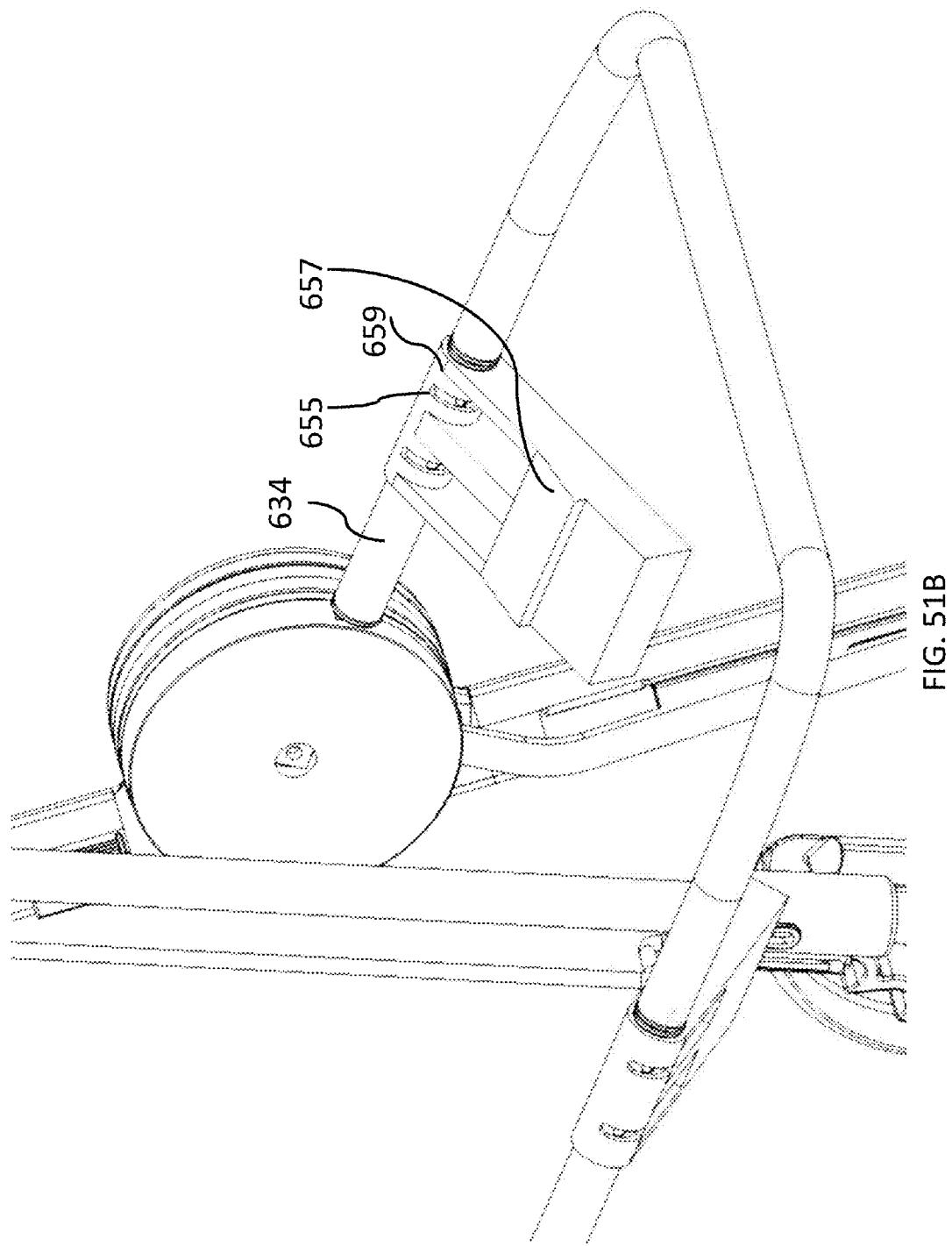

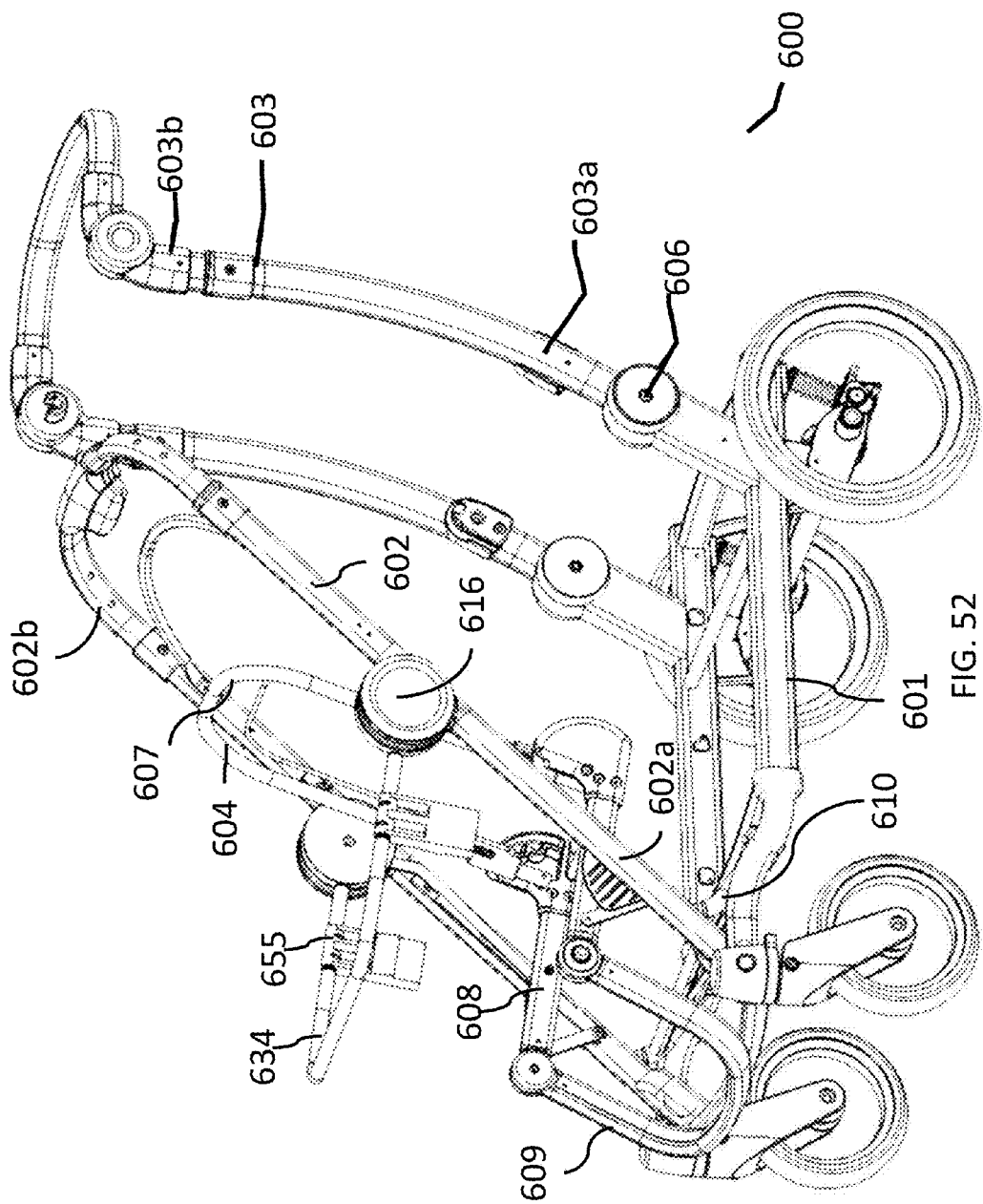

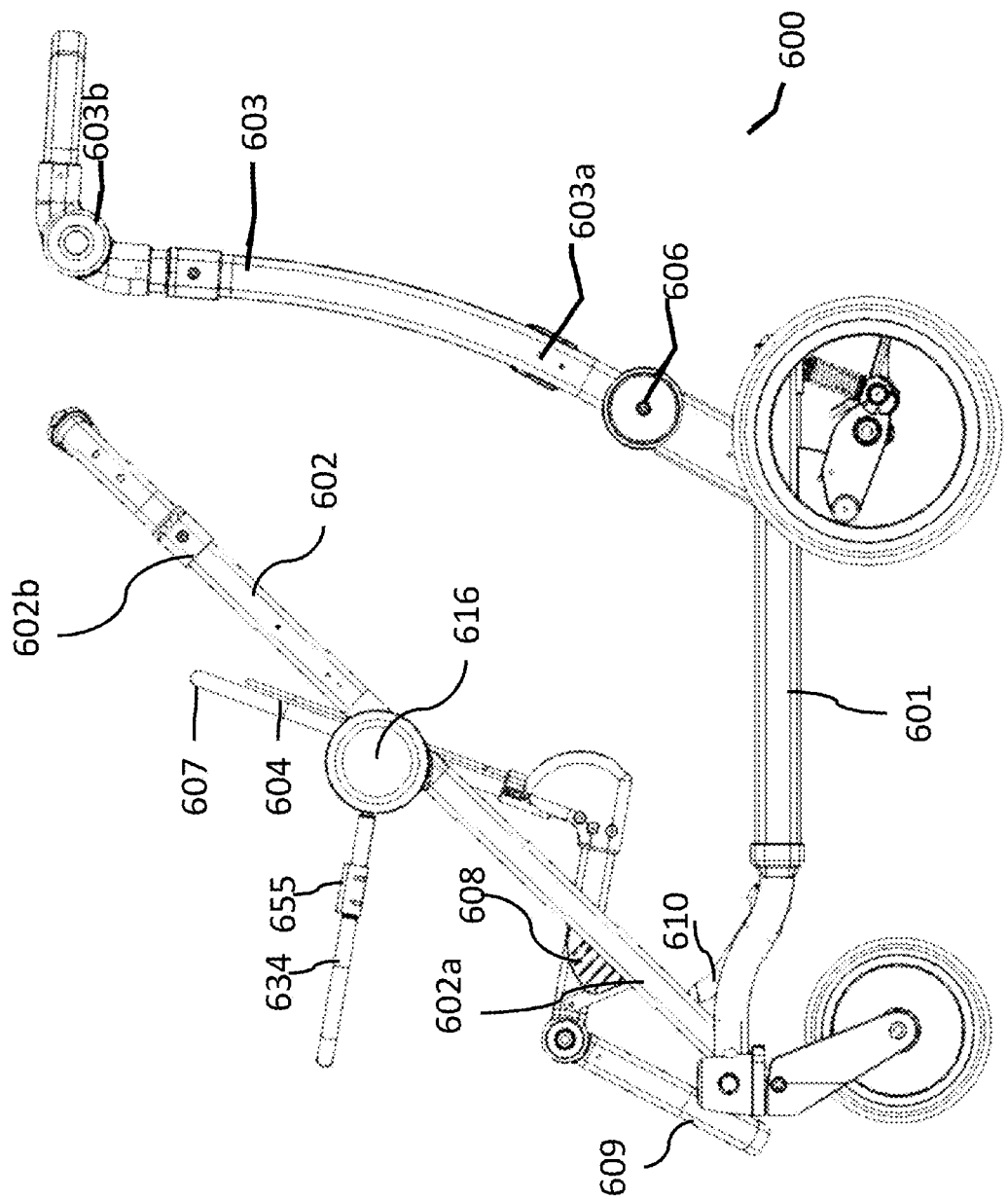

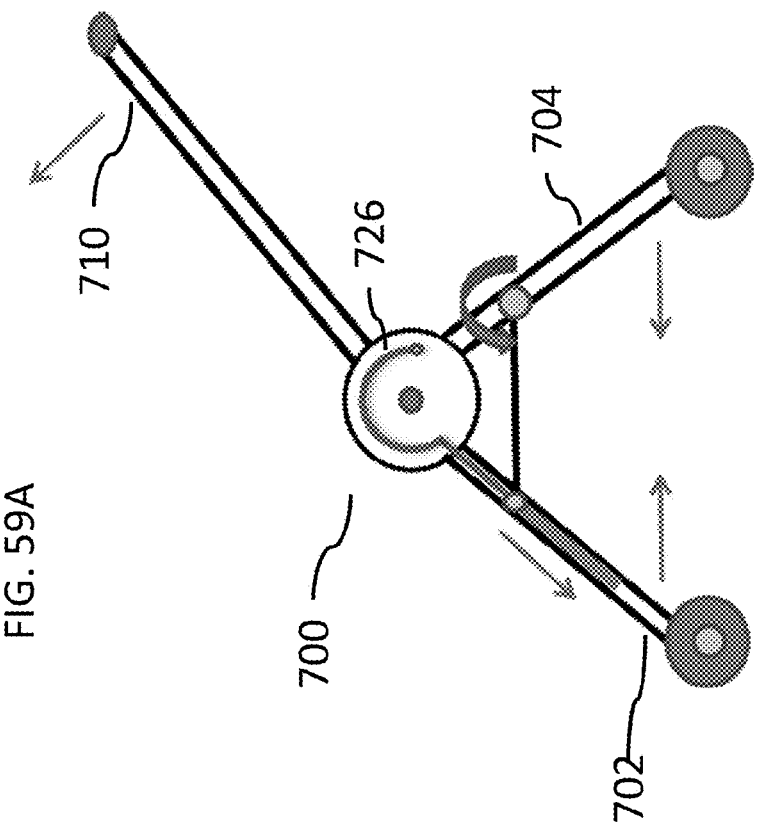
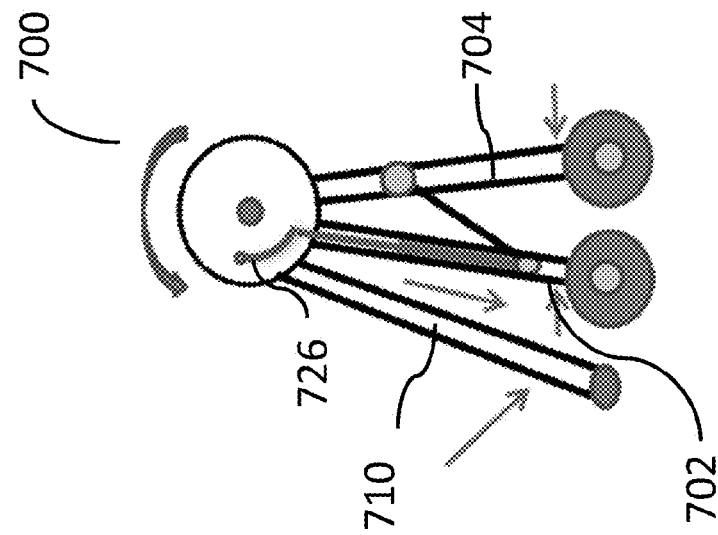
FIG. 59A
FIG. 59B

STROLLER WITH SECONDARY SEATING

CROSS-REFERENCE TO RELATED APPLICATIONS

This application is a continuation-in-part of U.S. patent application Ser. No. 14/069,169, entitled Stroller with Expandable Cargo Area, filed on Oct. 31, 2013, which claims the benefit and priority of U.S. Provisional Patent Application Ser. No. 61/720,605, entitled Stroller with Expandable Cargo Area, filed Oct. 31, 2012, the disclosures of which are all incorporated herein by reference.

TECHNICAL FIELD

The disclosure relates to strollers, and more particularly, strollers with expanded occupancy and storage capacity.

BACKGROUND

Strollers have been known and used for a number of years to provide a comfortable device to move a baby or small child. The trend with strollers has been to reduce the size of the stroller, thus allowing it to be stored more easily. However, with the reduction of size has come the reduction of space that the strollers provide for carrying additional cargo, or multiple children. There remains the need for a stroller that can accommodate a large volume of goods and/or a secondary child, while still folding to a compact state.

U.S. Pat. No. 4,878,680 describes a convertible car seat and stroller combination apparatus comprising a padded child's seat having a telescopic U-shaped handle extending upward from behind the back of the seat, and a perimeter frame having four wheels extendible downward. The apparatus is distinguishable from the present disclosure at least in being limited to one occupant and requiring a perimeter frame for the wheels, as well as lacking an extendable cargo area.

U.S. Pat. No. 4,896,894 describes a stroller car seat apparatus comprising a conventional infant seat having a safety harness, a U-shaped padded front guard bar, a U-shaped telescoping handle in the rear, a pivoting front footrest, and a folding rectangular scissors framework with four wheels. The apparatus is distinguishable from the present disclosure at least in being limited to one child, requiring an obtrusive lower framework, and lacking an extendable cargo area.

U.S. Pat. No. 5,360,221 describes a baby carriage convertible to a safety car seat with a harness comprising a body assembly including a seat, a back, a footrest, and side plates. A wheel assembly is pivotally mounted on the body assembly and adapted to be folded back. A handle assembly is pivotally mounted on the body assembly and adapted to be rotated into a horizontal position. A locking assembly locks and releases the wheel assembly. When the carriage is converted into a safety seat, the wheel assembly is released and folded back, and the handle assembly is rotated into a horizontal position to be used as an arm rest plate. The apparatus is distinguishable from the present disclosure at least in being limited to one child, requiring the rotation of the handle assembly to serve as an arm rest, and lacking an extendable cargo area.

U.S. Pat. No. 5,478,096 Chien Ting describes a collapsible multi-use baby carriage having a structure transformable into a dining chair, a safety seat in a car, a cradle, and a bed comprising a seat, a backrest pivotally connected with the seat to change the angle of the backrest, a U-shaped hand rest pivotally connected with the backrest. The structure has a pushing handle, two opposite telescopic side tubes with a windable support plate between the side tubes, and a winding tubular shaft housed in a front tube of the hand rest for pulling out for supporting food. Two front and rear casters are pivotally connected with the bottom of the seat and foldable to the seat bottom. The carriage is distinguishable from the present disclosure at least in being limited to one child, requiring a windable support plate and two opposite side tubes, and lacking an extendable cargo area.

U.S. Pat. Nos. 6,523,840, 6,669,212 B2 and 6,523,840 B1 (related patents) describe a combined shopping cart stroller, with a frame that includes a primarily horizontal lower frame portion having a forward end and a rearward end; a curved upper frame portion; vertical support extending between the lower frame portion and upper frame portion; a seat mounted to the frame; and a primary cargo area, which is defined as the space generally bounded by the lower frame portion and the upper frame portion rearward of the seating area. The shopping cart stroller is distinguished from the present disclosure at least in the front frame not extending to a point above the rearward frame when the cargo space is engaged, the manner in which the primary cargo space extends, as well as the fact that the primary cargo space is unable to support the weight of an additional child.

U.S. Pat. No. 7,188,858 B2 describes a collapsible stroller, with a frame having left and right sides, each side comprising: an elongated bottom member; a front leg; a push arm; and a support strut, wherein the front leg, the push arm, and the support strut pivot relative to each other when the stroller moves between the open position and the folded position. The stroller is distinguishable from the current disclosure at least in being limited to one child, and not having an extendable rear cargo space.

U.K. Patent Application No. GB 2 262 914 A published on Jul. 7, 1993, describes a molded child seat for a vehicle and convertible into a pushchair comprising a supporting frame having two triangular lateral sub-frames interconnected by cross rails. Each sub-frame is equipped with a pair of mounting pins adapted to engage with appropriately shaped and positioned slots on the wheeled pushchair frame. The apparatus is distinguishable from the present disclosure at least in being limited to one child, requiring a separate supporting frame, and lacking an extendable cargo area.

U.S. Pat. No. 5,544,904 discloses a convertible stroller and shopping cart having a stroller portion and a shopping cart portion. The stroller portion includes a seat secured to a metal frame, and the shopping cart portion comprises a collapsible receptacle. The receptacle can be oriented in two orientations, a stowed orientation adjacent the seat and a deployed orientation over the seat. When the receptacle is deployed, it conforms to the seat, creating a shopping cart from the stroller. The convertible stroller is distinguishable from the present disclosure at least in lacking the capacity to carry a second child, and in the fact that the extendable cargo area extends to occupy the same volume as the child seat when extended.

U.S. Pat. No. 6,669,212 discloses a cart having a frame member including upright and lateral frame portions. A platform is attached to the lateral frame portion and a stationary seat assembly is secured to the upright frame portion. The stationary seat assembly includes a rearward facing stationary seat, a handle and a safety bar between the seat and the handle. A pivoting mechanism is mounted to the lateral frame portion remote from the upright frame portion. The pivoting mechanism is moveable between a substantially upright position and a retracted position and is located relative to a back portion of the seat. A flexible receptacle is attached to the pivoting mechanism, and moves between an open and collapsed position when the pivoting mechanism is moved between the substantially upright and the retracted position, respectively. The stationary seat and the platform are accessible when the pivoting mechanism is in the substantially upright position or the retracted position. The cart is distinguishable from the present disclosure at least in that the present disclosure is fully collapsible, can accommodate a second child, and in having an extendable cargo area which includes an extendable base component.

U.S. Pat. Nos. 6,378,891 and 6,170,854 disclose a convertible stroller and shopping vehicle having a stroller portion and a shopping vehicle portion. The stroller portion includes a seat which is movable from a deployed position to a stowed position. In the deployed position, the disclosure is used as a stroller. The shopping vehicle portion includes a collapsible receptacle that can be oriented in one of two orientations. In an open orientation, the receptacle creates a shopping cart while in a collapsed orientation the disclosure can be used to transport bulk materials. The convertible stroller is distinguishable from the present disclosure at least by lacking the capacity to carry a second child, and in the fact that the extendable cargo area extends to occupy the same volume as the child seat when extended.

U.S. Pat. No. 8,070,180 (which has the same inventor as the present disclosure) discloses a stroller for carrying a user, and having an expandable storage space located between the child seat and the rearmost frame members. This may include a first and second front frame member for supporting a seat or seats and back support member, a first and second back frame member being connected to the first and second front frame member, an expandable base member, which connects between the first and second front frame member and the first and second back frame member. The expandable frame member may move between an extended and a retracted position to provide a storage area. This disclosure includes a stroller with an expandable storage space, however, the volume of the storage space is not adjustable, the invention does not provide mechanisms for actuating the deployment of the extendable cargo area, the invention does not provide a rear handle lock to take the load of additional cargo, the invention does not provide a solution for folding the front seat compactly and independently of the rear frame, the invention does not provide methods for compactly folding the upper expandable basket, and the invention does not provide for additional seating configurations within the expandable storage space.

U.S. Pat. No. 6,676,140 B1 discloses a two-seat collapsible stroller comprising a telescopically collapsing rear section that roughly slides into the front section such that the seat nests onto the front seat in the collapsed position. This stroller differs from the present disclosure at least in that the second seat is a mandatory part of the stroller, and no extendable cargo area exists.

U.S. Pat. No. 8,366,141 discloses a stroller with a collapsible seat for a second child, comprising a complex coupling mechanism that enables the collapse and expansion mechanism. It is distinguishable from the present disclosure at least in that the stroller's collapse mechanism for the second seat is substantially more complex than in the present disclosure, and in that it does not provide for the option of an extendable cargo area.

In general, the prior art contains a series of weaknesses which the present disclosure addresses. First, most prior art lacks the capacity to form an extendable cargo area while simultaneously carrying even a single child: the cargo area extends into the area where the child would sit. Second, those few inventions designed to include a second child both lack the flexibility to also include extendable storage, and include complex or inflexible deployment mechanisms which prevent the strollers from being deployed easily and/or folded into compact form. The present disclosure, as will be shown, is capable of simultaneously carrying a child and having the cargo area extended/deployed in a way that can handle heavy loads, is easily expanded via actuation mechanisms, is of such a nature that it can also function as additional seating space for additional children. Finally, the present stroller is designed to be easily folded into a compact state for travel or storage.

The stroller of the present disclosure address the need for a multiple occupancy baby stroller with adequate storage space which retains the ability to be stowed quickly and compactly.

SUMMARY

Disclosed herein is an embodiment of a stroller comprising an expandable base member with a first peripheral end and a second peripheral end. A first frame member may be pivotally connected to the expandable base member near the first peripheral end. The first frame member may be configured to contain means for retaining a first seat. A second frame member comprising at least one frame mount hub may also be pivotally connected to the expandable base member near the second peripheral end. The first frame member and the second frame member may be configured to fold independently of each other. A second seat comprising at least one seat mount hub may be removably connected to the second frame member by way of the at least one frame mount hub coupling with the at least one seat mount hub.

An alternative embodiment of a stroller comprises an expandable base member with a first peripheral end and a second peripheral end. A first frame member may be pivotally connected to the expandable base member proximate the first peripheral end and be configured to contain means for retaining a first seat. A second frame member comprising at least one frame mount hub may be pivotally connected to the expandable base member proximate the second peripheral end. The first frame member and the second frame member may fold independently of one another. A second bench seat comprising a bench seat, at least one seat mount pivot and at least one seat mount hub may be removably connected to the second frame member by way of the at least one frame mount hub coupling with a corresponding at least one seat mount hub.

Another alternative embodiment of a stroller comprises an expandable base member with a first peripheral end and a second peripheral end. A first frame member may be pivotally connected to the expandable base member proximate the first peripheral end, where the first frame member is configured to contain means for retaining a first seat. A second frame member may be pivotally connected to the expandable base member proximate the second peripheral end. The first frame member and the second frame member may fold independently of one another. The stroller further comprises a platform for supporting a standing child, where the platform is supported by a cross-member of the expandable base member proximate the second peripheral end. Additionally, cargo may be stored under or above the platform.

A further alternative embodiment of a stroller comprises an expandable base member with a first peripheral end and a second peripheral end, a first frame member pivotally connected to the expandable base member proximate the first peripheral end. The first frame member may be configured to contain means for retaining a first seat and folding to a compact state. The stroller may also comprise a second frame member pivotally connected to the expandable base member proximate the second peripheral end. The first and the second frame members may fold independently of one another.

In yet another embodiment, the stroller system may comprise a first frame member capable of being folded. The first frame member may comprise first and second ends and an elongated portion extending therebetween. The first frame member may be adapted to retain a first seat comprising a first frame portion, a second frame portion and a connector. The first frame portion may comprise a first end pivotally connected to the base proximate the first end of the base, and a second end located at an opposing end of the first frame portion, a longitudinal void disposed therein and extending along at least a portion of the length of the first frame portion between the first and second ends thereof. The second frame portion may comprise a first end and a second end located at an opposing end of the second frame portion from the first end. The connector may pivotally connect the second end of the first frame portion and the first end of the second frame portion. And the flexible link may comprise a first end mounted to a portion of the connector and a second end disposed within the elongated void, and a generally elongated portion extending therebetween. The second end of the link is connected to the second end of the frame support member and at least a portion of the flexible link and the second end thereof travels longitudinally along the first frame portion. In a first position, the first frame portion and the second frame portion may form a generally elongated first frame extending from the first end of the first frame member to the second end of the second frame member. In a second position, the first frame portion and the second frame portion are folded upon each other at the connector, such that the second end of the second frame portion is disposed adjacent the first end of the base.

In a further alternative embodiment, the stroller may comprise a base, a frame support member, a first frame member, and a flexible link. In such an embodiment the base may have a first end, a second end, and an elongated portion extending therebetween. The frame support member may have a first end and a second end and a length extending therebetween, and the first end may be rotatably attached to the base at a point between the first and second ends of the base. The first frame member may comprise first and second ends and an elongated portion extending therebetween, the first frame member being adapted to retain a first seat thereon and comprising: a first frame portion, a second frame portion and a connector. The first frame portion may comprise a first end pivotally connected to the base proximate the first end of the base, and a second end located at an opposing end of the first frame portion, a longitudinal void disposed therein and extending along at least a portion of the length of the first frame portion between the first and second ends thereof. The second frame portion may comprise a first end and a second end located at an opposing end of the second frame portion from the first end. The connector may pivotally connect the second end of the first frame portion and the first end of the second frame portion. And the flexible link may comprise a first end mounted to a portion of the connector and a second end disposed within the elongated void, and a generally elongated portion extending therebetween. The second end of the link is connected to the second end of the frame support member and at least a portion of the flexible link and the second end thereof travels longitudinally along the first frame portion. In a first position, the first frame portion and the second frame portion may form a generally elongated first frame extending from the first end of the first frame member to the second end of the second frame member. In a second position, the first frame portion and the second frame portion are folded upon each other at the connector, such that the second end of the second frame portion is disposed adjacent the first end of the base.

The stroller system may also comprise an armrest, infant car seat adapter, tray or other similar element configured to be attached to the first frame member and capable of being folded with the first frame member.

BRIEF DESCRIPTION OF THE DRAWING

The invention may be understood by reference to the following description taken in conjunction with the accompanying drawings, in which, like reference numerals identify like elements, and in which:

FIG. 13 illustrates an alternative embodiment of the stroller having a rear child seat.

FIG. 24 illustrates components of a locking mechanism.

FIG. 25A illustrates components of a secondary pivot locking mechanism in a first position.

FIG. 25B illustrates components of a secondary pivot locking mechanism in a second position.

FIG. 26 illustrates an actuator for the secondary pivot locking mechanism of FIGS. 25A and 25B.

FIG. 39 illustrates the stroller system of FIG. 34 with a bench seat in a folded state.

FIG. 40B illustrates a side view of a stroller system (as depicted in FIG. 40A) with a front seat frame fold mechanism in a second, partially-folded, position.

FIG. 40C illustrates a side view of a stroller system (as depicted in FIG. 40A) with a front seat frame fold mechanism in a third, partially-folded, position.

FIG. 41C illustrates a cross-sectional view of the stroller system depicted in FIG. 40C.

FIG. 49A illustrates a perspective view of an embodiment of stroller system (as depicted in FIG. 47) with the armrest in a deployed state in connection with the folding of the front frame.

FIG. 49B illustrates a perspective view of an embodiment of the stroller system (as depicted in FIG. 47) with the armrest in a partially folded state in connection with the folding of the front frame.

FIG. 51B illustrates a side perspective view of an embodiment of the stroller with an infant car seat adapter in a second position.

FIG. 52 illustrates a side perspective view of the embodiment of the stroller with an infant car seat adapter.

FIG. 53A illustrates a side view of a stroller system with an infant car seat adapter (as depicted in FIG. 52) in a first position.

FIG. 59A illustrates a second alternative embodiment of the stroller system with an A-frame structure and flexible link in a first, "in-use", configuration.

FIG. 59B illustrates a second alternative embodiment of the stroller system (as depicted in FIG. 59A) with an A-frame structure and flexible link in a second, stowed, configuration.

DETAILED DESCRIPTION

Embodiments of the present stroller allow for the stroller to be capable of expanded occupancy and storage capacity. In general, embodiments of the present invention are directed to strollers with expandable cargo areas which may be extended or retracted and can carry a heavy load. The strollers are also capable of simultaneously carrying multiple passengers. Furthermore, the strollers are able to be easily folded to a stowed state.

The following description of the preferred embodiment or embodiments is not intended to limit the scope of the invention to the precise form or forms disclosed, but instead is intended to be illustrative of the principles of the invention so that others skilled in the art may follow its teachings.

In general, the expandable stroller of the present invention comprises two mirror-imaged structural frames connected to each other by cross members. As the cross members may be placed in any suitable position, and since the structural frame members are mirror images, the discussion of the structure of the present invention will focus on a single frame. One skilled in the art will recognize that the description will apply equally to the mirrored frame.

Figure 1:
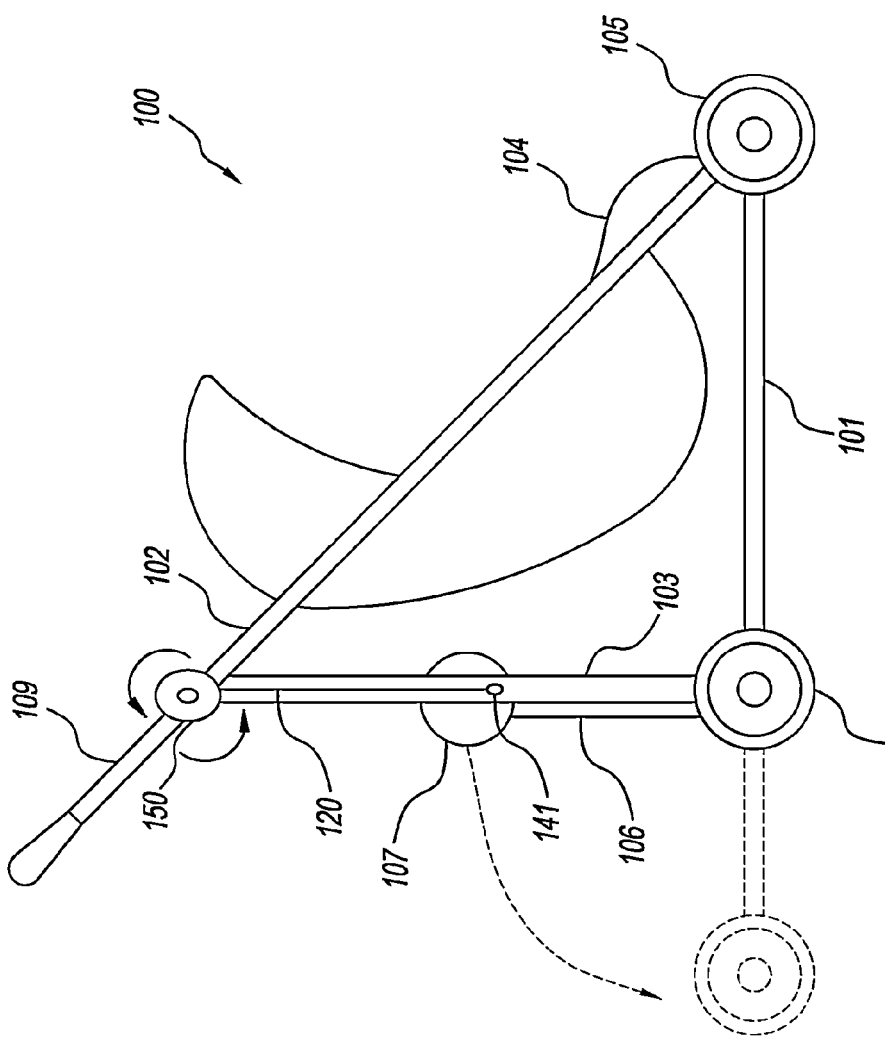
FIG. 1 illustrates a side elevational view of the preferred embodiment of the stroller in a retracted position.

FIG. 1 illustrates an embodiment of a stroller 100 shown at a side elevational view in which a foldable base member 106 is in a stowed (non-engaged) position. FIG. 1 illustrates a base main frame member 101 roughly parallel to the ground, a front frame member 102, and a rear main frame member 103 roughly perpendicular to the ground. The front frame member 102 is substantially diagonal to the base main frame member 101. The main frame section of the present invention, comprised of members 101, 102, and 103 is comprised of two mirror sides, connected by cross members. The bottom end, or a section substantially near the bottom end of the rear frame member 103 is connected to the base main frame member 101 at or substantially near the rear end of the base main frame member 101. In the present embodiment, frame members 101 and 103 are connected at or substantially at a right angle, so that the base main frame member 101 is parallel or substantially parallel to the ground, and the rear main frame member 103 is vertical or substantially vertical. In some embodiments, the angle at which frame members 101 and 103 are connected may be substantially acute or obtuse. In some embodiments, rear main frame member 103 may attach near the middle or front of the base main frame member 101. In some alternative embodiments, the rear main frame member 103 may be located generally midway along the base main frame member 101. In some alternative embodiments, the rear main frame member 103 may be located near the nexus of the base main frame member 101 and a seat member 104. In some alternative embodiments, frame member 103 may not be present.

FIG. 1 further illustrates the front frame member 102 connects to frame members 101 and 103 to complete the main frame section. FIG. 1 illustrates that the top, or a section substantially near the top, of the front frame member 102 is connected at or substantially near the top of the rear main frame member 103, and the bottom, or a section substantially near the bottom, of the front frame member 102 is connected at or substantially near the front of the base main frame member 101. In some alternative embodiments, the rear main frame member 103 may be joined to the front frame member 102 at alternative locations, such as nearer to the middle or front of the front frame member 102. One skilled in the art will recognize that the location of the connections between members 102 and 103, and 101 and 103 will largely determine the angle of 103.

In the present invention, members 101, 102, and 103 are made out of a single piece of material. In alternative embodiments, members 101, 102, and 103 may be composed of two or more separate components, so as to change the angle of the handle of the stroller, and to enable folding (see FIGS. 5*a-d*, 6, 12, and 13). The means with which frame members 101, 102, and 103 are connected can be by screws, brackets, welds, rivets or any other suitably strong means. Additionally, frame members 101, 102, and 103 may be made of metal, plastic, or any other suitably strong material. In alternative embodiments, there may be handles connected at or near the junctions of frame members 102 and 103, or at the top-rearmost end of member 102. Furthermore, the handle may serve as a cross-member, linking the mirrored frames of the invention.

FIG. 1 illustrates that the wheel members 105 are attached at or around the junctions of frame members 101 and 102, and 101 and 103. In the present embodiment, wheel members 105 can rotate freely 360 degrees along the axis (as, e.g., swivel wheels). In alternative embodiments, the wheels can have other degrees of rotational freedom. FIG. 1 illustrates seat member 104, which is attached to the front frame member 102. Seat member 104 may be made from a flexible material, for example fabric or durable plastic cloth. Alternatively, seat member 104 may be made from a harder material, for example solid plastic, metal, or any other suitable material, and may or may not be covered with a padding material for child comfort. The present invention shows seat member 104 containing a canopy, in order to protect a child from sun, rain, or any other weather. In a preferred embodiment, this canopy is retractable, allowing the child to enjoy pleasant weather. In alternative embodiments, this canopy may be fixed in a way so that it cannot be retracted, or it may be absent altogether. In alternative embodiments, seat member 104 may be replaced by at least one seat attachment device, in which alternate seat configurations such as modular seats, car seats, carry cots or alternate child restraint systems may be mounted to the seat attachment device and or frame support members.

FIG. 1 additionally illustrates a foldable base member 106, which folds and/or pivots out to form a rear base member. FIG. 1 shows this foldable base member 106 in a retracted position, so that the foldable base member 106 is not engaged. FIG. 1 illustrates the foldable base member 106 attached to the main frame section at or substantially near the nexus of main frame members 101 and 103. In alternative embodiments, the foldable base member 106 may be attached to the base main frame member 101, or the wheel/ wheel assembly of the wheel member 105. In the current embodiment, the foldable base member 106 is deployed via actuator 150, which engages cable 120 to release pin 141. In alternate embodiments, the location of actuators and locking devices or cables may be at any point along the frame or wheel members. In alternate embodiments, actuators may be levers, buttons, or any other suitable device for deploying the foldable base member 106. When folded up, the foldable base member 106 may sit substantially vertical, and flush up against the rear main frame member 103, and when folded down, the foldable base member 106 may sit substantially parallel to the ground, aligned to be roughly parallel with the base main frame member 101. In alternative embodiments, stowed, the foldable base member 106 may sit parallel to the base main frame member 101, or at any suitable position between members 101 and 103. The foldable base member 106 can be constructed of metal, plastic or any other suitably strong material so as to support the weight of a child and/or any additional items carried in the cargo area when the stroller is configured as such. The present invention shows the foldable base member 106 as being a single piece of material. In alternative embodiments, the foldable base member 106 may be comprised of multiple parts, so as to be telescopic (retracting and extending), slideable, or otherwise shortenable so as to be less noticeable when folded up. Additionally, the foldable base member 106 may be made so as to be completely detachable. In some embodiments, the foldable base member 106 may be attached via a quick release mechanism.

FIG. 1 illustrates a wheel member 107, which is attached at or substantially near the top of the foldable base member 106 (when member 106 is folded vertically), so that when folded down, the base of the rear cargo section is more stable because of the support provided by wheel member 107. In alternate embodiments, wheel member 107 may not be attached to the foldable base member 106, if member 106 is of a length that does not require additional support. The wheel member 107 can comprise one or a plurality of wheels. In the present embodiment, wheel member 107 can only rotate at a limited angle along the axis (e.g., a limited-movement swivel). In alternative embodiments, the wheel or wheels can have other degrees of rotational freedom.

Figure 5:
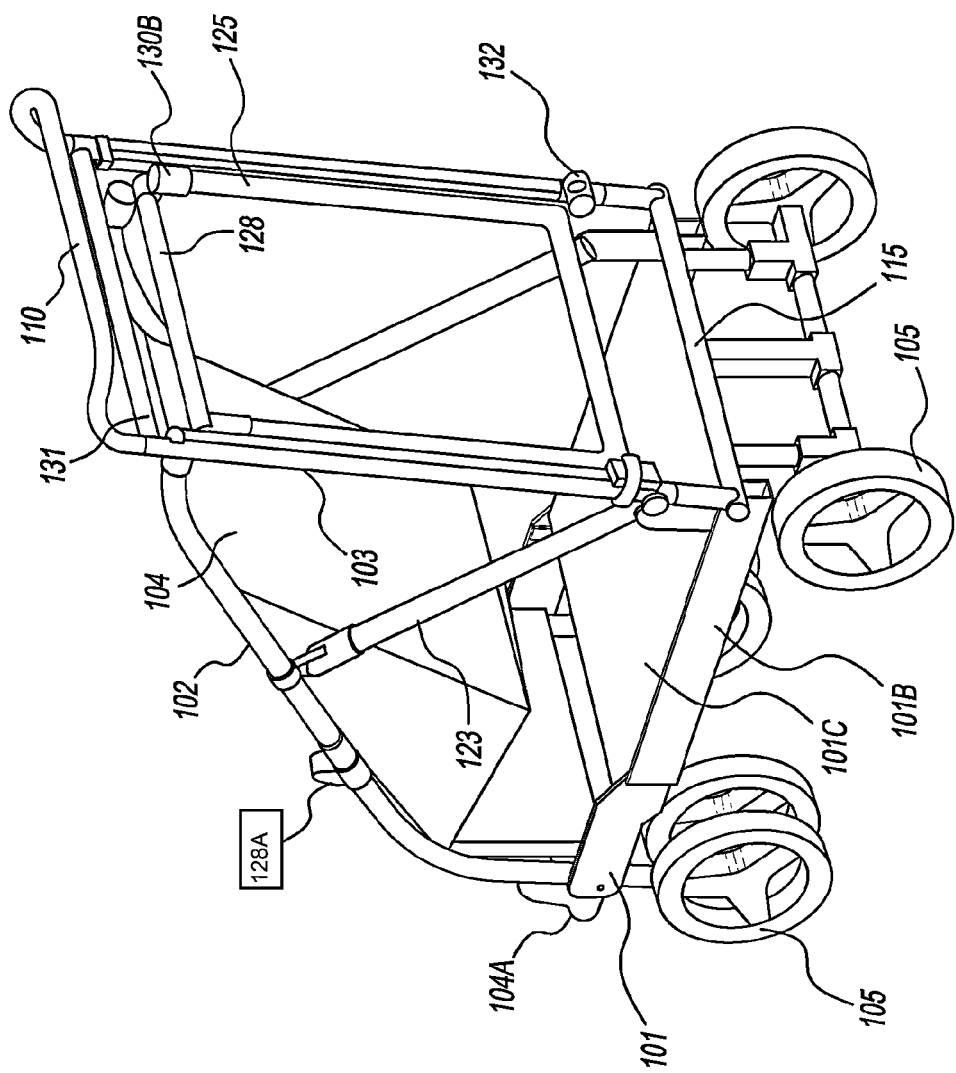
FIG. 5 illustrates a rear perspective view of an alternative embodiment of the stroller as illustrated in FIG. 11, in which the rear member is not expanded.

FIG. 1 illustrates handle member 109, which is pivotally affixed to the front frame member 102. In alternative embodiments, the handle member 109 may be attached to, or be an integral part of a telescopic expansion of mirrored frame members 102 (as illustrated in FIG. 5). In some embodiments, handle 109 may be attached to mirrored frame members 103, or may be attached to, or be an integral part of a telescopic expansion of mirrored frame members 103. The range of motion at which the handle member 109 can pivot is not limited to particular angles with respect to members 103 and 102. Additionally, in alternative embodiments, the handle member 109 may be connected to a different member of the main frame section, as long as its primary functionality of providing a comfortable pushing and steering mechanism for the device is maintained. Handle member 109 can be made out of metal, plastic, or any other similarly suitable material. In alternative embodiments, the handle 109 can be shaped differently; with its design not being limited to any particular curved or straight shapes, and in alternative embodiments may be designed as two separate left and right handles (hence not linking mirrored frame members). This handle 109 can be made out of plastic, metal, or some other suitable material, and may additionally be wrapped in foam, rubber, fabric, or some other padding material.

Figure 2:
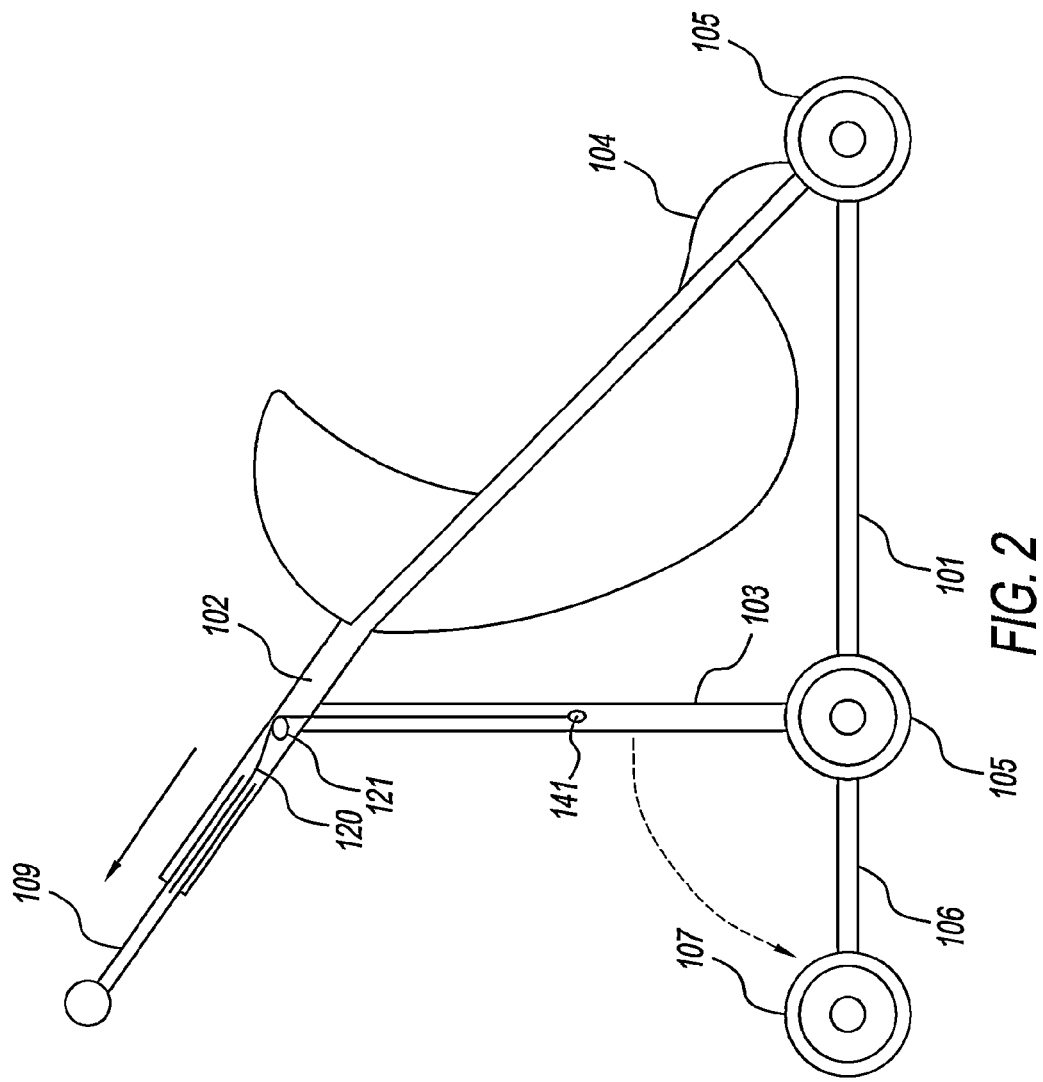
FIG. 2 illustrates a side elevational view of the preferred embodiment of the stroller with the rear member expanded.

FIG. 2 illustrates an embodiment of the stroller 100 in which the foldable base member 106 is in the deployed state. The embodiment shown is similar to that shown in FIG. 1, but with the foldable base member 106 folded down along its joint with the structural frame so as to be roughly parallel to the ground and the base main frame member 101. FIG. 2 additionally shows the position of wheel member 107 when the foldable base member 106 is folded down such that the wheel member 107 is in contact with the ground so as to provide support for the foldable base member 106. Additionally, FIG. 2 illustrates how handle 109 can be constructed to telescopically expand as a means to lengthen the handle. In the illustrated embodiment, the telescopic expansion of handle 109 actuates the deployment of the foldable base member 106 by pulling cable 120, which engages pulley 121 to release pin 141. In other embodiments, the placement of pin 141 can be located at any location in which release of the foldable base member 106 or wheel member 107 can occur. In other embodiments, pin 141 may be a lock, clamp, or other retaining mechanism to allow member 106 to move from a stowed to a deployed state (See FIGS. 5A-D for more detail). In alternative embodiments, a lever or button actuation mechanism can release the pin, lock, clamp, or other retaining mechanism holding the foldable base member 106, thus allowing it to deploy. In other embodiments, the cable and/or pulley mechanisms may run through or along other frame members, or any combination of frame members, which result in deployment of the foldable base member 106. The lever or button to release the foldable base member 106 can be located at many locations along stroller 100, and may be actuated by hand, by foot, or a combination of the two.

Figure 3A:
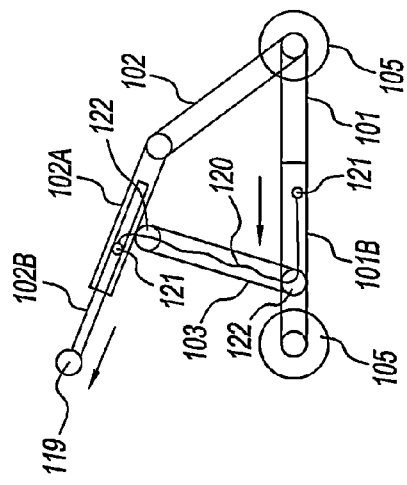
FIG. 3A. illustrates a side elevational view of an alternative embodiment of the stroller, in which the rear member is not expanded, and in which a cable, being connected to an extendable handle and extendable base member, runs through the frame, so that a user can engage the rear extendable member by actuating the handle.

FIGS. 3A-D illustrate various embodiments of the stroller 100 shown at a side elevational view with the foldable base member 106 not engaged, and with alternative embodiments in some of the members. FIG. 3A. illustrates base main frame member 101, expandable base main frame member 101*b*, front frame members 102 and 102*a*, and rear main frame member 103. The main frame section of the present invention is comprised of mirrored structural frames connected by cross members, each mirrored structural frame comprising members 101, 101*b*, 102, 102*a*, and 103.

FIG. 3A. illustrates the base of the stroller 100 as being comprised of base main frame members 101 and 101*b*, and as being substantially parallel with the ground. FIG. 3A. illustrates base main frame member 101 as forming the frontward section of the extendable base frame member, and 101*b* as forming the rearward section of the extendable base frame member. Members 101 and 101*b* are designed to form an expanding base. This is accomplished by having parts 101 and 101*b* move parallel relative to one another. In some embodiments, this may be done by having the two components slide (as, e.g., on rails) parallel to each other. In other embodiments, one component may telescope within another. In other embodiments still, one component or another may be made of sub-components which allow the part itself to telescope within itself. Specifically, FIG. 3A. illustrates frame member 101 fitting inside extendable frame member 101*b*. In an alternative embodiment, member 101*b* can fit inside member 101; in yet another alternative embodiment, member 101*b* itself may be composed of multiple, telescoping components. In yet another embodiment, member 101 may have rails on which 101*b* moves. In still other embodiments, 101*b* may have rails along which 101 moves. In a further embodiment, members 101 and 101*b* slide along each other for extension and retraction. The means with which members 101 and 101*b* are connected can be by screws, brackets, welds, pins, rails, slots, slides, or any other suitably strong means. Members 101 and 101*b* can be made out of metal, plastic, or any other similarly suitably strong material. The bottom end, or a section substantially near the bottom end, of the rear main frame member 103 is connected to the extendable base main frame member 101.

In the present embodiment, frame members 101 and 103 are connected at a substantially acute angle in relation to the front of the frame, so that the rear main frame member 103 is leaning substantially towards the front of the stroller (see FIG. 3A.). In alternative embodiments, the angle at which frame members 101 and 103 are connected may be substantially more acute, obtuse, or may form a substantially right angle, with relation to the front of the stroller. The means with which frame members 101 and 103 are connected can be by screws, brackets, welds, pins, or any other suitably strong means. In alternative embodiments, the lower end of the rear main frame member 103 may be attached to extendable member 101*b*. In preferred versions of this embodiment, the rear main frame member 103 is slidably attached to extendable member 101*b*, so that the movement of the expandable member 101*b* does not substantially alter the angle at which the rear main frame member 103 is attached. The rear main frame member 103 can be made out of metal, plastic, or any other similarly strong material.

FIG. 3A. illustrates the front frame member 102, with the bottom end, or a section substantially near the bottom end, of the front frame member 102 connecting to the front, or a section substantially near the front, of base main frame member 101. In the present embodiment, members 101 and 102 are connected at a substantially acute angle in relation to the front of the frame, so that frame member 102 is leaning substantially towards the rear of the stroller (see FIG. 3A). In alternative embodiments, the angle at which frame members 101 and 102 are connected may be substantially more obtuse, acute, or may form a substantially right angle, with relation to the front of the frame of the stroller, so long as it still forms a sturdy frame to support the potential load on the stroller. Additionally, the front frame member 102 can be made out of metal, plastic, or any other similarly strong material.

FIG. 3A. illustrates a top portion of a front frame member 102*a*, which connects to the top of the front frame member 102. Additionally, the top of the rear main frame member 103 may connect to the top portion of the front frame member 102*a* at about the middle of 102*a*'s length, thus completing the main frame section. In alternate embodiments, the nexus point at which frame members connect can be at any optimal geometric position. The means with which the top portion of the front frame member 102*a* connects to frame members 102 and 103 can be by screws, brackets, welds, pins, pivots, slides, or any other suitably strong means. Additionally, the top portion of the front frame member 102*a* can be made out of metal, plastic, or any other similarly strong material.

FIG. 3A. illustrates that wheel members 105 are attached at or around the junctions of frame members 101 and 102, and near the end of 101*b*. In alternate embodiments, front wheel placement can be oriented independently to either member 101, 101*b* or 102 respectively. The rear wheels extend along with member 101*b*, as it extends to form the rear base member. In the present embodiment, wheel members 105 can rotate freely 360 degrees along the axis, as on, e.g., a swivel. In alternative embodiments, the wheels can have other degrees of rotational freedom.

FIG. 3A. illustrates extendable handle member 102*b*, cable member 120, cable connection point 121(*a* and *b*), and pulley members 122, which, in addition to extendable base member 101*b*, comprise the means with which the rear base member is extended. Extendable handle member 102*b* moves parallel to member 102*a*. In a preferred embodiment, this sliding motion is accomplished by making the extendable handle member 102*b* fit telescopically within 102*a*. In alternative embodiments, 102*b* slides next to 102*a*, as though with rails, slots, slides, or other guides, or may fit inside of 102*b*. In yet other embodiments, the extendable handle member 102*b* comprises multiple pieces and telescopes within itself to contract and extend. Cable connection point 121*a* is attached at a point along the length of handle member 102*b*, and cable connection point 121*b* is attached at a point along the length of 101*b*. FIG. 3A. additionally illustrates cable member 120, which is the primary mechanism through which the expandable base member is engaged and disengaged. Cable member 120 is threaded through or alongside frame members 101*b*, 103, 102*a* and 102*b*, and is additionally threaded through pulley members 122 in order to connect connection points 121. FIG. 3A. illustrates pulley members 122 as being located near the junctions of members 103 and 102*a*, and members 103 and 101*b*, respectively.

Cable member 120 can be made out of metal or some other similarly strong material. The pulley members 122 assist cable member 120 to move smoothly within the frame of the stroller 100. In alternative embodiments, pulley members 122 may be located at different points within the frame of the stroller, or may be some similarly suitable device for assisting cable member 120 to move smoothly within the frame of the stroller. Pulley members 122 can be made out of plastic, metal, or any other suitably strong material.

FIG. 3A. illustrates the extendable handle member 102b in a substantially retracted position. When member 102b is in a retracted position, the rear cargo area is not engaged; when member 102b is extended by the user, the expandable base main frame member 101b extends via cable member 120, connection point members 121a, 121b and pulley members 122, thus extending the expandable base main frame member 101b. Additionally, when fully extended, the extendable handle 102b and the expandable base main frame member 101b selectively lock into place, so that the expandable base main frame member 101b and expandable handle member 102b are selectively secured to stroller 100. Attached to the end of the extendable handle member 102b is handle 119. Handle 119 can be have a variety of possible shapes; with its design not being limited to any particular curved or straight shapes, and in alternative embodiments may be designed as two separate left and right handles, attached to mirrored members 102b. This handle 119 can be made out of plastic, metal, or any other suitable material, and may additionally be wrapped in foam, rubber, fabric, or any other suitable padding material.

In the present embodiment, members 102b and 101b are extended manually via cable member 120, in alternative embodiments, some other mechanical device may be used to automatically extend members 102b and 101b. In yet other alternative embodiments, springs or some other similarly suitable means to store and release potential energy may be attached to member 102b or member 101b to assist the user in engaging the rear base member.

Figure 3B:
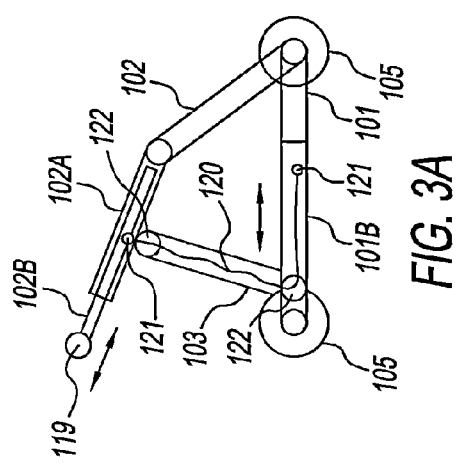
FIG. 3B. illustrates a side elevational view of an alternative embodiment of the stroller, in which the rear member is in the process of being expanded.

FIG. 3b. illustrates a stroller 100 in accordance with the teachings of the present invention, shown at a side elevational view, with members 102b and 101b beginning to be extended to form the expandable base main frame member.

Figure 3C:
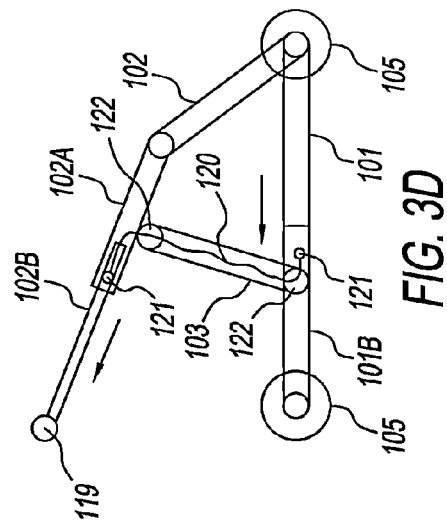
FIG. 3C. illustrates a side elevational view of an alternative embodiment of the stroller in which the rear member is shown being further expanded.

FIG. 3c. illustrates a stroller 100 in accordance with the teachings of the present invention, shown at a side elevational view, with members 102b and 101b being extended further, so that the expandable base main frame member is almost fully engaged.

Figure 3D:
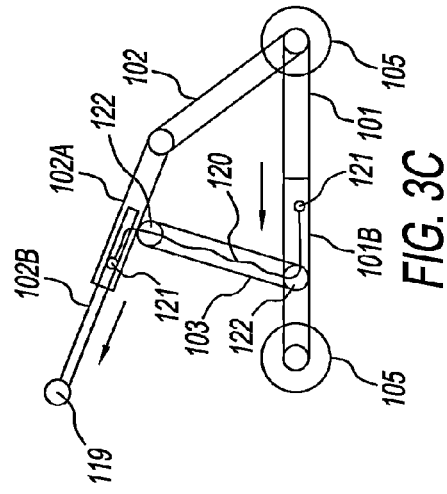
FIG. 3D. illustrates a side elevational view of an alternative embodiment of the stroller in which the rear member is shown fully expanded.

FIG. 3d. illustrates a stroller 100 in accordance with the teachings of the present invention, shown at a side elevational view, with members 102b and 101b in a fully extended and locked position, so that expandable base main frame member is fully engaged.

Figure 4:
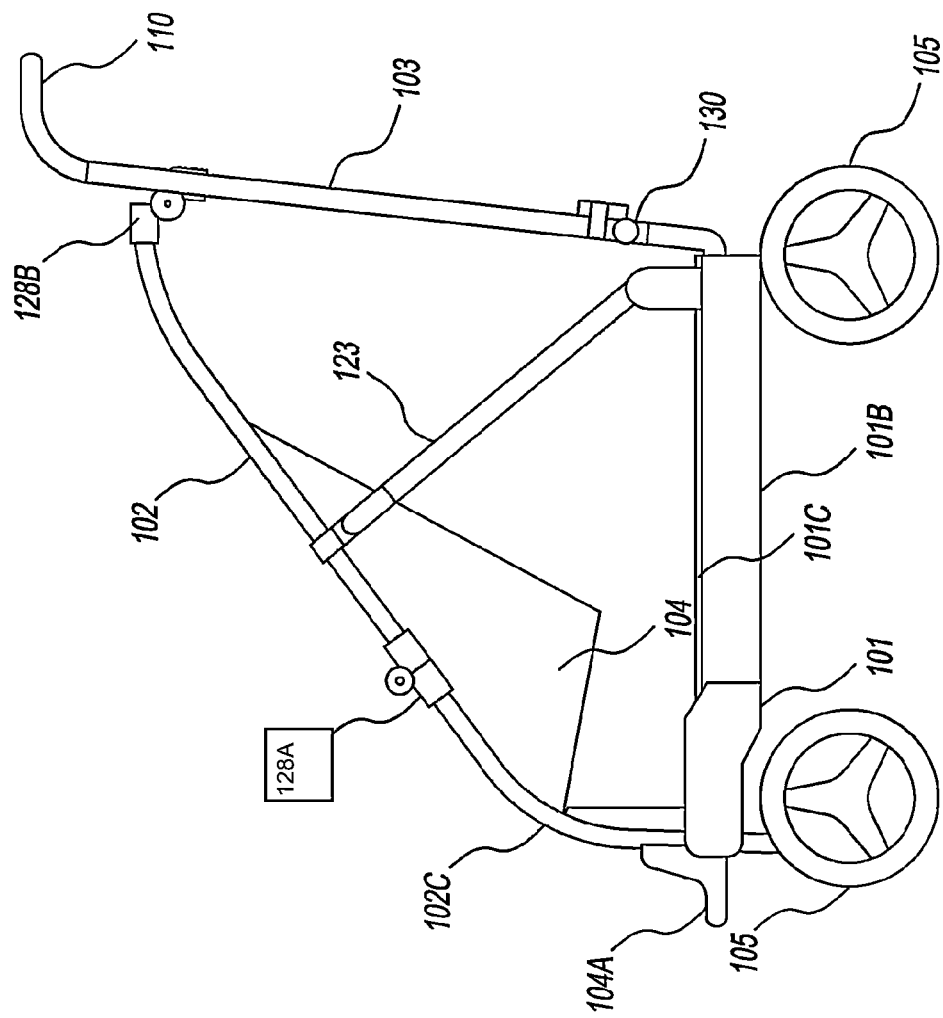
FIG. 4 illustrates a side elevational view of an alternative embodiment of the stroller, in which the rear member is not expanded, in which an expandable frame member is engaged via sliding support members and joint members.

FIG. 4 illustrates an embodiment of the stroller 100, shown at a side elevational view, in which the expandable base main frame member 101b is not engaged, and with alternative embodiments in some of the members. The stroller 100 illustrated in FIG. 4 has a folding capability (see FIGS. 10-11). The stroller 100 is folded via a locking joint 130 and joint members 128a, and 128b. Release of locking joint 130 allows the rear main frame member 103 to fold forward (see FIG. 10-11). Release of joint member 128a (not shown), allows members 102 and 102c to fold downward (see FIGS. 12-13). In alternative embodiments, this folding capability may not be present. The rear main frame member 103, seat member 104, and wheel members 105 are functionally identical to those illustrated in FIGS. 1-2 and seat member 104 is mounted to front frame member 102. Additionally, base main frame members 101 and 101b are functionally identical to those illustrated in FIGS. 3A-D.

Figure 6:
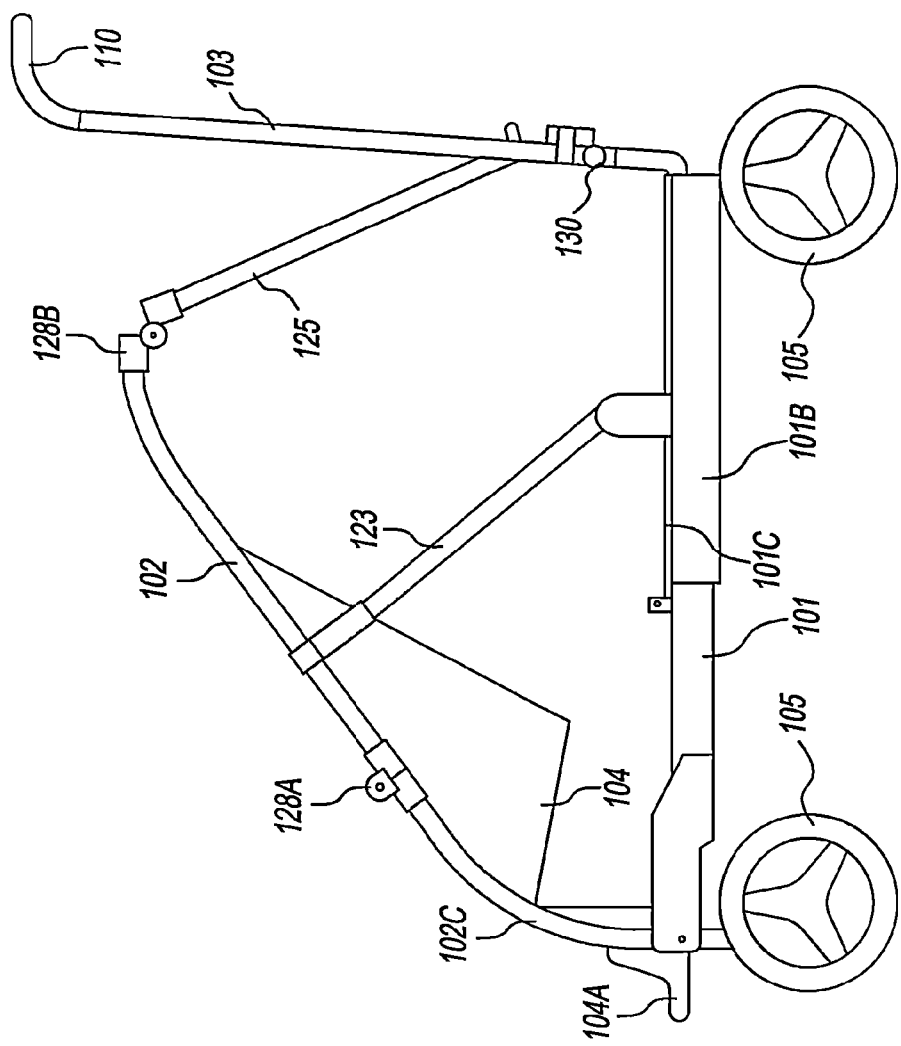
FIG. 6 illustrates a side elevational view of an alternative embodiment of the stroller as illustrated in FIG. 11, in which the rear member is in the process of being expanded.

FIG. 4 illustrates front frame member 102, the top of which is connected to a joint member 128b (see FIG. 6), and the bottom, or a section substantially near the bottom, of member 102 being connected to joint member 128a (see FIG. 6). FIG. 4 also illustrates a lower portion of the front frame member 102c, the top of which is connected to joint member 128a, and the bottom, or a section substantially near the bottom, of the lower portion of the front frame member 102c is connected to the base main frame member 101. Joint member 128a allows frame members 102 and 102c to move from an unfolded position (see FIG. 6) to a folded position (see FIGS. 10-11). Joint members 128a and 128b can be made out of plastic, metal, or any other suitably strong material. FIG. 4 introduces diagonal support frame member 123. The top of diagonal support frame member 123 is connected with a slide somewhere along frame member 102, in such a way as to allow it to slide along member 102; the bottom of the diagonal support frame member 123 is connected at, or substantially near, the rear end of base main frame member 101. In alternative embodiments, the points at which the diagonal support frame member 123 attaches to members 102 and 101 may be different, so long as the diagonal support frame member 123 is still able to provide structural support for the main frame of the stroller and to slide during folding. In yet another embodiment, the top of the diagonal support frame member 123 may be attached to the lower portion of the front frame member 102c, instead of the front frame member 102. The means with which the diagonal support frame member 123 attaches to members 102 (or 102c) and 101 can be by slots, screws, clamps, brackets, pins, slides or any other similarly suitable means. Additionally, the diagonal support frame member 123 can be made out of metal, plastic, or any other suitably strong material. FIG. 4 additionally illustrates footrest member 104a, which is attached near or substantially near the front end of base main frame member 101. In alternative embodiments, the footrest member 104a may be placed at a different location on the frame of the stroller, or may be connected to seat member 104. Additionally, the footrest member 104a can be made out of plastic, metal, or any other similarly suitable material, and may additionally be wrapped in foam, rubber, fabric, or some other padding material.

FIG. 5 illustrates an embodiment of the stroller 100 shown in a rear perspective view. FIG. 5 illustrates cross members 115 and 128; FIG. 5 additionally illustrates extendable support member 125. In the shown embodiment, the extendable support member 125 is a three-sided, u-shaped tube. In alternate embodiments, extendable support member 125 may be parallel tubes connected between the frame members 102 (through joint 128b) and 103 without a third tube cross-member. In this embodiment, extendable support member 125 and expandable base frame member 101b are the primary means with which the rear cargo area is engaged (see FIG. 8). In the un-engaged position, the top, or a portion substantially near the top, of extendable support member 125 is connected to joint member 128b; the bottom, or a portion substantially near the bottom, of member 125 is connected to frame member 103 in such a way as to allow it to slide vertically along member 103 and to pivot about that same point. The extendable support member 125 is able to move from a closed, substantially vertical, position, to an open, substantially horizontal, position by sliding the base of the u shape vertically along member 103. As the extendable support member 125 is lifted along member 103, it is pushed to a substantially horizontal position (see FIG. 10) via joint members 128b. This creates a new distance between 102 and 103, which simultaneously causes base member 101b to move parallel to 101 to extend the base of the frame (see FIGS. 6 and 7), which simultaneously expands member 101b, and thus engages the rear cargo area. In alternative embodiments, there may be springs, pulleys, motors, or some other mechanism, which assists the user of the stroller 100 to expand members 125 and 101b. In alternate embodiments, the expandable support member 125 may have additional expansion capabilities beyond pivoting upward, such as expanding telescopically while also pivoting into an expanded position, or expanding via hinges. When the expandable support member 125 is in a closed position, it locks into position. The means with which the expandable support member 125 locks into place can be by pin, snap, strap, slot, clamp or any other similarly suitable method. Additionally, the expandable support member 125 can lock into place at various intervals along the height of 103, to provide for variable expansion. The means with which member the expandable support member 125 locks into place can be by pin, snap, strap, slot, clamp or any other similarly suitable method. The expandable support member 125 can be made out of metal, plastic, or any other similarly strong material.

FIG. 6 illustrates a stroller 100 in accordance with the teachings of the present invention, shown at a side elevational view, with members 125 and 101b in the process of being extended to form the rear cargo area. As discussed above, in some embodiments, the expandable support member 125 may lock in an intermediate position along the height of the rear main frame member 103, thus achieving variable expansion of the base. In another embodiment, the total movement of the expandable support member 125 may be limited to an intermediate position, with the expandable support member 125 serving as side frame members once the extendable base has selectively expanded.

Figure 7:
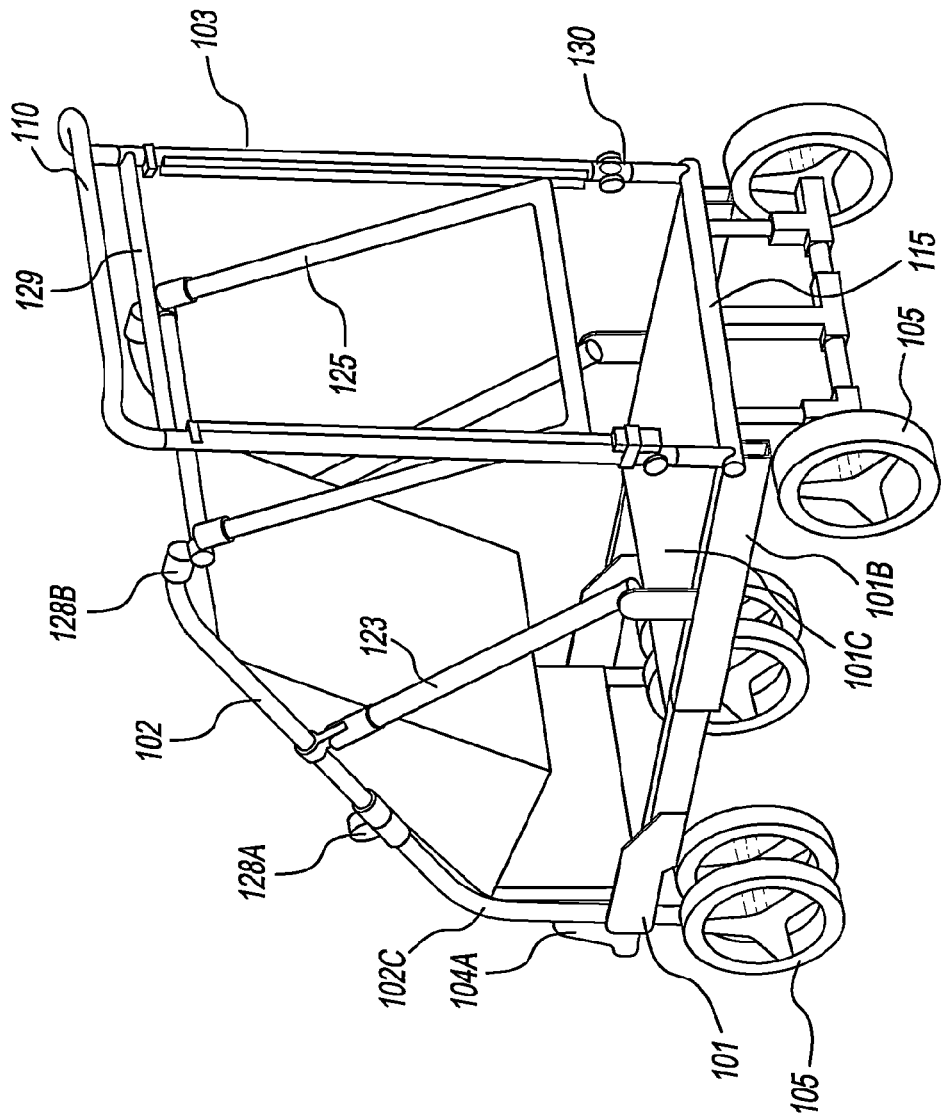
FIG. 7 illustrates a rear perspective view of an alternative embodiment of the stroller as illustrated in FIG. 11, in which the rear member is in the process of being expanded.

FIG. 7 illustrates an embodiment of the stroller 100, shown in a rear perspective view, in which members 125 and 101b being extended to form the rear cargo area.

Figure 8:
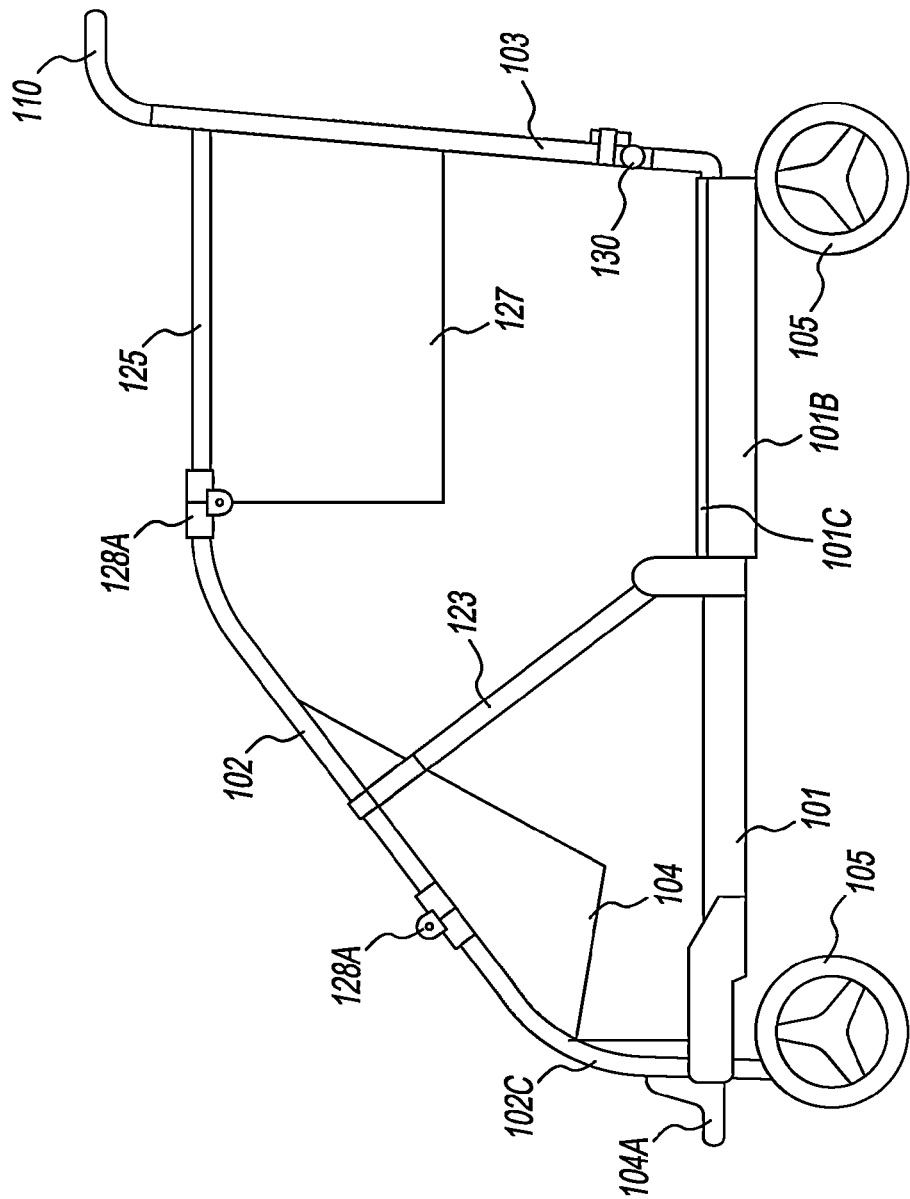
FIG. 8 illustrates a side elevational view of an alternative embodiment of the stroller as illustrated in FIG. 11, in which the rear member is fully expanded.

FIG. 8 illustrates an embodiment of the stroller 100, shown, shown at a side elevational view, in which the rear cargo area is fully extended. FIG. 8 additionally illustrates basket member 127, the top of which attaches to the extendable support member 125, the front of which attaches to cross member 128, and the back of which attaches to the rear main frame member 103. In alternate embodiments, basket member 127 may attach at or near any frame member, joint, pivot or hub in which attachment renders the basket to a usable state. Basket member 127 can be made out of fabric or some other similarly soft material, or may additionally be made out of plastic or some other similarly rigid material. The basket member 127 attaches to the frame of the stroller by snaps, straps, or any other similarly suitable means of attachment.

Figure 9:
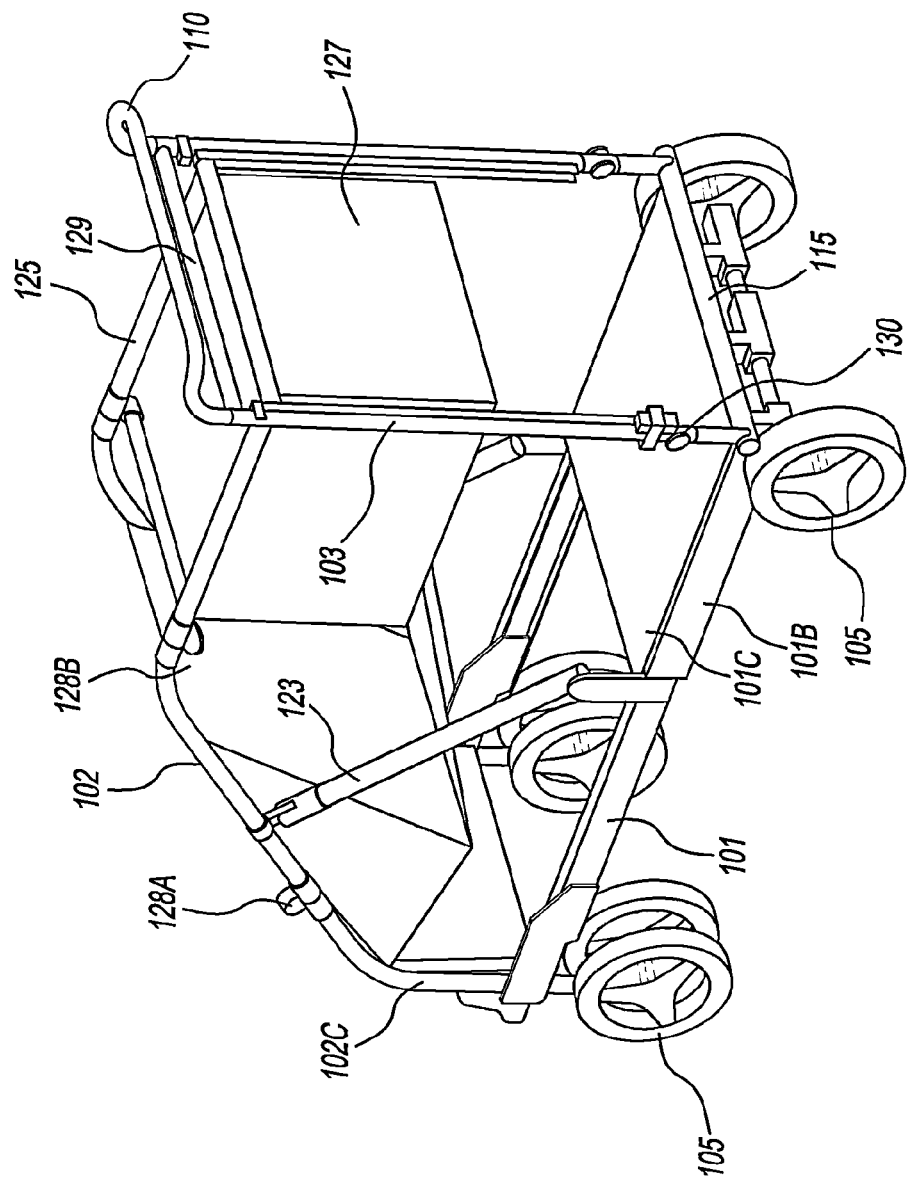
FIG. 9 illustrates a rear perspective view of an alternative embodiment of the stroller as illustrated in FIG. 11, in which the rear member is fully expanded.

FIG. 9 illustrates an embodiment of the stroller 100 shown at a rear perspective view, with the rear cargo area fully engaged.

Figure 10:
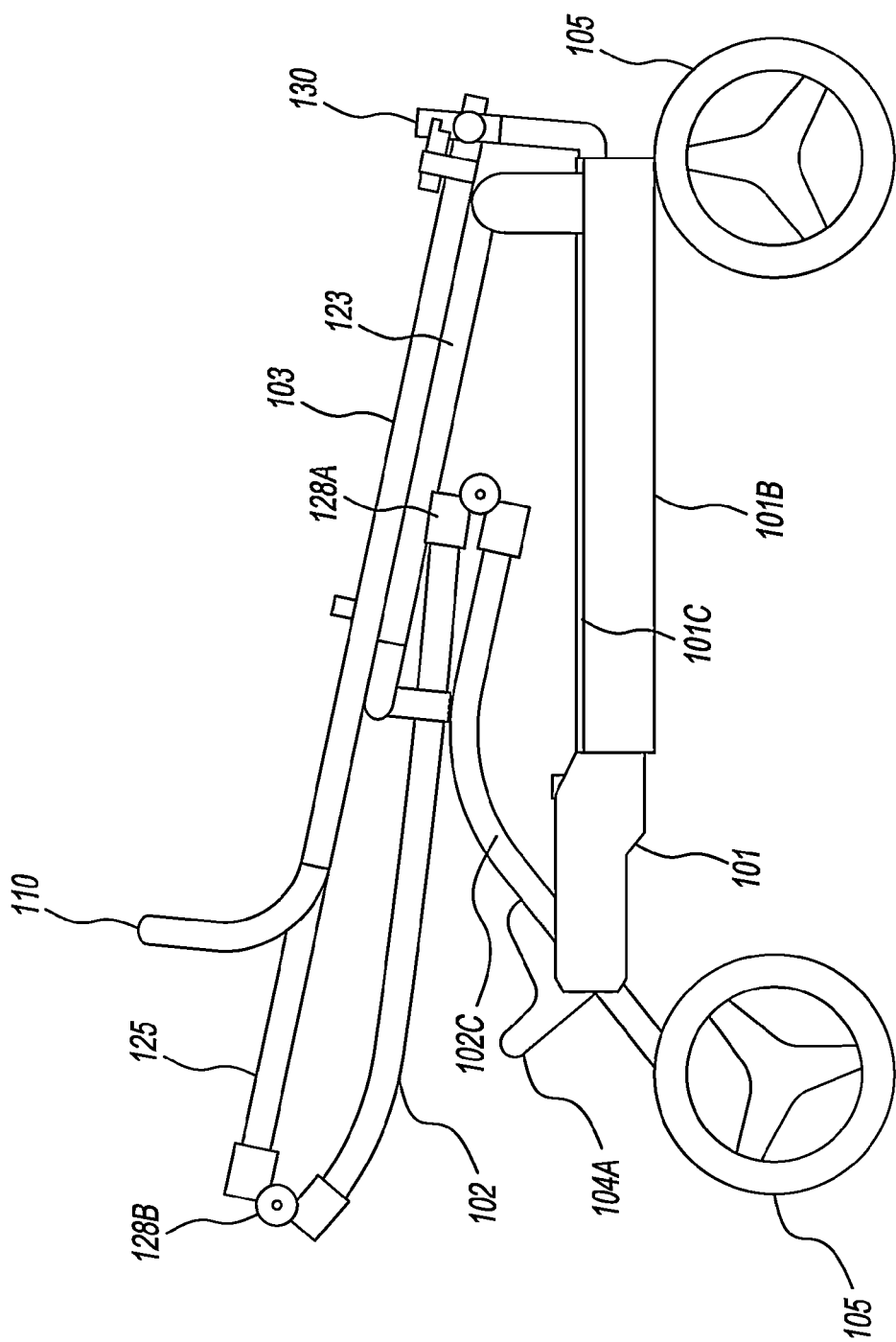
FIG. 10 illustrates a side elevational view of an alternative embodiment of the stroller as illustrated in FIG. 11, where the stroller is in a folded position.

FIG. 10 illustrates an embodiment of the stroller 100 shown at a side elevational view in a folded position. The stroller is folded by releasing joint members 130 via a release mechanism, which allows the rear main frame member 103 to fold forward to a substantially horizontal position. Additionally, joint members 128a and 128b allows front frame members 102 and 102c to fold downward, thus allowing member 103 to fold fully forward. The mechanism with which joint members 130 are released can be a button, spring, latch, or any other similarly suitable method.

Figure 11:
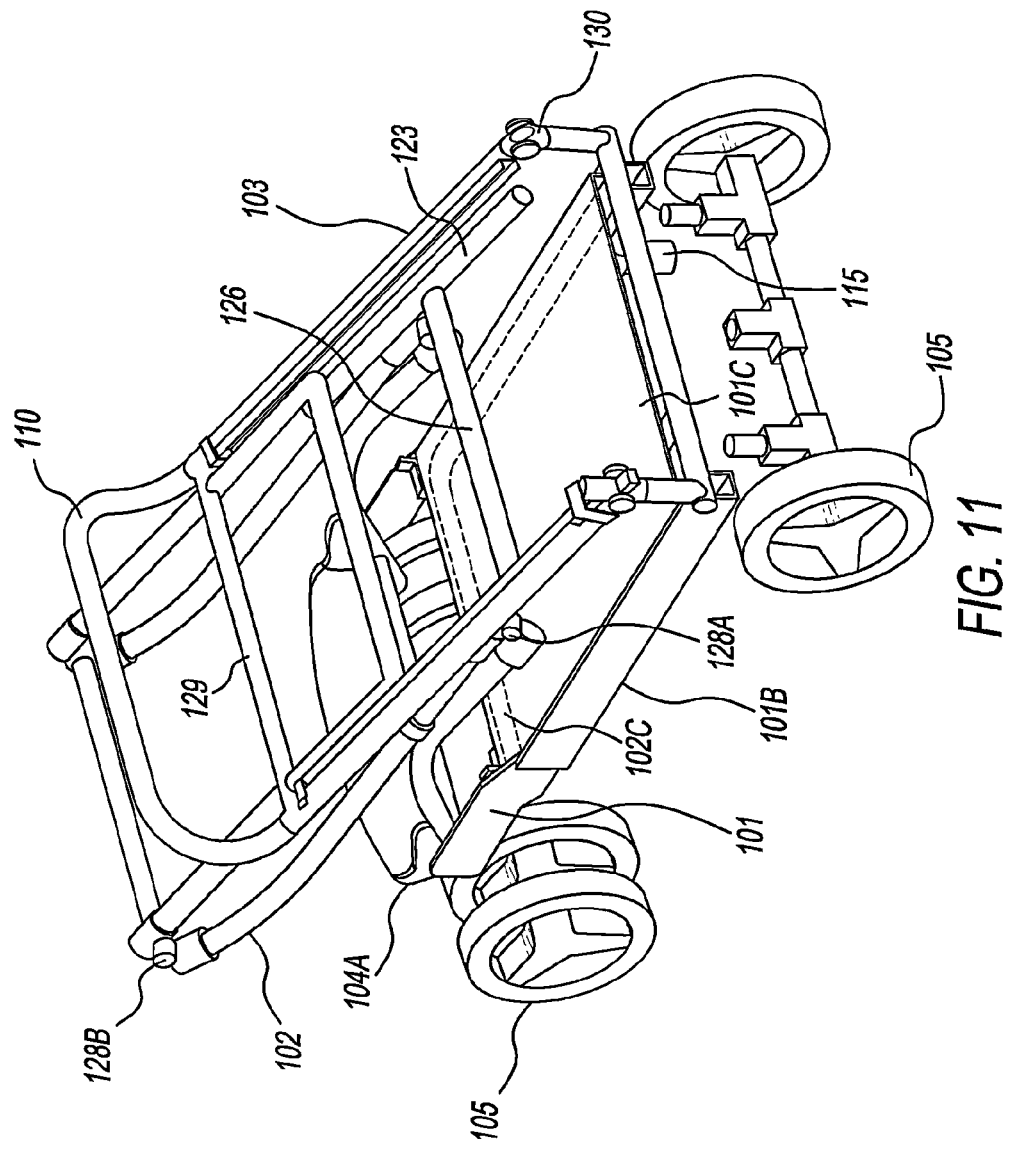
FIG. 11 illustrates a rear perspective view of an alternative embodiment of the stroller as illustrated in FIG. 11, where the stroller is in a folded position.

FIG. 11 illustrates an embodiment of the stroller 100 shown at a rear perspective view in a folded position.

Figure 12:
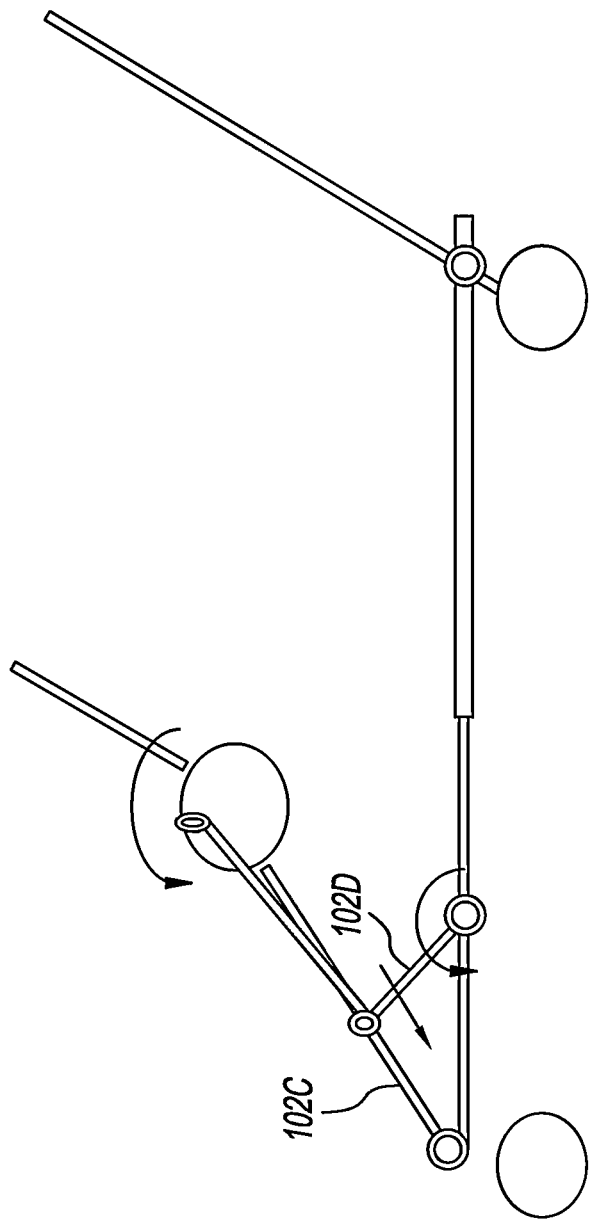
FIG. 12 illustrates an alternative embodiment of the stroller having selectively foldable front frame members.

In addition to the foregoing embodiments, the present invention contemplates other specific exemplary alternative embodiments. For example, FIG. 12 illustrates a specific alternative embodiment of a stroller 100 that provides selectively foldable front frame members 102/102C in which the members are rotatably jointed to create a top portion 102 and a bottom portion 102C of each front member. An actuator, such as a cable arrangement connected to the rotatable joint of each front member, effects folding of the front members upon actuation. Specific exemplary embodiments further provide a rotatable, front member 102C extending from bottom frame member 101, which is slidably coupled to support member 102D, and from which the support member also rotatably pivots to provide support while still allowing the front members to be selectively folded or deployed. Additional specific exemplary embodiments further provide that member 102C may have a shock or damper system.

FIG. 13 illustrates an alternative embodiment of a stroller 100. Specific exemplary embodiments provide the rear cargo area with a foldable child seat 210 that is selectively detachable from the rear cargo area. Embodiments may provide a floor platform upon which a passenger may step up to access the chair, or stand, as the case may be. For safety and other considerations, specific exemplary embodiments of the stroller, the floor platform is cropped to extend less than the full length of member 101B.

Figure 14:
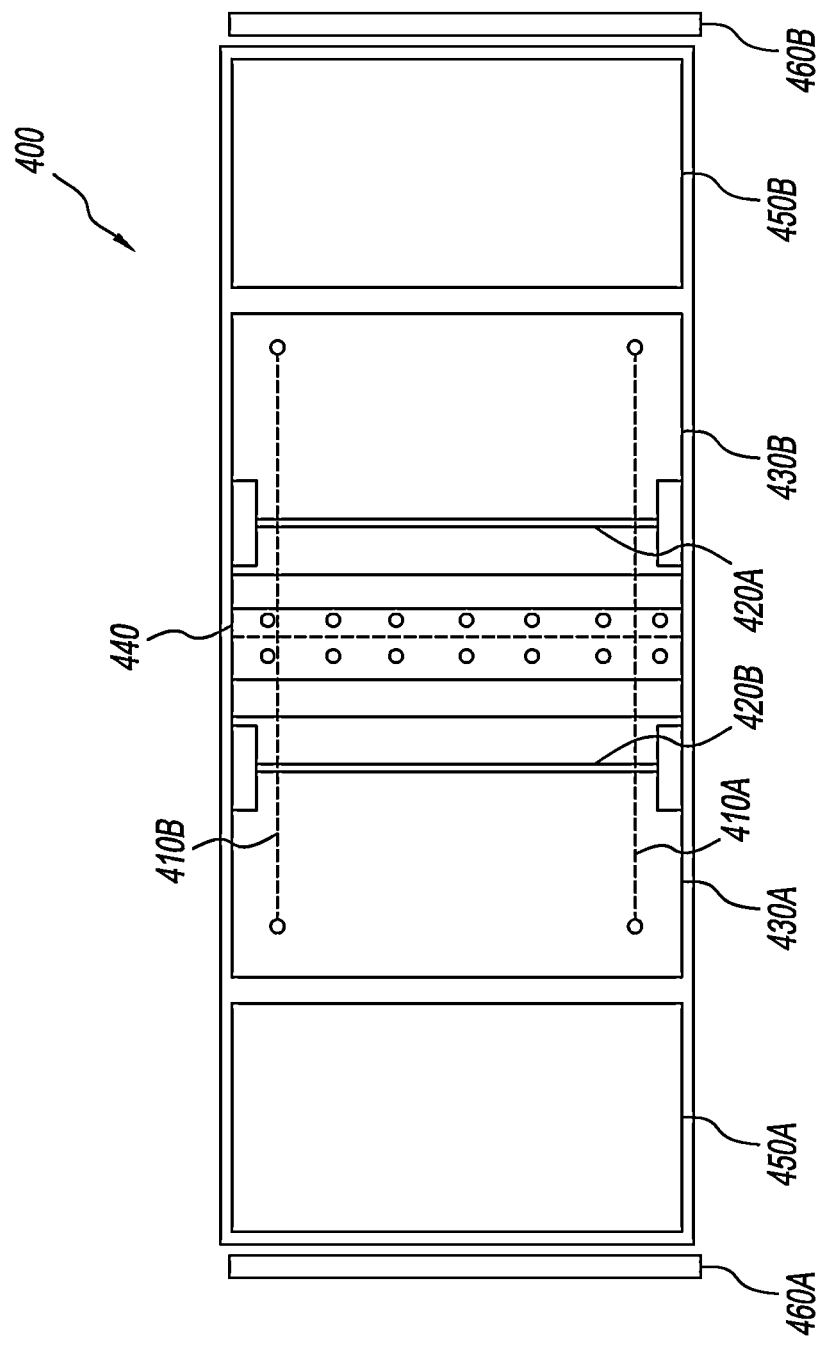
FIG. 14 illustrates a specific alternative embodiment of a basket for the stroller.

FIG. 14 illustrates an alternative embodiment of basket 127. Another specific alternative embodiment provides a selectively foldable basket 400 that is selectively mountable to handle 109, front frame member 102, rear frame member 103, support member 125, or rear cargo area platform 101C. Specific exemplary embodiments of basket 400 have one or more elastic members 410A, 410B, which mount to base panels 430A & 430B respectively, and which are held in place by restraints 420A and 420B, which combined cause basket 400 to snap into a more compact position when the basket is folded. Base panels 430A, 430B pivot around hinge 440. Side Panels 450A, 450B comprise the upper sides of basket 400. Members 460A, 460B provide a potential surface in which to mount basket 400 to stroller 100 frame members.

Figure 15B:
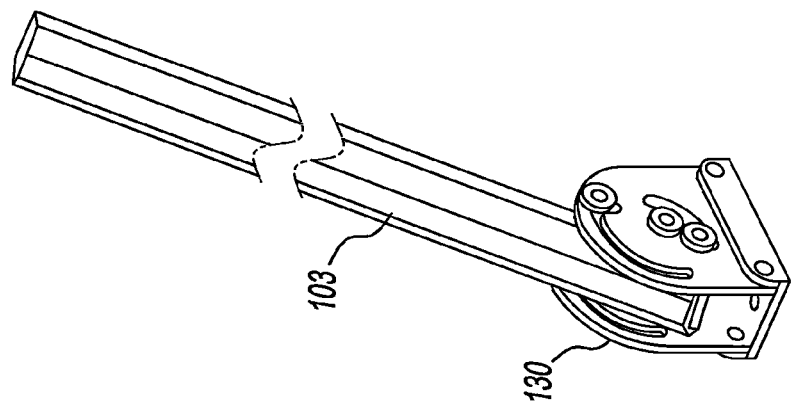
FIG. 15B illustrates the lock of FIG. 15A assembled.
Figure 15A:
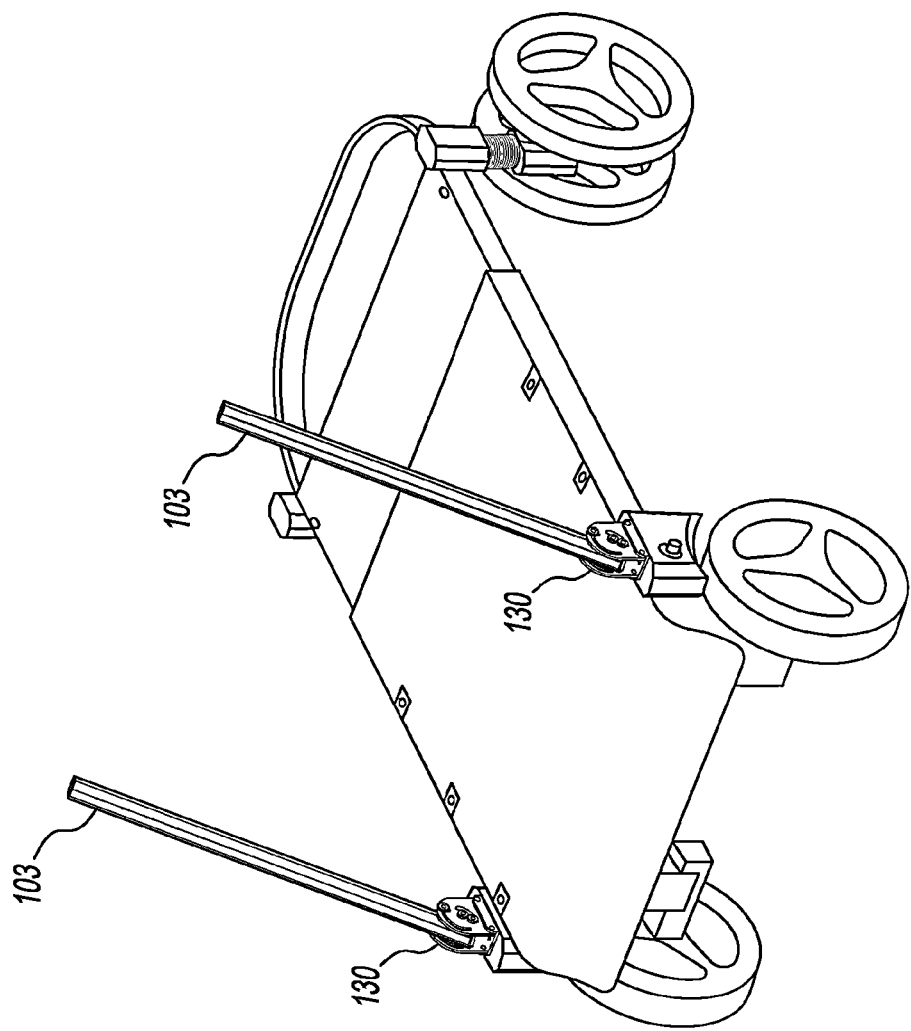
FIG. 15A illustrates a specific exemplary embodiment of a rear handle lock of the stroller.

FIG. 15A illustrates a specific exemplary embodiment of the locking joint or rear handle lock 130 of a stroller 100. The rear handle lock 130 provides, for example, a mechanism consisting of rear main frame member 103 (tube), pivot, locking pins, shuttle, locking plates, spring, spring stop, lock actuator, and cable. A rear main frame member 103 has slots cut into it to allow limited travel of the pins up and down parallel to the handle and along the center plane of rear main frame member 103. The pivot is a metal pin, for example, that facilitates rotational motion of the rear frame member relative to the locking plates. The locking pins provide the locking bar for restraining the rear frame member's rotation relative to the locking plates. The shuttle may be a plastic part, for example, that slides up and down inside the handle tube and couples the pins so they slide up and down at the same time. The shuttle is constantly pushed upon (downward) by a spring pushing the shuttle and pins into a locked position. The shuttle has a cable attached to it in which a lock actuator on or near the handle pulls the cable and hence moves the shuttle and pins to an unlocked state. The unlocked state is a state in which the pins are now inside the circular track of the locking plate and the rear main frame member 103 can now be rotated freely to a non-use state (folded state). The locking plates may be mounted to the lower expandable base frame member 101B and may be located on each side of the rear frame members 103. The locking plates may employ tracks or slide-by-slide translation and locking pockets for the pins to travel in. The pins may be spring loaded to lock into the locking pockets when the handle is rotated to the appropriate angle to line up with the locking pockets. Locking pockets may be designed for both a stowed (folded) state and erected (unfolded) state.

FIG. 15B illustrates lock 130 assembled.

Figure 15C:
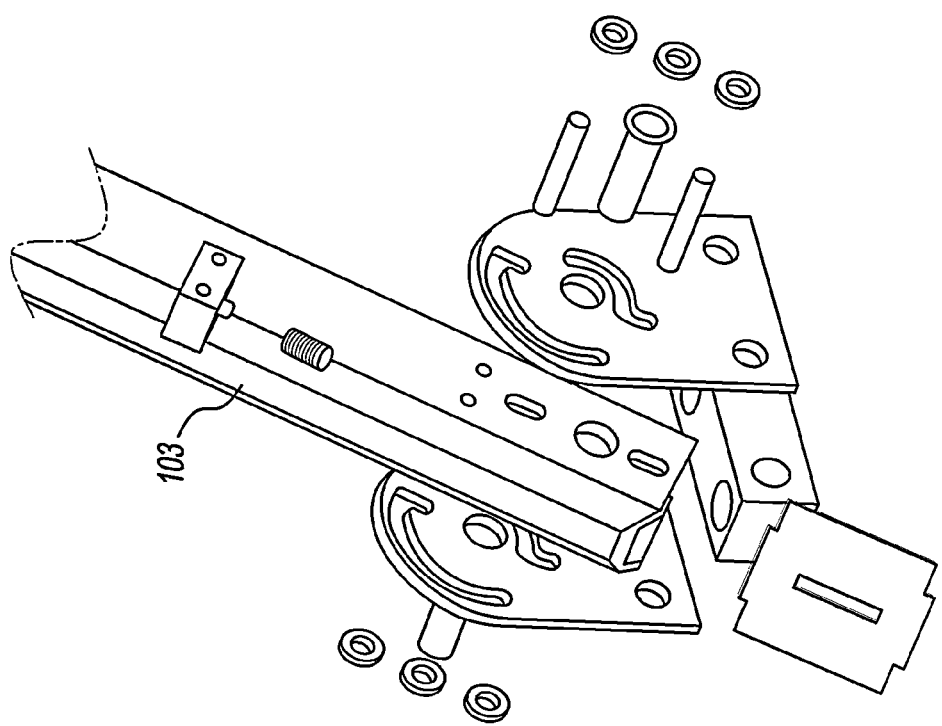
FIG. 15C illustrates the lock of FIG. 15B in an exploded view.

FIG. 15C depicts lock 130 in an exploded view.

FIGS. 16-39 are related to embodiments of the stroller comprising expandable base members and having structural configurations which allow for multiple occupancy. In particular, FIGS. 16-30 are generally directed at an embodiment of the stroller with a secondary seating capacity in the form of a modular rear seat. Additionally, FIGS. 31-39 are generally directed at an embodiment of the stroller with secondary seating capacity in the form of a rear jump seat.

In particular, FIGS. 16-30 are related to an embodiment of the stroller comprising an expandable base member with a first peripheral end and a second peripheral end. In this embodiment, a first frame member may be pivotally connected to the expandable base member near the first peripheral end. The first frame member may be configured to contain means for retaining a first seat. A second frame member comprising at least one frame mount hub may also be pivotally connected to the expandable base member near the second peripheral end. The first frame member and the second frame member may be configured to fold independently of each other. A second seat comprising at least one seat mount hub may be removably connected to the second frame member by way of each of the at least one frame mount coupling with a corresponding seat mount hub. The second seat may be modular in nature.

Figure 16:
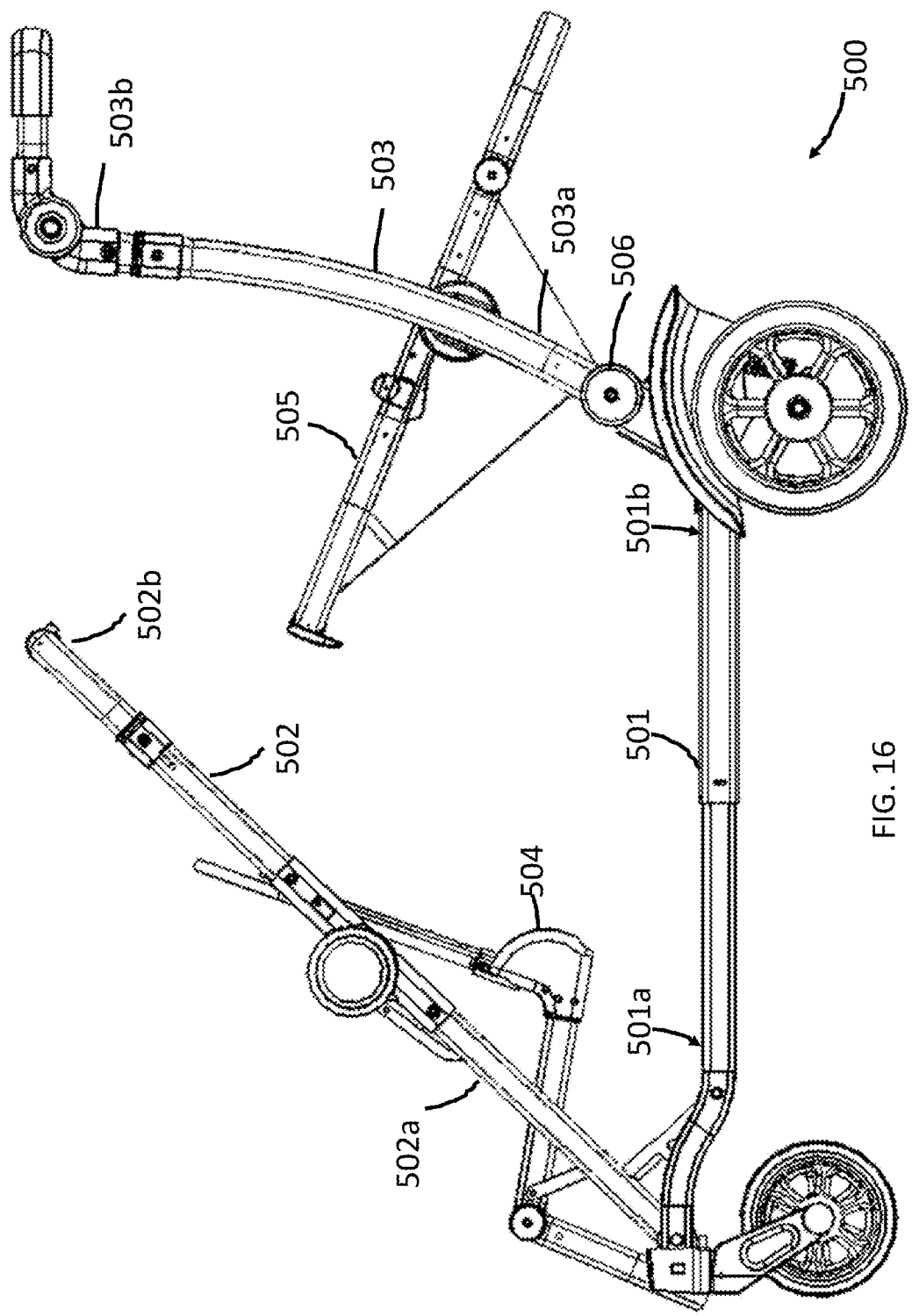
FIG. 16 illustrates a side view of a dual occupancy stroller with modular seating.

FIG. 16. illustrates a stroller system 500, having a first frame member 502 pivotally connected to an expandable base 501. The first frame member 502 is connected to the expandable base member 501 at a location towards the front end 501a of the stroller 500 and expandable base 501. A second frame member 503 is also pivotally connected to the expandable base 501 at a second end of the expandable base 501 located towards the rear 501b of the stroller 500, opposite the front end of the stroller 500. A proximal end 502a of the first frame member 502 may be pivotally connected to the expandable base member 501 and may contain means for retaining a first seat 504. The first seat 504 may be integrally mounted to the first frame member 502, as shown in FIG. 16. Alternatively, the first seat 504 may be removable, and may be, for example, a modular seat, car seat, carry cot, or any other suitable child restraint system.

The second frame member 503 is adapted to pivot about a pivot joint 506 located towards the rear 501b of the expandable base member 501. The pivot joint 506 may include locking mechanisms configured to rotatably join a proximal end 503a of the second frame member 503 to the expandable base member 501. The pivot joint 506 may also be configured to allow the second frame member 503 to fold relative to the expandable base member 501. In an open position, such as that shown in FIG. 16, the second frame member 503 is generally perpendicular to the expandable base member 501. In some embodiments, the second frame member 503 may form an acute or obtuse angle with the expandable base member 501. The angle formed between the second frame member 503 and the expandable base member 501 may be determined by the configuration of the pivot joint 506, which connects the two members. The first frame member 502 and the second frame member 503 may each fold towards the expandable base member 501 independently of one another. For example, the first frame member 502 may fold towards the expandable base member 501, while a distal end 502b of the front frame member 502 moves towards the rear of the stroller 501b. Likewise, a distal end 503b of the second frame member 503 may fold towards the front of the stroller 501a, while the rear frame member 503 folds down towards the expandable base member 501.

A second seat 505 may be removably coupled to the second frame member 503. As will be discussed in more detail below with respect to at least FIGS. 27-28, and 31, the second seat 505 is configured to be removably attached to the second frame member 503 at one or more attachment points that are generally located between the proximate and distal ends 503a and 503b of the second frame member 503. The second seat 505 may also be configured to rotate with respect to the second frame member 503 in order to recline, move to an upright position and moved to a stowed position. As shown in FIG. 16, the second seat 505 is in a rear facing and reclined configuration; however the second seat 505 may rotate with respect to the second frame member 503 and also be mounted on the second frame member in a forward facing position.

As shown in FIG. 16, in one embodiment of the stroller, the expandable base member 501 may be telescopic in nature. The expandable base member as shown in the embodiment presented in FIG. 16 is substantially similar to the base main frame member 101 and expandable base main frame member 101b system described above.

The individual members of the stroller system 500 may be made of a single piece of material. Alternatively, the members of the stroller system may be composed of two or more separate member components. The means by which the member components are connected may include screws, brackets, welds, rivets, rails, slots, slides and/or any other suitably strong means. The members of the stroller system may be made from flexible material and/or harder material such as plastic, metal or any other suitable material. Additional padding materials may be attached to the components of the stroller system.

Figure 17:
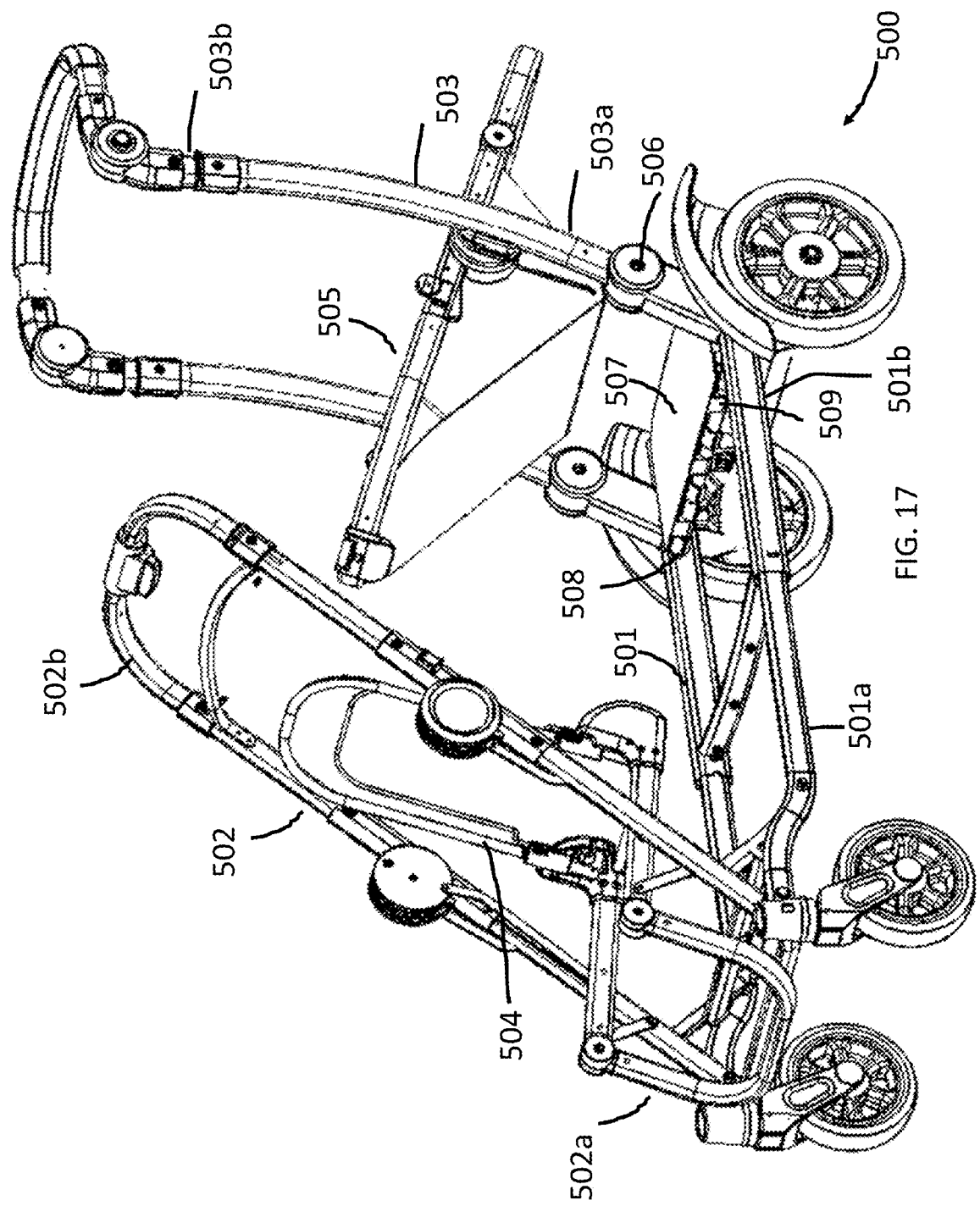
FIG. 17 illustrates a front perspective view of the embodiment of the stroller illustrated in FIG. 16.

FIG. 17 provides a perspective view of the stroller 500. A platform 507 may be mounted proximate the rear end 501b of the expandable base member 501. The platform 507 is supported by a cross-member 508 of the expandable base member 501, which is also located proximate the rear end 501b of the expandable base member 501. The platform 507 may be used to support a standing passenger, or cargo, and may be mounted on the stroller 500 with or without a second seat 505 being retained within the second frame member 503. The platform 507 may attach to the cross-member 508 of the expandable base member 501 by an attachment mechanism 509, shown here to be a snap fit engagement between the platform 507 and the cross-member 508. Alternatively, the platform 507 may be utilize a hinge, friction fit or other suitable mechanism to connect to the expandable base member 501. In one embodiment, the platform 507 may rotate about the cross-member 508 of the expandable base member 501 in order to allow a user to access a storage compartment located below the platform 507 (such an embodiment is similar to the platform 507 depicted in FIG. 31). In such an embodiment, the platform 507 may pivot about the cross-member 508 of the expandable base member 501 from a first platform position substantially parallel to and coplanar with the expandable base member 501 to a second platform position generally parallel to the second frame member 503. Additionally, in an embodiment where the platform 507 is used in conjunction with a second seat 505 the platform 507 may serve the purpose of a foot rest for a passenger seated in the second seat 505. The platform 507 may be removable from the stroller system 500. The stroller system 500 may be stowed (e.g. folded into the configuration depicted in FIG. 29-30), with or without the platform 507. The platform 507 may have a length and/or width that is shorter and/or narrower than the expandable base member 501 in a non-expanded state. Alternatively, the standing platform 507 may be expandable or have a length and/or width larger than or equal to the expandable base member in a non-expanded state. Alternatively, the platform 507 may have a length and/or width larger than or equal to that of the expandable base member 501 in an expanded state. In such an embodiment, the platform 507 may be attached to the expandable base member 501 after the stroller is fully expanded.

Figure 18:
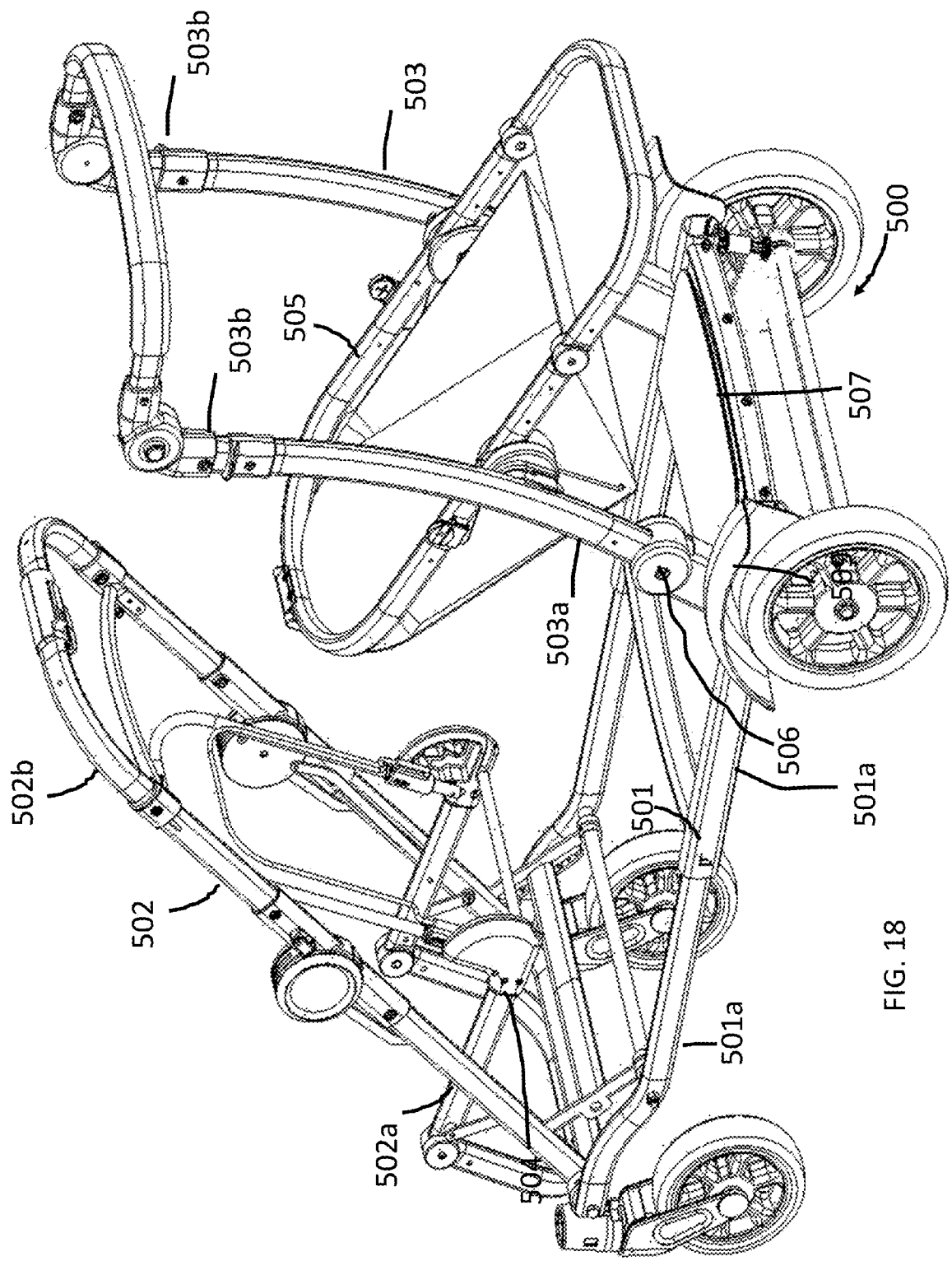
FIG. 18 illustrates a rear perspective view of the stroller illustrated in FIG. 16.

FIG. 18 provides a rear perspective view of the stroller 500. The second seat 505 is shown mounted on the second frame member 503 in a rearward facing, reclined position. Alternatively, the second seat 505 may be configured to face the front end of the stroller and/or the occupant of the first seat 502. Additionally, the first seat 504 may be configured to face the rear of the stroller or the front of the stroller (not shown). The first and second seats 504, 505 are configurable independent of each other, such that a number of seat configurations may be used.

Figure 19:
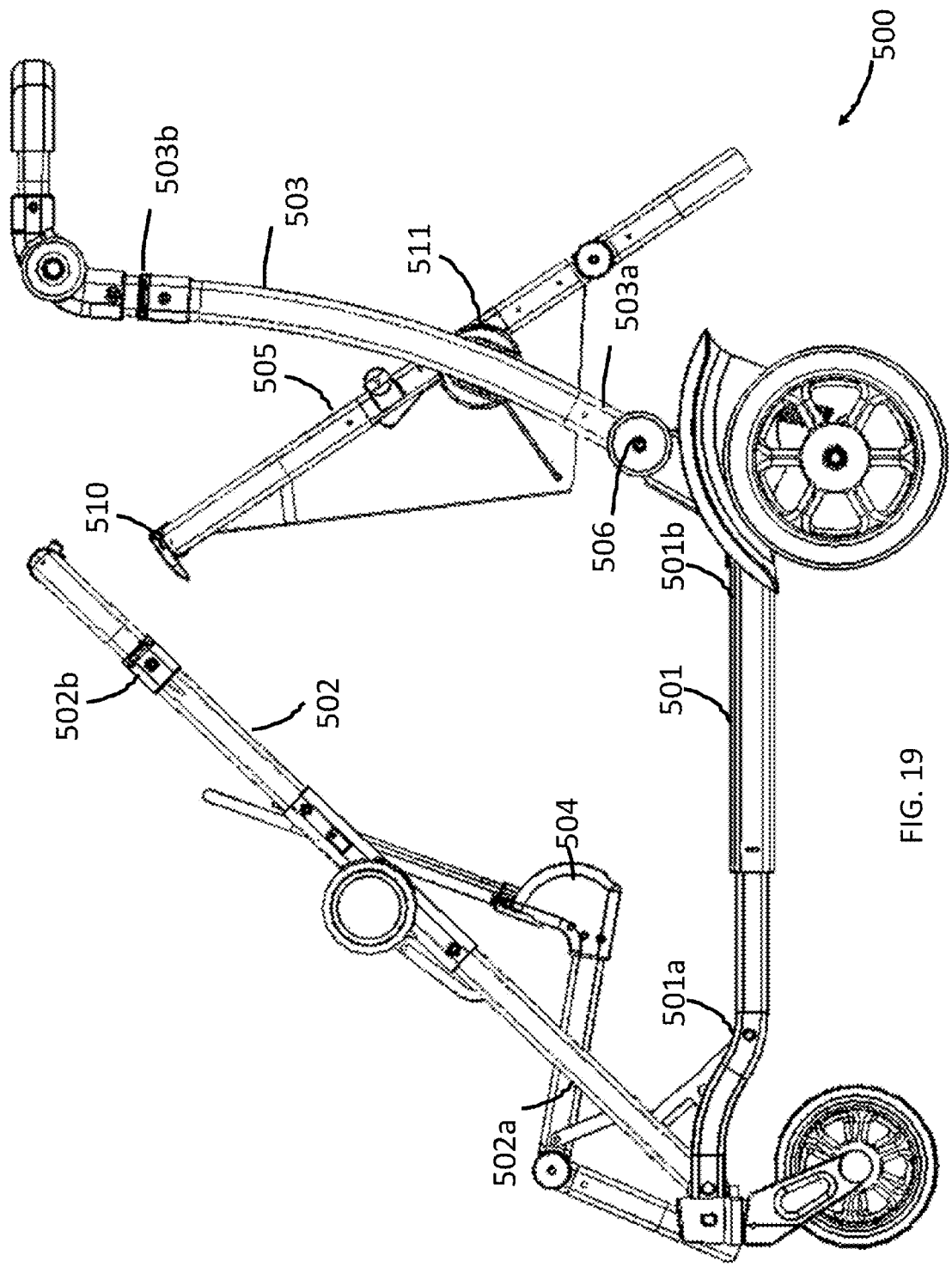
FIG. 19 illustrates a side view of the stroller system of FIG. 16, depicted with a second seat in an upright position.
Figure 20:
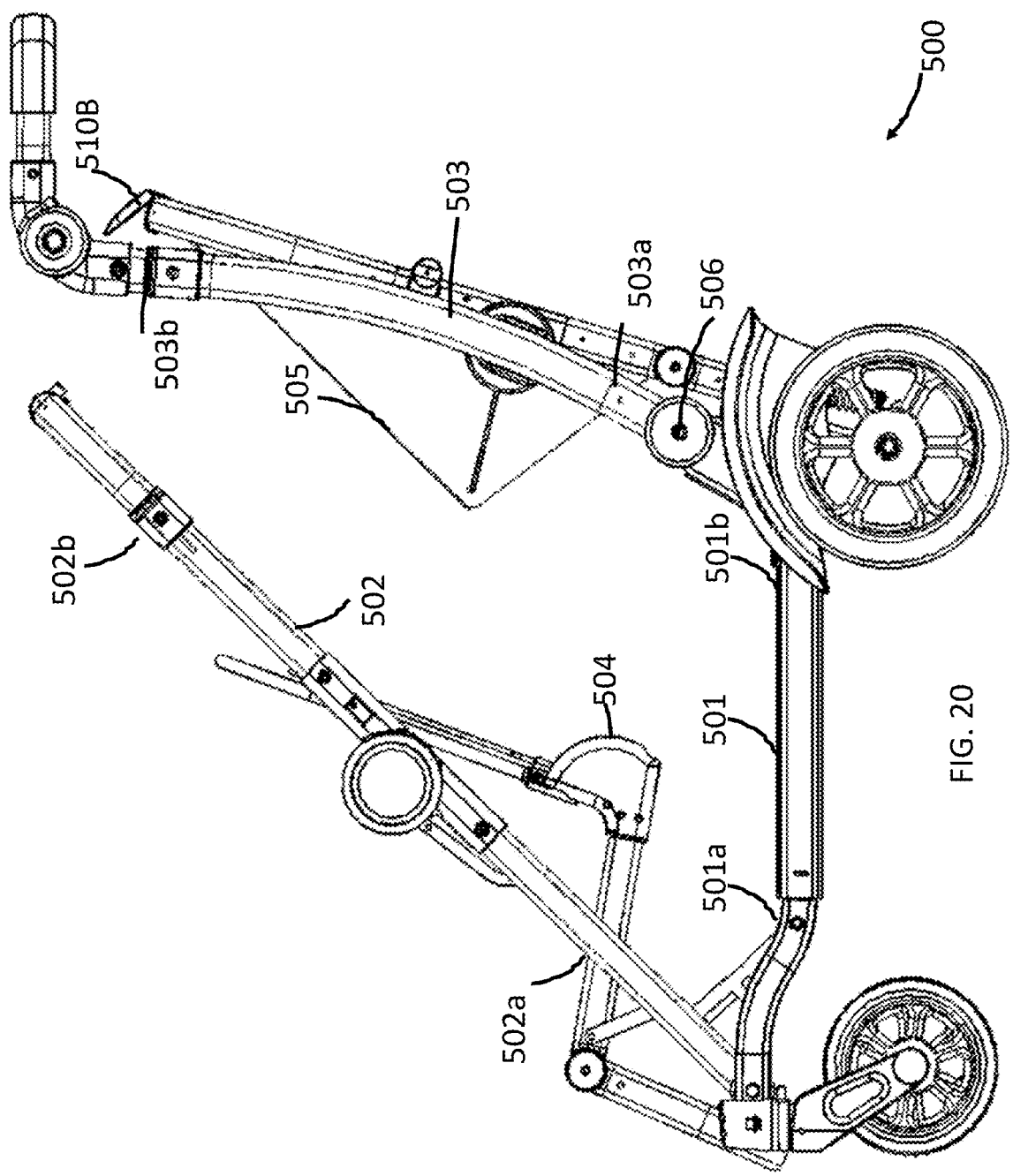
FIG. 20 illustrates a side view of the stroller system of FIG. 16 depicted with a second seat in a stowed position.

FIGS. 19-20 illustrate various configurations of the second seat 505. In particular, FIG. 19 shows the second seat 505 in a rearward facing, generally upright position. As mentioned previously, the second seat 505 is configured to pivot with respect to the second frame member 503 about a seat mount pivot 511. The seat mount pivot 511 serves as a mounting point for the second seat 505 to the second frame member 503, and contains a lockable pivot mechanism to facilitate movement of the second seat 505 from the upright position shown to a generally reclined position (see FIG. 16) or a stowed position (see FIG. 20).

Figure 21:
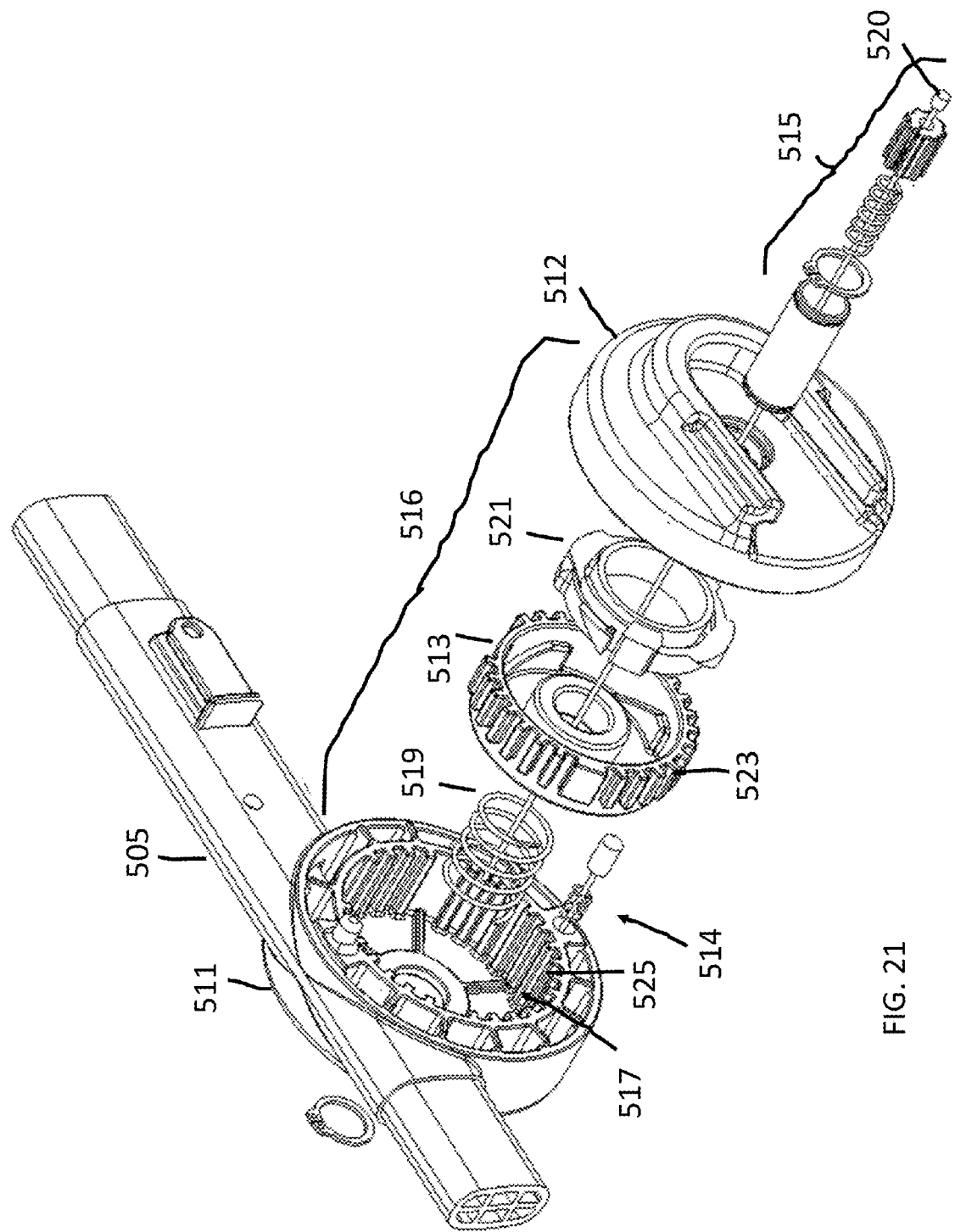
FIG. 21 illustrates an exploded view of a seat mount hub and seat mount pivot used with the stroller system of FIG. 16.
Figure 22B:
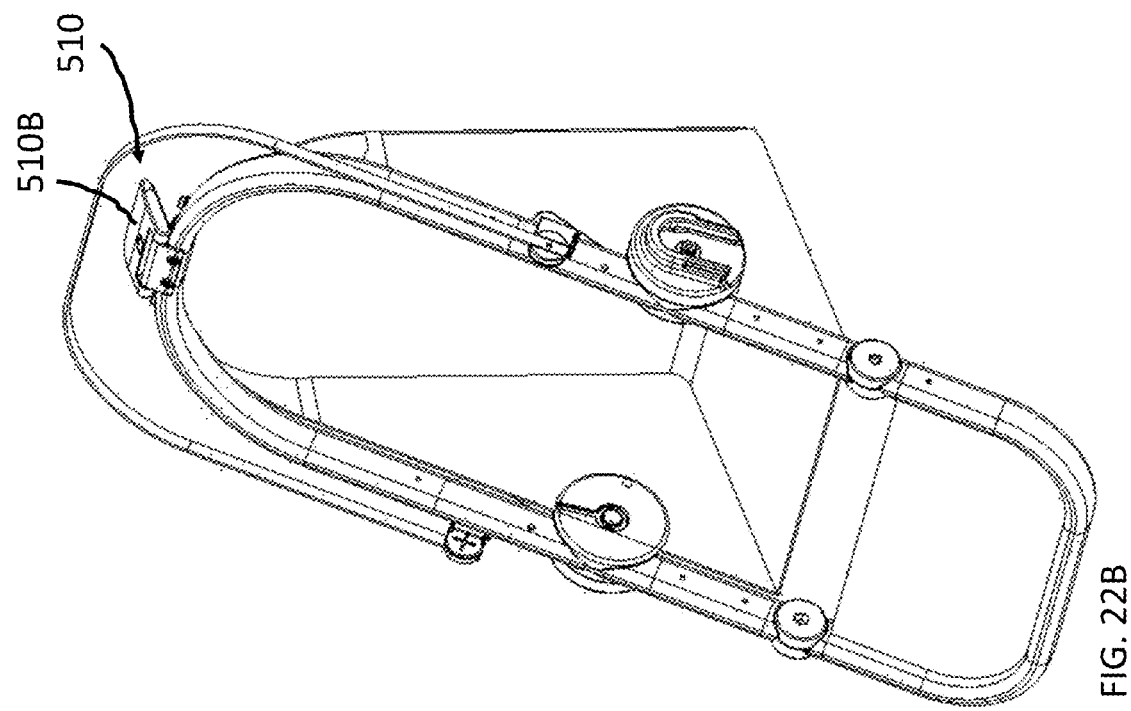
FIG. 22B illustrates a second perspective view of a second seat of the stroller system of FIG. 16.
Figure 22A:
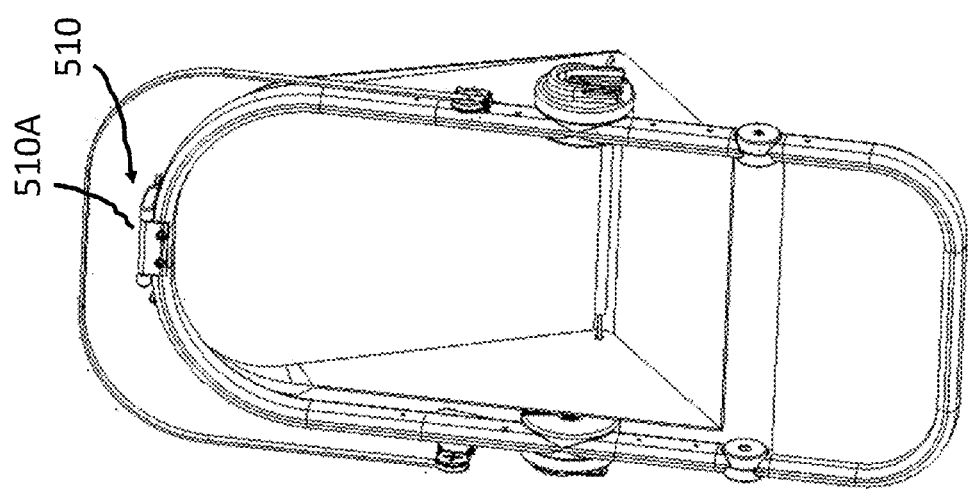
FIG. 22A illustrates a first perspective view of a second seat of the stroller system of FIG. 16.
Figure 23B:
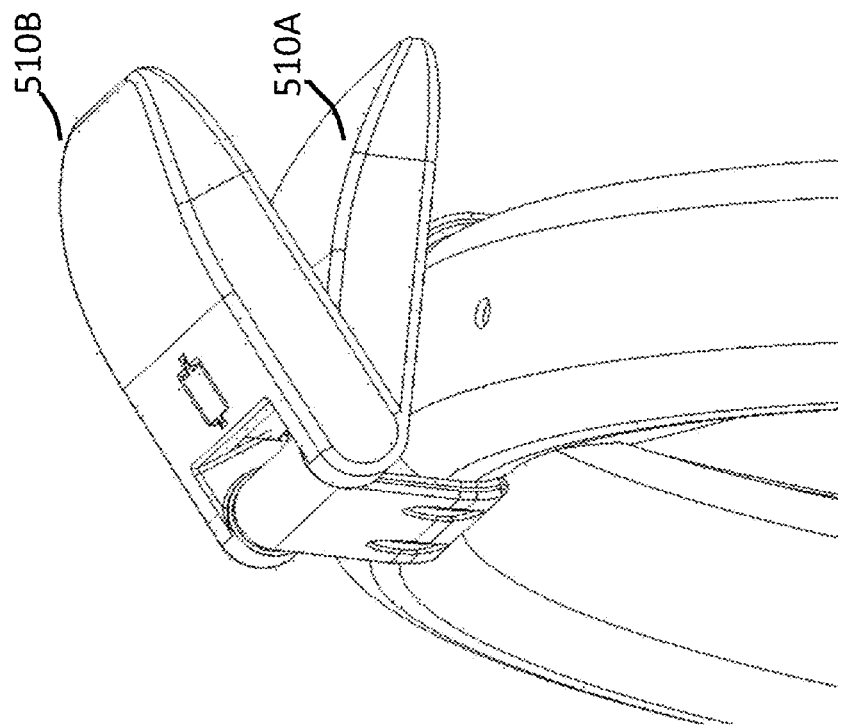
FIG. 23B illustrates a perspective view of an actuator mechanism of the second seat (as shown in FIGS. 22A and 22B) in a second actuated position.
Figure 23A:
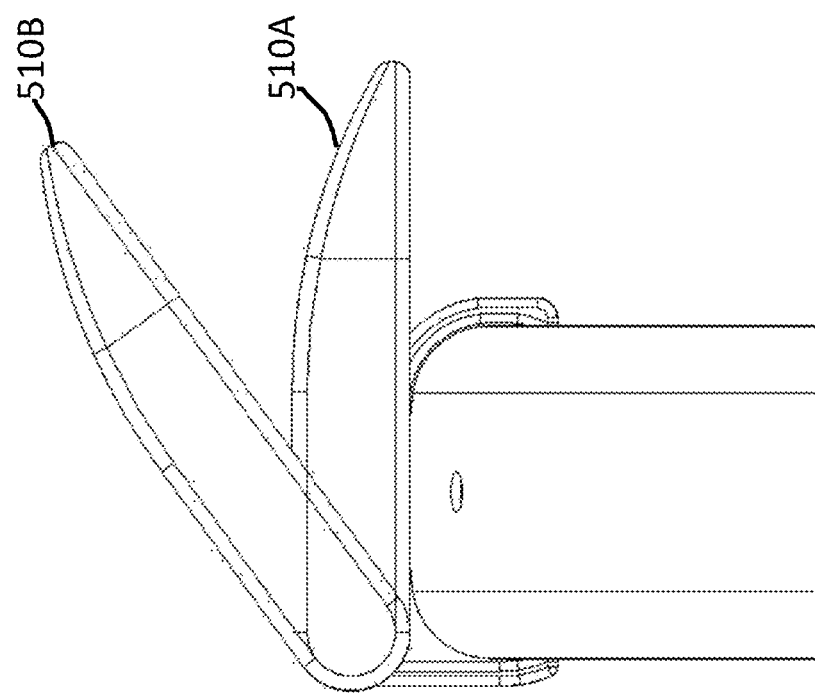
FIG. 23A illustrates a side view of an actuator mechanism of the second seat (as shown in FIGS. 22A and 22B) in a first non-actuated position.

FIG. 21 illustrates various aspects of the seat mount hub 512 and seat mount pivot 511 in an exploded view. As shown in FIG. 21, a seat mount pivot 511 may be located along the second seat 505. Aspects of three separate locking mechanisms are shown in FIG. 21: (1) a first pivot locking mechanism 516 with an interlocking gear 513 is configured to control the partial incline/decline of the second seat (see FIG. 22-23), (2) a secondary pivot locking mechanism 514 is configured to fully incline/decline the second seat into a position suitable for folding (see FIGS. 24-26), and (3) a seat-frame locking mechanism 515 is configured to secure the second seat to the second frame member (see FIG. 27-28).

The relative positioning or incline/decline of the second seat 505 with respect to the second frame member 503 is controlled by an actuator 510 (see FIG. 22) that is mechanically linked to the seat mount pivot 511 to release a first pivot locking mechanism 516 contained in the seat mount pivot 511 and allow movement of the second seat 505 with respect to a second frame member (not shown). The actuator 510 and actuation mechanism may control a first pivot locking mechanism 516 comprised of an interlocking gear 513 located within the seat mount pivot 511. The interlocking gear system 516 may be configured to prevent the rotation of the seat mount pivot 511 relative to the seat mount hub 512. The actuator 510 may be connected to a cable and spring configuration 519, which controls a gear positioner 521, which adjusts the position of the interlocking gear 513 with respect to the interior notch system 517 of the seat mount pivot 511. The location of the teeth 523 of the interlocking gear 513 with respect to the grooves 525 of the interior notch system 517 of the seat mount pivot 511 determines the location of the second seat with respect to the second frame.

In one embodiment, an interior notch system 518 may also be located on the interior surface of the seat mount hub 512 (see FIGS. 25A, 25B). In such an embodiment, as illustrated in FIG. 21, the seat mount hub 512 and the seat mount pivot 511 may be configured such that in a first position the teeth 523 of the interlocking gear 513 is at least partially engaged with the grooves 525 of the interior notch system 517 of the seat mount pivot 511 and also at least partially engaged with the interior notch system 518 located on the interior surface of the seat mount hub 512. In this first position the engagement of the teeth 523 of the interlocking gear 513 with the interior notch system 518 of the seat mount hub 512 prevents the rotation of the seat mount pivot 511 with respect to the seat mount hub 512 and the seat 505 is unable to be inclined or reclined. The gear positioner 521 may be engaged or rotated to move the interlocking gear 513 into a second position such that the interlocking gear 513 is substantially within the seat mount pivot 511 and the teeth 523 of the interlocking gear 513 are disengaged from the interior notch system of the seat mount hub 512. In this second position of the interlocking gear 513, the seat mount hub 512 is capable of rotating with respect to the seat mount pivot 511 as is necessary in order to partially incline or recline the second seat 505. As will be discussed in relation to FIGS. 24-25, as long as the secondary locking mechanism 514 is engaged the release of the first pivot locking mechanism 516 only allows for the partial incline/recline of the seat. Alternative mechanisms that allow the second seat 505 to rotate with respect to second frame member 503 may be used.

In the embodiment of the stroller shown in FIGS. 19-22, the actuator 510 for the first pivot locking mechanism 516 may be located at the top frame of the second seat 505. Alternatively, the actuator 510 may be located at any suitable position along the second seat 505 (see FIGS. 22A and 22B). The second seat 505 can be rotatably positioned at any position in the range between substantially perpendicular to the plane defined by the second frame member 503 (see FIG. 1) to substantially parallel and/or coplanar with the plane defined by the second frame member, as is shown in FIG. 20. Transitioning from one position to another may involve engaging the actuator 510 and pivoting the actuator 510 upward and away from the second seat 505 to an actuated position 510B. The engagement of the actuator from a non-actuated position 510A to an actuated position 510B may result in a cable connected to the actuator 510 to mediate the gear positioner 521. As discussed above, the gear positioner 521 may move the interlocking gear 513 into a second position such that it is substantially within the seat mount pivot 511 and the teeth 523 of the interlocking gear 513 are fully engaged with the grooves 525 of the interior notch system 517 and the teeth 523 of the interlocking gear 513 are no longer engaged with the interior notch system of the seat mount hub 512, such that the seat mount hub 512 can rotate with respect to the seat mount pivot 511, and the second seat 505 can partially recline/incline with respect to the second frame member 503. FIGS. 22A and 22B, illustrate two possible positions of the actuator 510 for the primary pivot locking system; in particular, in FIG. 22A, the actuator 510 is not engaged and shown in an non-actuated state 510A; in FIG. 22B, the same actuator 510 is engaged and shown in an actuated state 510B. The same actuator 510 for the primary pivot locking system 516 is shown in an un-actuated state 510A and an actuated state 510B from a side view and a side perspective view in FIGS. 23A and 23B, respectively.

As discussed in relation to FIG. 21, a secondary pivot locking mechanism 514 is configured to fully incline/recline the second seat 505 into a position suitable for folding. The secondary pivot locking mechanism 514 may be utilized in order to prevent a passenger from being accidentally ejected from the second seat 505. The secondary pivot locking mechanism limits the range of motion that the second seat 505 may be rotated with respect to the second frame member 503. As a result, with the secondary pivot locking mechanism 514 engaged, the second seat may not be rotated to a stowed position, such as that shown in FIG. 20. The secondary pivot locking mechanism 514 of FIG. 21 is further illustrated in FIG. 24. As illustrated in FIG. 24-25, a spring-pin system may be used to align a portion of the interior notch system 517 of the seat mount pivot 511 such that the teeth 523 of the interlocking gear system 513 can engage with the interior notch system 517. As shown in FIG. 24, a pin 529 is connected to a spring 531, which engages the interior notch system of the seat mount hub 512. While the term "pin" is used in this disclosure, one skilled in the art would understand that any other suitable locking device could be substituted for a "pin".

As illustrated in FIGS. 25A and 25B, the location of the pin 529 within the interior notch system 518 of the seat mount hub 512 determines the configuration of grooves 525A, 525B available to the teeth 523 of the interlocking gear system 513. As shown in FIG. 25A, a pin 529 is engaged position 529A in a window 533 of the interior notch system 517. A specific configuration of the grooves 525A is available to the teeth of the interlocking gear system (not shown), and the seat 505 is unable to rotate fully. As indicated by the arrows, once the pin is removed, the interior notch system 518 of the seat mount hub 512 may rotate, for example, in a counter-clockwise direction, to the configuration illustrated in FIG. 25B. As shown in FIG. 25B, the pin 529 is in a second disengaged position 529B. As a result of the disengagement of the pin, the interior notch system 518 has been rotated such that the pin 529 is now in alignment with a different portion of the interior notch system 518 to allow a wider range of rotation than when the pin 529 is disposed within window 533. If the pin 529 is engaged at a different window, a second alternate configuration of the grooves 525B will be available to the teeth of the interlocking gear system. The secondary pivot locking mechanism 514 may be configured such that the pin 529 needs to be disengaged in order for the interior notch system 518 to rotate to the positions corresponding to the second seat 505 being in the a fully inclined/reclined position suitable for stowage.

The pin 529 of the secondary pivot locking mechanism 514 can be engaged/disengaged via an actuator 537, illustrated in FIG. 26. The actuator 537 may engage/disengage the pin 529 from the window 533 of the interior notch system 518 of the seat mount hub 512 via a cable 535. FIG. 26 illustrates a portion of the second seat 505 including the frame, a seat mount pivot 511, seat mount hub 512. The second seat 505 may be constructed using a seat bottom 541 and a seat back 539. The actuator 537 may be positioned such that it is at the point between the seat bottom 541 and the seat back 539 in such a manner that the actuator is inaccessible when the a passenger is in the second seat. Here the actuator 537 is positioned to rest entirely under a passenger seated in the second seat, but other locations are contemplated, such as along the sides, rear of the seat back, or bottom surface of the second seat 505. The actuator 537 may be a rigid rod, flexible strap or other device constructed to allow a user to manipulate the actuator when operating the secondary pivot locking system 514. The actuator 537 is preferably linked to the seat mount pivot 511 via a cable 535 or other structure adapted to transfer the motion or tension applied to the actuator 537 to the secondary pivot locking mechanism 514 within the seat mount pivot 511. Movement of the actuator 537 facilitates engagement and disengagement of the secondary pivot locking mechanism 514 within the seat mount pivot 511 of the second seat 505. The secondary pivot locking mechanism 514 is biased to be engaged and so movement of the actuator is required to fully rotate the second seat 505 to an inclined/reclined state suitable for folding/stowage.

In the shown embodiment in order to rotate the second seat 505 to a fully inclined/reclined state for folding/stowage both the primary pivot locking mechanism 516 and the secondary pivot locking mechanism 514 may need to be disengaged by actuators 510 and 537, respectively. As shown, a passenger residing in the second seat 505 may have to be removed from the second seat 505 in order to release both the primary pivot locking mechanism 516 and secondary pivot locking mechanism 514 by engaging their respective actuators prior to folding the stroller.

Figure 27:
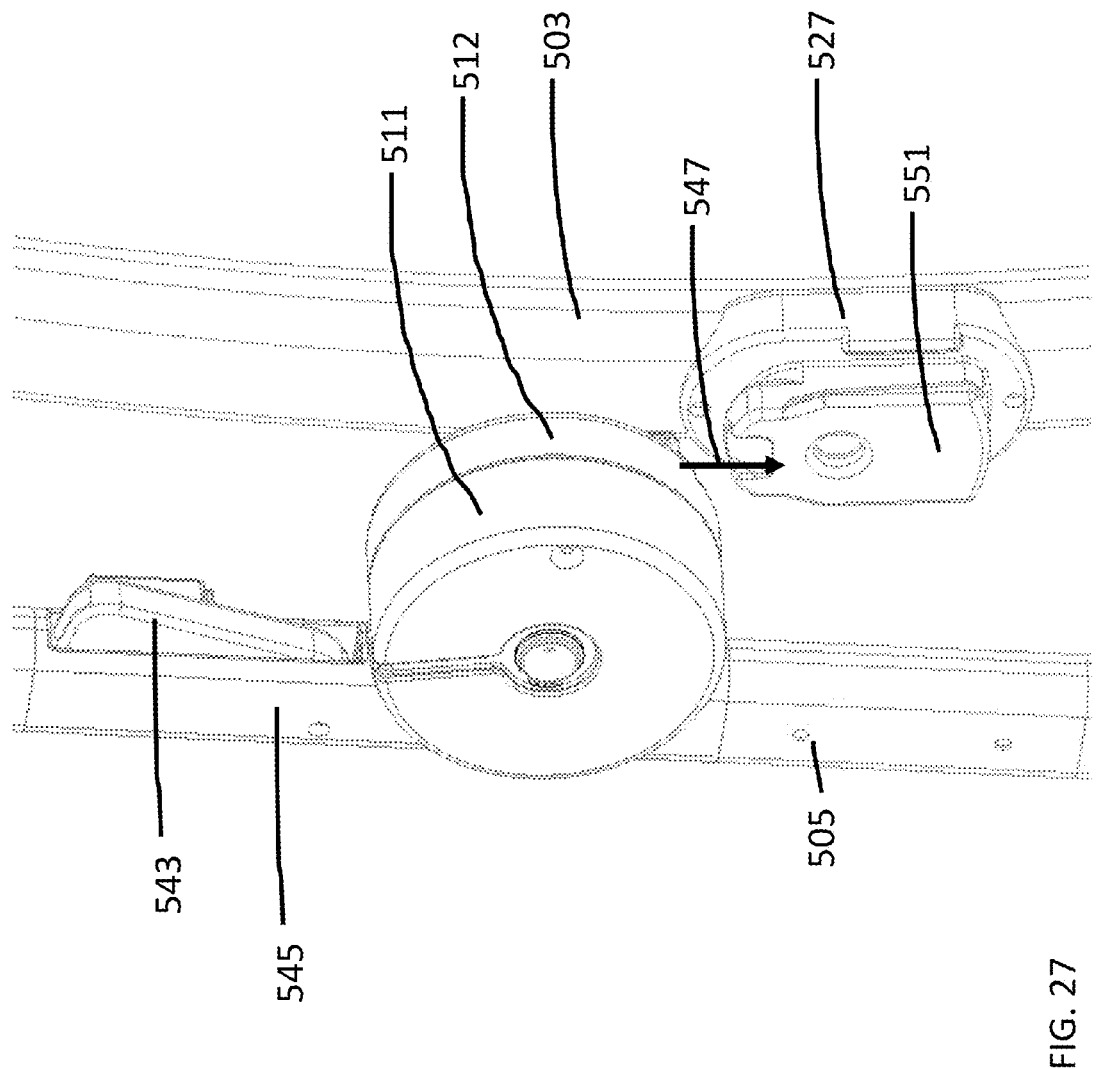
FIG. 27 illustrates means for attachment of a second seat to a second frame member of the stroller system of FIG. 16.
Figure 28:
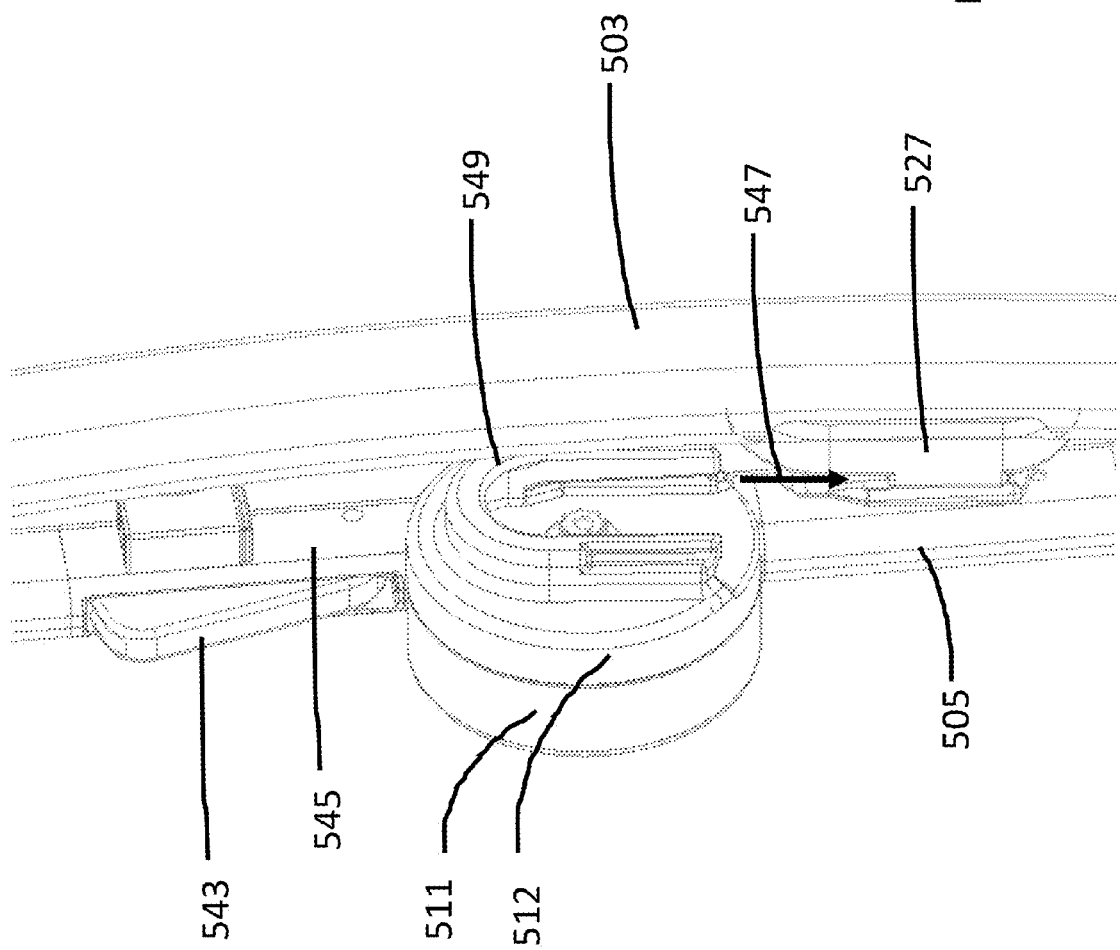
FIG. 28 illustrates an alternative perspective view of the attachment means depicted in FIG. 27.

The seat-frame locking mechanism 515 referenced in FIG. 21 is illustrated in further detail in FIGS. 27 and 28. The seat-frame locking mechanism 515 is configured to secure the second seat to the second frame member. FIGS. 27 and 28 illustrate portions of the second frame member 503 of the stroller 500 where the second seat 505 is configured to be removably attached to the second frame member 503. In particular, FIG. 27 shows a frame member 545 of the second seat 505, which has a one seat mount pivot module 511. FIG. 27 further depicts a seat mount hub 512 that is integrally connected to a portion of the seat mount pivot module 511 to facilitate mounting of the second seat 505 to the second frame member 503. Each seat mount hub 512 is adapted to be removably mounted to a frame mount hub 527 located on a second frame member 503.

Although only a single seat mount hub 512 and frame mount hub 527 is shown in FIGS. 27 and 28, it is contemplated that two seat mount hubs 512 are located on opposing sides of a second seat 505, which correspond to two frame mount hubs 527 located on opposing sides of the second frame member 503. In the embodiment shown, the seat and frame mount hubs 512, 527 and thus, the seat mount pivots 511 are positioned such that the seat mount pivots 511 are coaxial and each facilitate rotation about the same axis. In the embodiment depicted in FIGS. 27 and 28, the seat mount hub 512 is adapted to slideably engage the frame mount hub 527 by moving the seat mount hub 512 in a direction 547 with respect to the frame mount hub 527 until the seat mount hub 512 is releasably locked into place on the frame mount hub 527.

It is contemplated that engagement of the seat mount hub 512 and frame mount hub 527 will trigger a seat frame locking mechanism 515. The seat frame locking mechanism 515 may utilize a pin 520 as shown in FIG. 21. The pin 520 can be spring loaded such that it is predisposed to remain in a deployed state. When the seat mount hub is slidably placed into the frame mount hub, the pin 520 may retract slightly to allow the seat mount hub 512 to slide relative to the frame mount hub 527, and snap to a locked position within the frame mount hub 527 once the seat mount hub 512 has slid to a intermediate or final position of the frame mount hub 527 (shown in FIG. 27). Once the pin 520 has locked within the receiving cavity of frame mount hub, the pin 520 prevents the seat mount hub 512 from moving with respect to the frame mount hub 527, thus preventing inadvertent detachment of the structures. Alternatively, the seat mount hub 512 may be attached in another manner to the frame mount hub 527, such as through a friction fit, threaded nuts or some other attachment means.

As illustrated in FIG. 27 an actuator 543 is positioned on a frame member 545 of the second seat 505 and configured to operate the locking mechanism by depressing the actuator 543. In the embodiment shown, the locking mechanism is biased (via a spring or other biasing member) to lock the seat mount hub 512 to the frame mount hub 527 when they are engaged. Like the locking mechanism, the actuator 543 is biased in a raised position, such that depressing the actuator 543 towards the frame member 545 of the second seat 505 releases the locking mechanism, thereby facilitating removal of the second seat 505 from the second frame member 503.

In the embodiment shown, the actuator 543 is located proximate to the seat mount hub 512. Alternatively, the actuator 543 may be located in any location along the second seat 505. The seat-frame locking mechanism 515 may be a cable-spring-pin system where an actuator engages a cable to release a pin 520. The cable of the locking mechanism may be connected to the actuator 543. Alternative embodiments of the locking mechanism may include, but are not limited to, flexible plastic materials instead of a cable. Alternative embodiments may also comprise suitable alternatives to the cable-spring-pin locking system. The actuator 543 may be a lever, button or any other suitable devices. FIG. 28 further illustrates the coupling between the second frame member 503 and the second seat 505 from a different perspective view, showing a "female" portion of the seat mount hub 512 adapted to accept the "male" portion of the frame mount hub 527. In one embodiment, the frame mount hub 527 and/or the seat mount hub 512 may designed to be of symmetrical shape such that the same second seat 505 may be attached such that it faces the front end or back end of the stroller. As illustrated here, the seat mount hub 512 has a substantially u-shaped member 549, which connects to a member 551 located on the frame mount hub 527. The locking mechanism, which is engaged when each of the at least one frame mount hubs couples corresponding seat mount hubs prevents the removal of the second seat from the second frame member.

Figure 29:
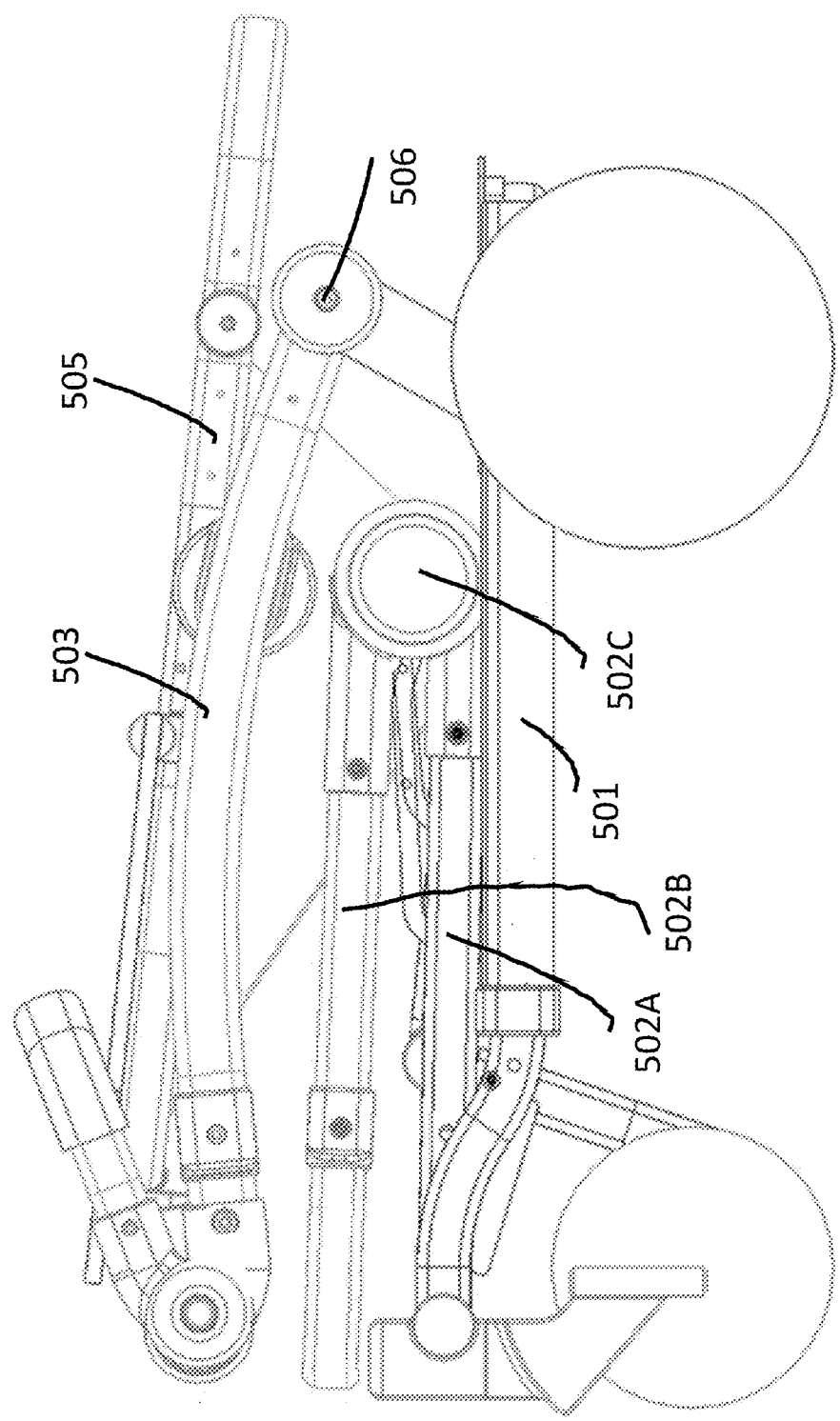
FIG. 29 illustrates a folded embodiment of the stroller system of FIG. 16.
Figure 30:
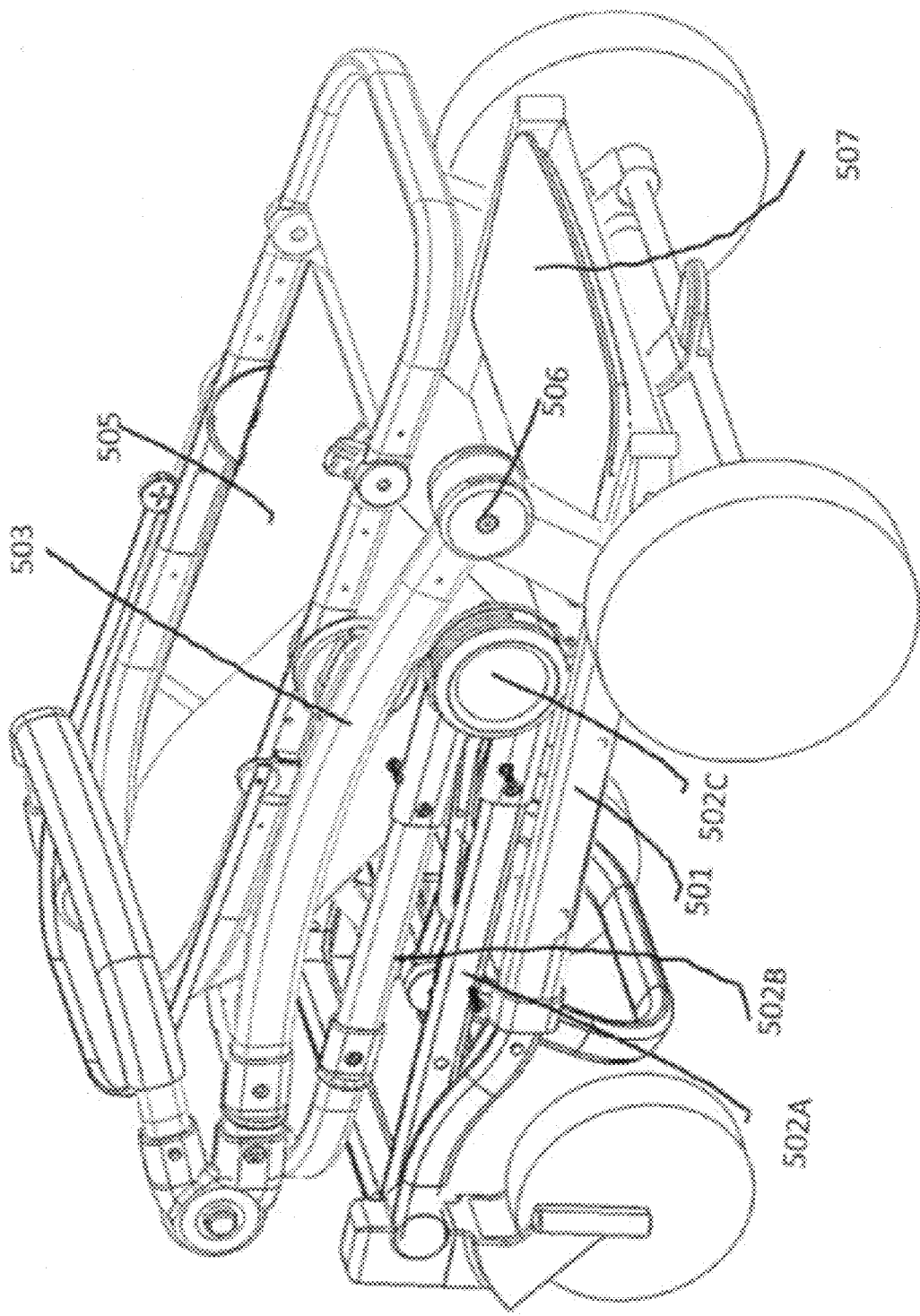
FIG. 30 illustrates a perspective of the stroller system depicted in FIG. 29.

FIGS. 29 and 30 illustrate the stroller in a folded or stowed configuration. The first frame member 502 further having a top first frame member 502B and a bottom first frame member 502A, which fold with respect to each other about a pivot joint 502C located on the first frame member. The first frame member 502 folds independently of the second frame member 503 to a state where the folded first frame member is substantially parallel to the expandable base member 501. As shown here, the expandable base member 501 is fully retracted. The second frame member 503 pivotally folds with respect to the expandable base member around a pivot joint 506 independently of the first frame member 502. In one embodiment, the second frame member 503 can be folded towards the expandable base member 501 while the second seat 505 is still coupled to the second frame member 503. The second seat 505 is first rotated such that the frame of the second seat 505 is substantially parallel to the second frame member 503 and then folded towards the expandable base member 501 with the second frame member 503. As illustrated, the second seat 505 may be stowed parallel to the second frame member 503 and fit above the first frame member 502 when folded. Alternatively, the second seat may collapse or fold towards the second frame member 503 such that it is planar with and fits within the second frame member 503. And then the collapsed second seat and second frame member 503 structure may be folded towards the expandable base member 501. FIG. 30 provides an alternative view to the stroller in FIG. 29. From the view in FIG. 30, the stroller may be folded while the platform 507 is still connected to a cross-section 508 of the expandable base member 501. Alternatively, the platform 507 may be removed from the stroller system 500 prior to the stroller being folded.

As discussed, the second seat 505 may be removably connected to the second frame member 503 at frame mount hubs 527 located along the second frame member 503. Illustrated in FIG. 31 is the stroller 500 with the second seat 505 removed.

Figure 31:
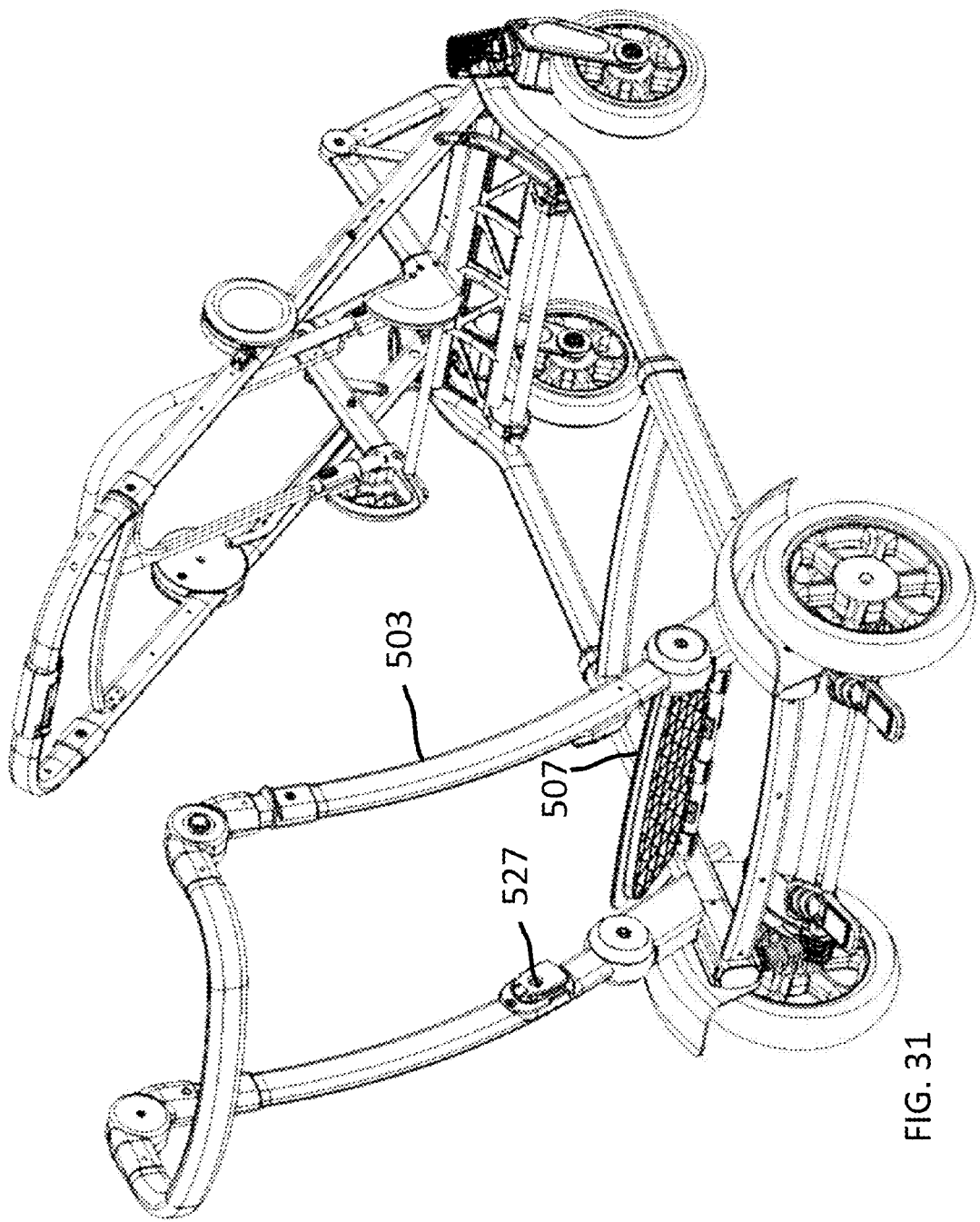
FIG. 31 illustrates an alternative embodiment of a stroller system adapted for attachment of a modular second seat or bench seat.

While the second seat in FIGS. 16-30 was illustrated as a modular rear seat with a seat bottom and seat back, as will be illustrated in FIGS. 32-39 the stroller 500 may utilize a jump seat or bench seat, which attaches to the frame mount hub 527 of the second frame member 503 to provide rear seating (as shown in FIG. 31).

In particular, FIGS. 32-39 are related to an embodiment of the stroller 500 comprising an expandable base member with a first peripheral end and a second peripheral end. In this embodiment, a first frame member may be pivotally connected to the expandable base member near the first peripheral end. The first frame member may be configured to contain means for retaining a first seat. A second frame member 503 comprising at least one frame mount hub 527 may also be pivotally connected to the expandable base member near the second peripheral end. The first frame member and the second frame member may be configured to fold independently of each other. A bench seat comprising at least one seat mount hub may be removably connected to the second frame member by way of each of the at least one frame mount coupling with a corresponding seat mount hub.

Figure 32B:
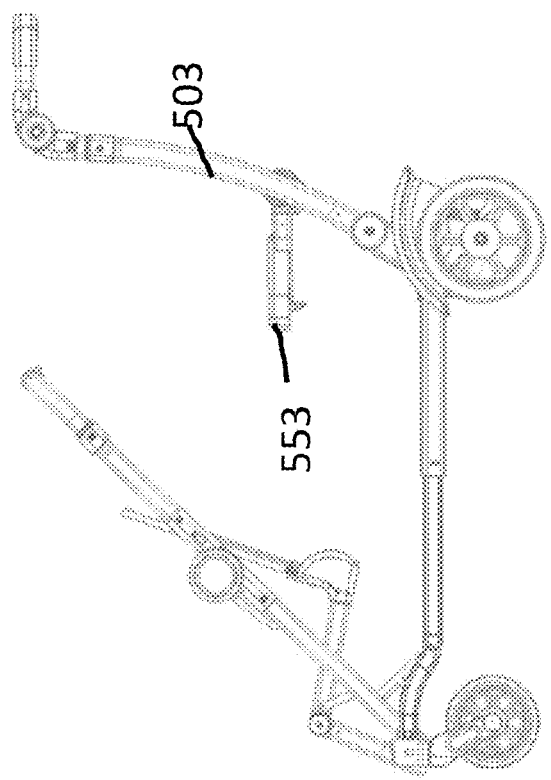
FIG. 32B illustrates a side view of the stroller system depicted in FIG. 31, having a bench seat in a deployed position.
Figure 32A:
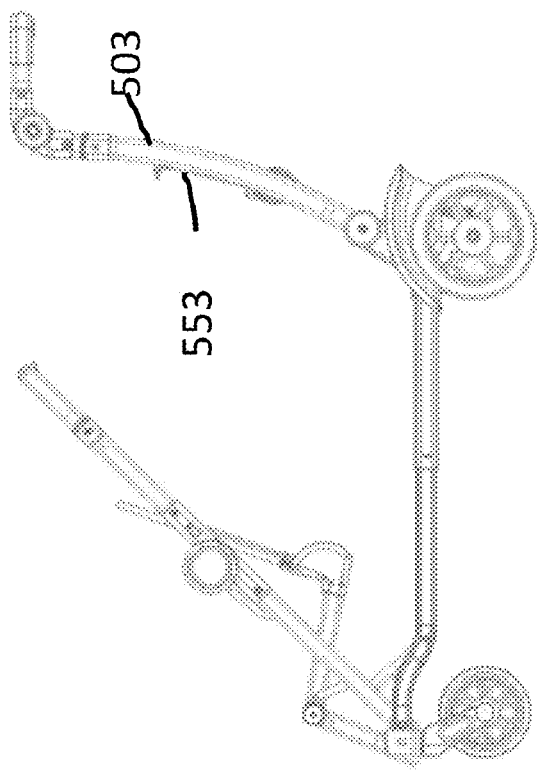
FIG. 32A illustrates a side view of the stroller system depicted in FIG. 31, having a bench seat in a stowed position.
Figure 33B:
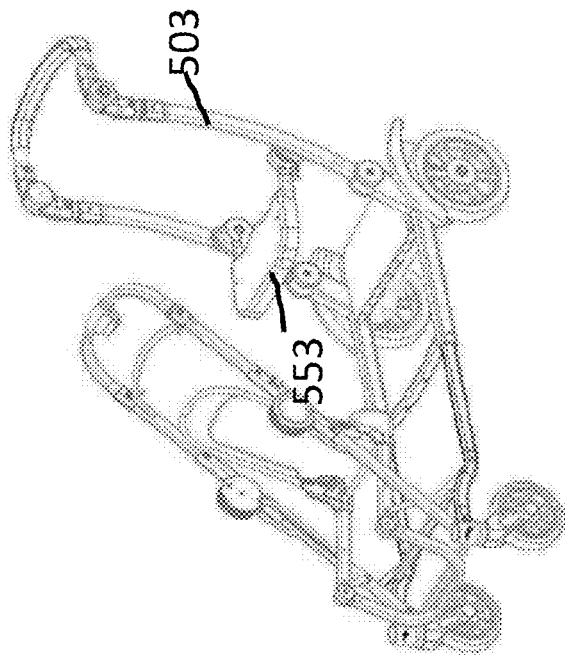
FIG. 33B illustrates a perspective view of the stroller depicted in FIG. 32B, having a bench seat in a deployed position.
Figure 33A:
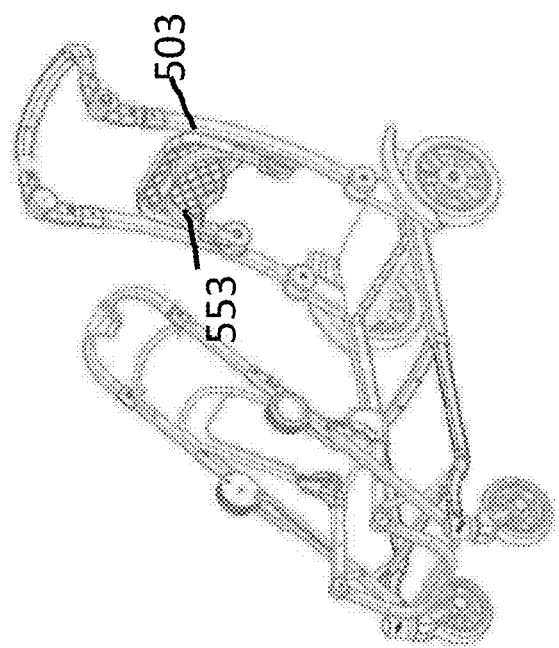
FIG. 33A illustrates a perspective view of the stroller depicted in FIG. 32A, having a bench seat in a stowed position.

FIGS. 32A and 32B provide a side view of the stroller system 500 with a bench seat 553. FIGS. 33A and 33B provide a front perspective view of the same stroller system 500 with a bench seat 553. As illustrated in FIGS. 32A and 33A a bench seat 553 may be mounted to the second frame member 503. As shown here, the bench seat 553 may be configured such that it may rotate from a stowed position where it is substantially parallel to the second frame member 503, as is shown in FIGS. 32A and 33A, to a deployed position where the bench seat 553 is substantially parallel to the expandable base member 501, as is shown in FIGS. 32B and 33B. The bench seat 553 may be placed in the stowed configuration, seen in FIGS. 32A and 33A, for example, when the stroller is used for a single occupant (in the first seat) and/or extra storage space is necessary. The bench seat 553 may also be placed in the stowed configuration seen in FIGS. 32A and 33A in preparation for folding the stroller. The bench seat 553 may be placed in the deployed configuration seen in FIGS. 32B and 33B, when for example, a second occupant is being transported by the stroller. Optionally, the bench seat 553 may be used as an elevated platform upon which a user places cargo.

Figure 34:
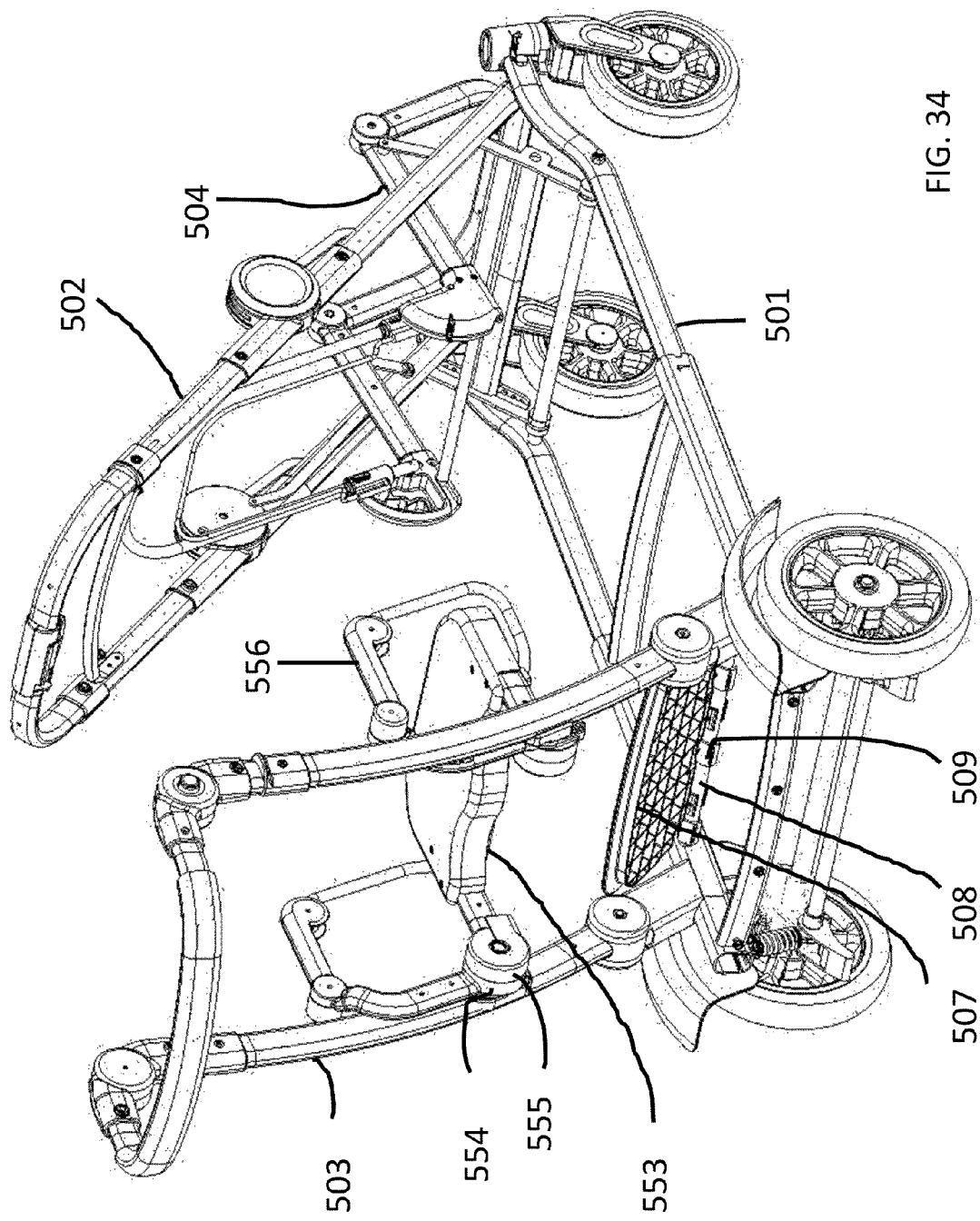
FIG. 34 illustrates a stroller system having a bench seat with secondary support structures.

Optionally, as shown in FIGS. 34-39, a secondary support structure 556 may be connected to the bench seat 553. As illustrated in FIG. 34, the secondary support structure 556 may be used as an arm rest by the passenger in the bench seat 553. The secondary support structure 556 connects to the bench seat 553 and to the bench seat mount 554. The bench seat mount 554 connects to the frame mount hub 527 (not shown; see FIG. 31) of the second frame member 503. The bench seat mount 554 is also connected to the bench seat pivot 555. As will be discussed in reference to FIG. 37, the bench seat pivot 555 is configured to rotate with respect to the bench seat mount 554.

Figure 35:
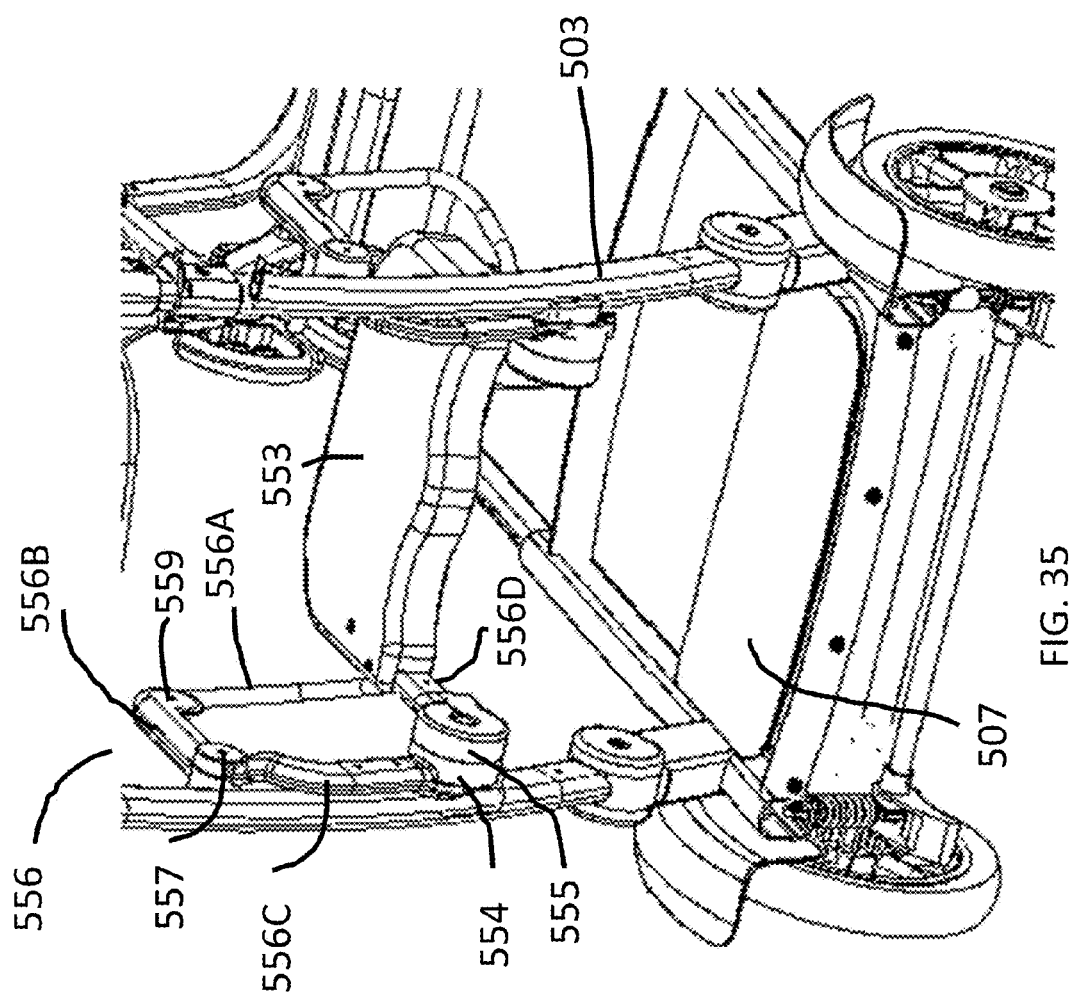
FIG. 35 illustrates a rear perspective view of the bench seat of FIG. 34.

FIG. 35 further illustrates the components of the secondary support structure 556. As shown here, the bench seat mount 554 may connect to a first support member 556C, which is pivotally connected to a horizontal member 556B via a pivot joint 557. The horizontal member 556B is pivotally connected via pivot joint 557 to the first support member 556C at a first peripheral end of the horizontal member near the rear of the stroller. The horizontal member 556B is also pivotally connected via pivot joint 559 to a second support member 556A at a second peripheral end of the horizontal member near the front of the stroller. The other end of the second support member 556A is pivotally connected via a pivot joint 561 to the bench seat 553 at a location on the lower surface of the bench seat (see FIG. 36B). The secondary support structure 553 may form a four-bar-linkage mechanism that can be folded.

Figure 36B:
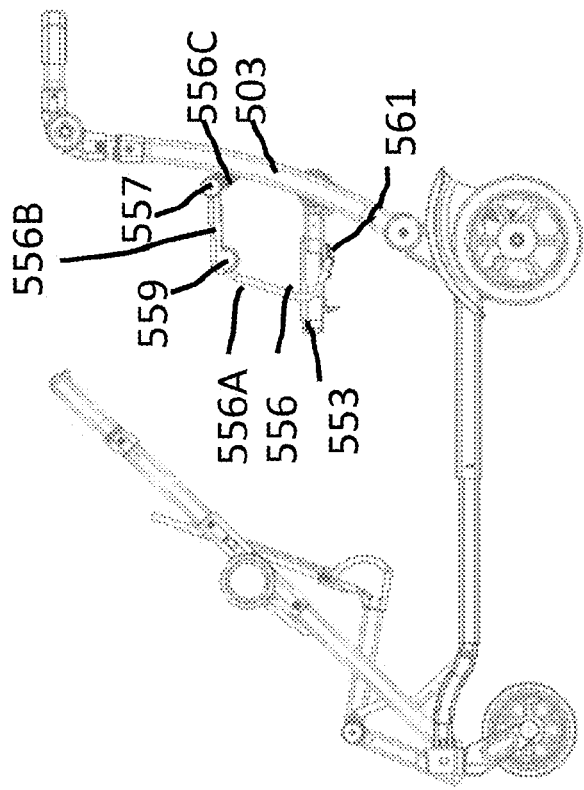
FIG. 36B illustrates a side view of the stroller system with a bench seat with secondary support structures (as depicted in FIG. 34) in a deployed position.
Figure 36A:
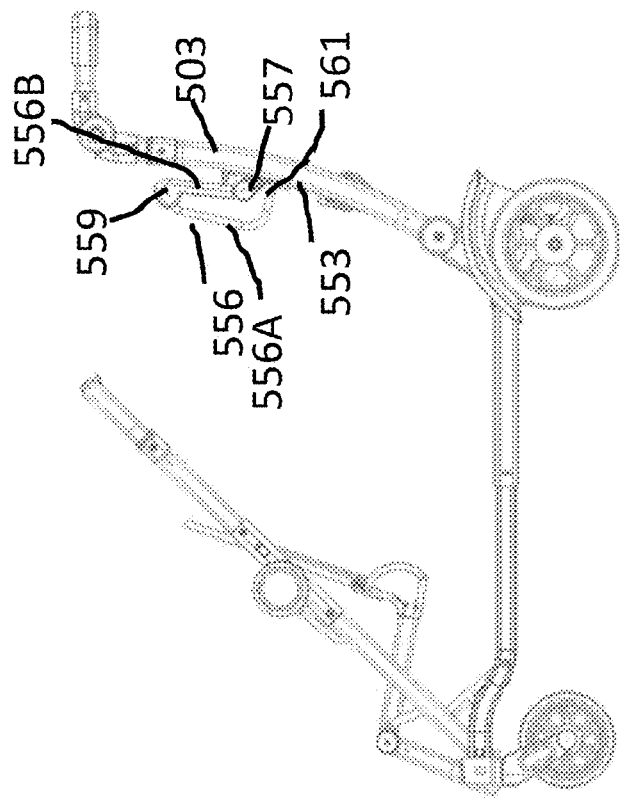
FIG. 36A illustrates a side view of the stroller system with a bench seat with secondary support structures (as depicted in FIG. 34) in a stowed position.

As illustrated by FIGS. 36A and 36B the secondary support structure 553 may be folded from a first stowed position, as is shown in FIG. 36A to a second, deployed position, as is shown in FIG. 36B. When folding from a deployed state (FIG. 36B) to a stowed state (FIG. 36A) the bench seat 553 may be folded such that it is coplanar with the second frame 503. In one embodiment, the first support member 556C may remain in substantially the same position in both the stowed and deployed states. The horizontal member 556B is configured to pivot about the pivot joint 557 in a generally upward direction such that the second peripheral end of the horizontal member moves towards the second frame member 503 to a configuration where the horizontal member 556B is substantially parallel to the second frame member 503. The second support member 556A, which is connected to the horizontal member 556B at pivot joint 559 and the bench seat 553 at pivot joint 561 moves with the horizontal member 556B and bench seat 553 to a folded position in which it is also substantially parallel to the second frame member 503.

Figure 37:
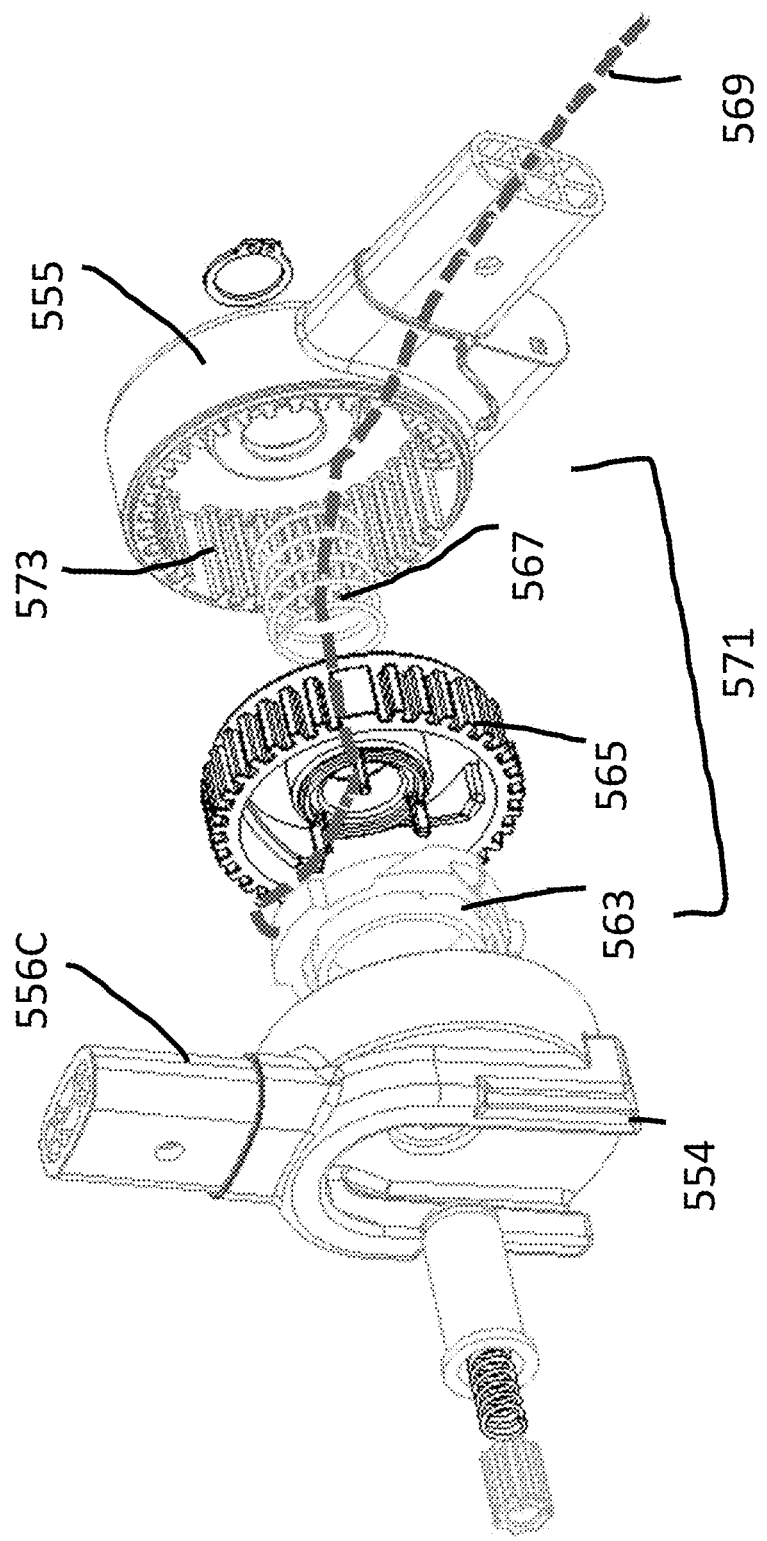
FIG. 37 illustrates an exploded view of the seat mount hub and seat mount pivot for pivoting the bench seat depicted in FIGS. 34-36B.

As discussed, the bench seat 553 is configured to rotate from a substantially horizontal position where it is parallel to the expandable base member 501 to a substantially vertical position where it is parallel to the second frame member 503. The pivoting mechanism is illustrated in FIG. 37, in particular, cable routing configured to retract the pin 568 which locks the seat mount hub to the frame mount hub is shown. Shown is the bench seat mount hub 554, which is connected to the first support member 556C of the secondary support structure 556. As mentioned previously the bench seat mount pivot 555 is configured to rotate about the bench seat mount hub 554. Accordingly, the two elements are connected via an interlocking spring loaded system 571 comprising a gear positioner 563, interlocking gear 565, spring 567, and cable 569. The interlocking spring loaded system 571 shown here is substantially similar to that discussed in relation to the interlocking gear 513 and first pivot locking mechanism 516 of the modular rear seat in FIG. 21. A cable 569 is used to modulate the gear positioner 563, which adjusts the position of the interlocking gear 565 with respect to the interior notch structure 573 of the bench seat mount pivot.

Figure 38B:
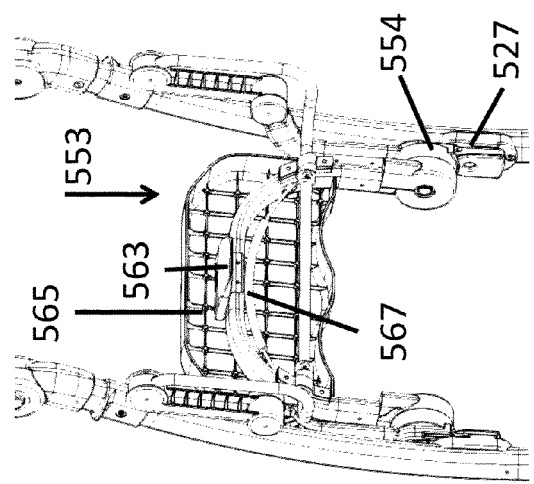
FIG. 38B illustrates a perspective view of the actuator mechanism for releasing a secondary seat (bench seat) and/or pivoting the secondary seat (bench seat) in a second position.
Figure 38D:
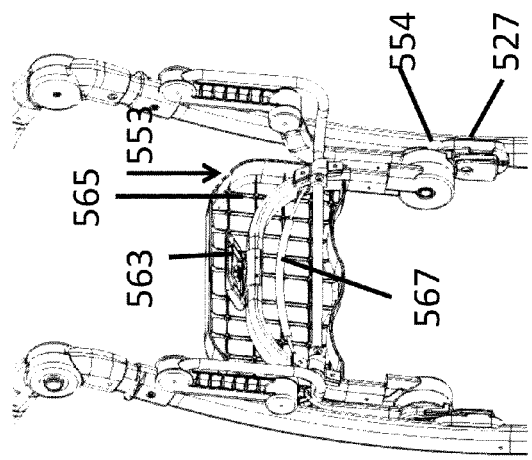
FIG. 38D illustrates a perspective view of the actuator mechanism for releasing a secondary seat (bench seat) and/or pivoting the secondary seat (bench seat) in a fourth position.
Figure 38A:
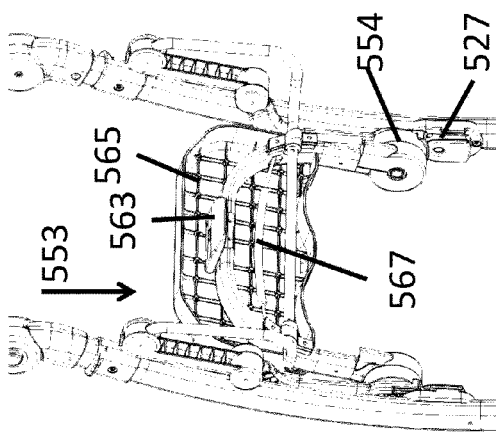
FIG. 38A illustrates a perspective view of the actuator mechanism for releasing a secondary seat (bench seat) and/or pivoting the secondary seat (bench seat) in a first position.
Figure 38C:
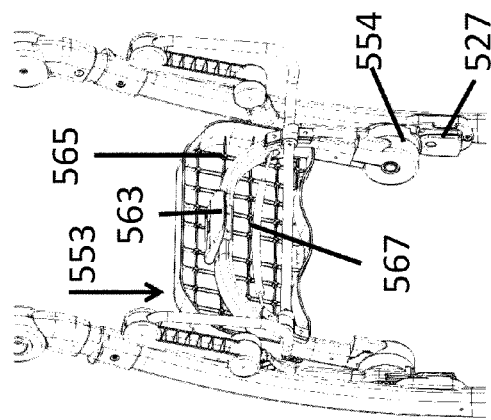
FIG. 38C illustrates a perspective view of the actuator mechanism for releasing a secondary seat (bench seat) and/or pivoting the secondary seat (bench seat) in a third position.

As illustrated in FIG. 38A-D, the cable 569 may be connected to a bench seat deploy actuator 563 located on the bottom surface of the bench seat 565 biased in a locked position that holds the bench seat 553 in a stowed position and prevents it from deploying. In order to rotate the bench seat 553 to the deployed position (as discussed in reference to FIGS. 32B, 33B, 34, 35, 36B) the bench seat deploy actuator 563 must be engaged. As illustrated, in one embodiment the bench seat deploy actuator 563 may be an ergonomically positioned handle. As illustrated in FIG. 38D, in such an embodiment, the bench seat deploy actuator may be engaged by lifting the handle towards the bottom surface of the bench seat 565.

In addition to the bench seat deploy actuator 563 the bench seat 553 may also contain a bench seat lift actuator 567. As discussed previously, the bench seat 553 may be removably coupled to the second frame member 503 by one or more bench seat mount hubs 554 connecting to one or more frame mount hubs 527. Similar to the mechanism described in relation to the modular rear seat in FIGS. 27 and 28, the bench seat mount hubs 554 may be adapted to slideably engage the frame mount hubs 527 by moving the bench seat mount hubs 554 in the direction of the frame mount hubs 527 until the bench seat mount hubs 554 are releasably locked into place on the frame mount hubs 527. It is envisioned that an engagement of the bench seat mount hub 554 and frame mount hub 527 will trigger a locking mechanism, which prevents the bench seat mount hub 554 from moving with respect to the frame mount hub 527, thus preventing inadvertent detachment of the structures. Alternatively, the bench seat mount hub 554 may be attached in another manner to the frame mount hub 527, such as through a friction fit, threaded nuts or some other attachment means.

As illustrated in FIG. 38A-D a bench seat lift actuator 567 is a cable positioned on the lower surface of the bench seat 565. As illustrated in 38B, the bench seat lift actuator 567 (shown here as a cable) may be lifted in a generally upwards direction towards the bench seat deploy actuator 563 In the embodiment shown, the locking mechanism is biased (via a spring or other biasing member) to lock the bench seat mount hub 554 to the frame mount hub 527 when they are engaged. Like the locking mechanism, the bench seat lift actuator 567 is biased such that lifting the bench seat lift actuator 567 cable releases the locking mechanism, thereby facilitating removal of the bench seat 553 from the second frame member 503. In the embodiment shown, the bench seat lift actuator 567 is located below the bench seat 553. Alternatively, the bench seat lift actuator 567 may be located in any position along the bench seat or at the nexus of the frame mount hub 527 and bench seat mount hub 554. The locking mechanism may be a cable-spring-pin system where the bench seat lift actuator 567 engages a cable 569 to release a pin. The cable 569 of the locking mechanism may be connected to the bench seat lift actuator 567. Alternative embodiments of the locking mechanism may include, but are not limited to, flexible plastic materials instead of a cable. Alternative embodiments may also comprise suitable alternatives to the cable-spring-pin locking system. The bench seat lift actuator 567 may be a lever, button or any other suitable devices.

As illustrated in FIG. 39, the stroller with a bench seat 553 attached to the second frame member may be folded into a stowable configuration. In the folded configuration of the stroller shown in FIG. 38, the stroller can be folded while the bench seat 553 is still attached to the second frame member. Additionally, in the shown embodiment, the stroller may be folded with the secondary support structure 556 attached. As illustrated, the secondary support structure 556 and bench seat 553 may first be folded towards the second frame member 503 into the stowed configuration shown in FIG. 36A and then the second frame member 503 (with the folded bench seat and secondary structures) may be folded towards the expandable base member. As illustrated, the bench seat 553 is stowed parallel to the second frame member 503 and fits above the first frame member when folded. Thus, the stroller may be compactly folded for stowage without requiring the disassembly of the bench seat 553 and its associated components (the secondary support structure 556). In an alternative embodiment, the bench seat 553 and its associated components may be removed prior to folding the stroller.

Figure 40A:
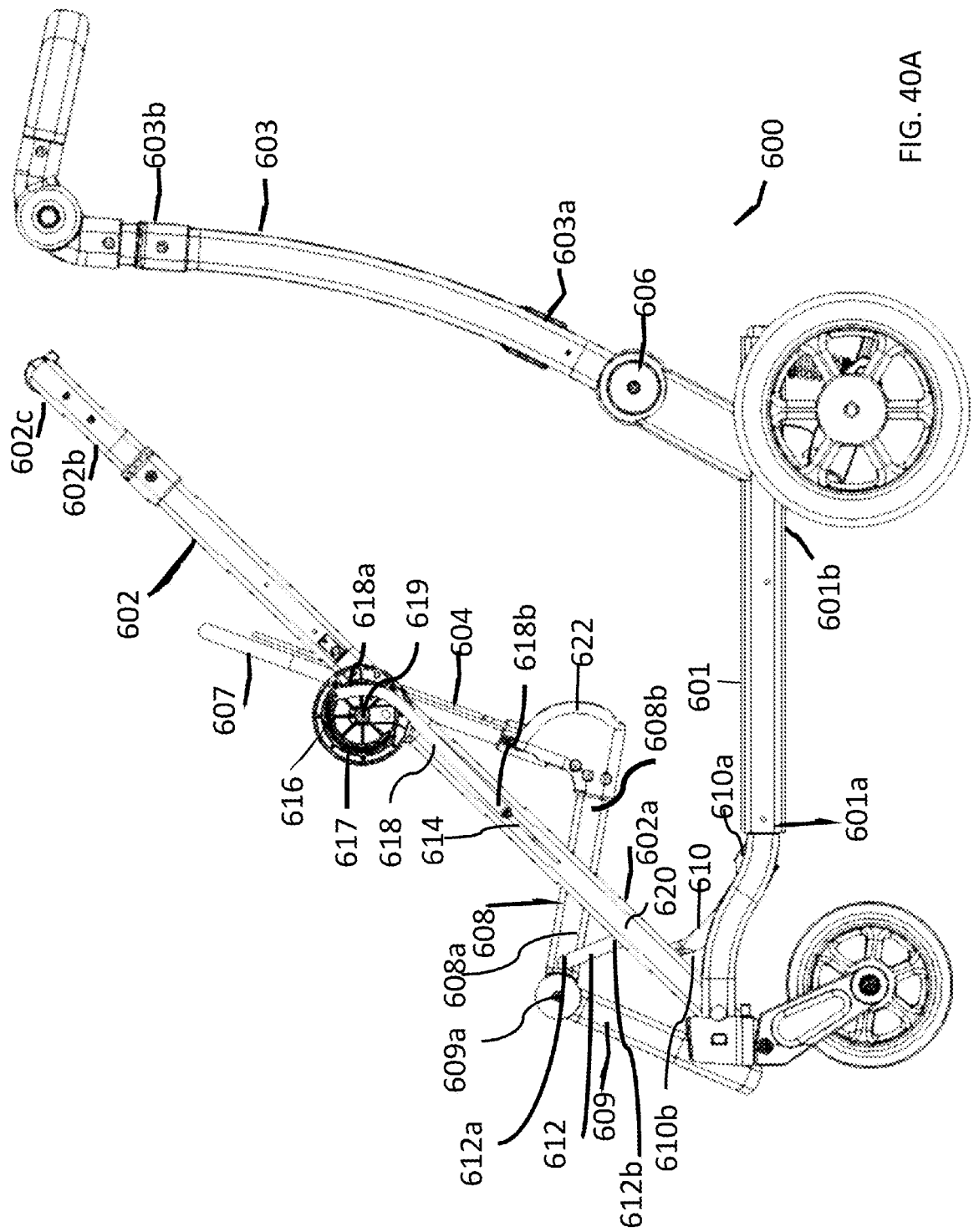
FIG. 40A illustrates a side view of a stroller system with a front seat frame fold mechanism in a first position.

FIGS. 40A-41D illustrate a further embodiment of the stroller 600 with a front seat frame fold mechanism. As illustrated in FIG. 40A, the stroller 600 comprises a base 601 with a first end 601a and a second end 601b. In one configuration, the base 601 may be expandable. A first frame member 602 comprising first 602a and second 602b portions and an elongated portion extending therebetween may be configured to retain a first seat 604. The first frame portion 602a of the first frame member may be pivotally attached to the base proximate the first end 601a of the base. A second frame member 603 comprising a first proximal end 603a and a second distal end 603b may be pivotally attached to the base 601 proximate the second end 601b of the base at a pivot joint 606. A first end 610a of a frame support member 610 may be attached to the base 601 at a point in a rotatable manner at a point between the first 601a and second 601b ends of the base. A second end 610b of the frame support member 610 may be engaged with a hollow void 620 located within the first portion of the first frame member 602a. The void 620 may be of a length equal or greater to the maximum distance traveled by the frame support member 610 along the first portion of the first frame member 602a. In one embodiment, the second end 610b of the frame support member 610 may be at least partially disposed within the void 620, extending through an elongated aperture (not shown) in the first frame member 602a, which preferably extends at least as long as the length of travel of the frame support member along the first frame member 602a. Alternatively, the second end 610b of the frame support member 610 may comprise a tab which engages a portion of link 618 with the void 620. The void 620 may be located along the lower surface of the first frame member and face the base 601. The frame support member 610 may provide adequate support for holding the first frame member 602 substantially upright, as shown in FIG. 40. The first seat 604 may be comprised of a seat back 607, seat bottom 608, and calf support 609. The calf support 609 may be pivotally attached to the seat bottom 608 at an calf support pivot 609a.

Referring now to FIGS. 41A-41D, the seat bottom 608 may be pivotally attached to the seat back 607 utilizing a seat recline mechanism 622. A seat link 612 may have a first end 612a fixedly attached to a location on the seat bottom 608 and a second end 612b fixedly attached to the first frame portion 602a at a pivot point 613. The first seat 604 may be retained within a first frame member comprising a first frame portion 602a, a second frame portion 602b and a connector 616. As illustrated in FIG. 40A, the distal end of the first frame portion 602a and the proximal end of the second frame portion 602b may be connected by a connector 616. The connector may comprise multiple plates. A first portion of the connector may be fixed to the first frame portion 602a and a second portion of the connector may be fixed to the second frame portion 602b. The first and second portions of the connector may be pivotally joined to each other about a pivot point 619, to facilitate rotation of the second frame portion 602b with respect to the first frame portion 602a. The connector 616 may contain a track 617 fixed to the first frame portion 602a. As depicted in FIGS. 40A-40D, a first end of link 618 may be fixed to the second frame portion 602b. A second end of the link 618 may be engaged within an exterior longitudinal void 614 disposed within the first frame portion. The exterior longitudinal void 614 may be located on the exterior side of the first frame portion. In one embodiment, the second end of the link 618b may be fixedly connected to a first end of a support link 626 of fixed length (not shown) which spans the void 620 located within first portion of the first frame member 602a. The second end of the support link 626 may be connected to the frame support member 610. Support link 626 may be a rigid or flexible member. In one embodiment the support link 626 and the link 618 may comprise one unit which travels along a single elongated void present along the first frame portion 602a. Alternatively, the support link 626 and the link 618 may comprise two or more pieces, such as a first link 618, shown exterior to the first frame portion 602a, and a second, internal link (not shown) disposed within the first frame member 602a. In a further embodiment, the second internal link may connect the exterior portion of the link 618 to the support link 626, and slide within the first frame portion 602a as the first seat frame is raised and collapsed. Alternative connectors may be used to facilitate coordinated movement between the link 618 and the support link 626.

FIGS. 40A-40D illustrate a first seat frame fold mechanism. As the distal end 602b of the first frame member (which may comprise an upper arched member 602c) is folded about the connector 616 at the pivot point 619 in a forward direction towards the front end of the stroller 601a the first end of the link 618a is moved along the track 617 towards the first frame member 602a. As illustrated in FIG. 40B, moving the first end of the link 618a along the track 617 towards the first frame member 602a causes the second end of the link 618b to move in a substantially downwards path along the void 614. The movement of the second end of the link 618b downwards along the void 614 may cause the support link 626 to move towards the base along void 620 and the frame support member 610 to pivot in a substantially downwards direction from the first frame member 602, as shown in FIG. 40C.

Figure 40D:
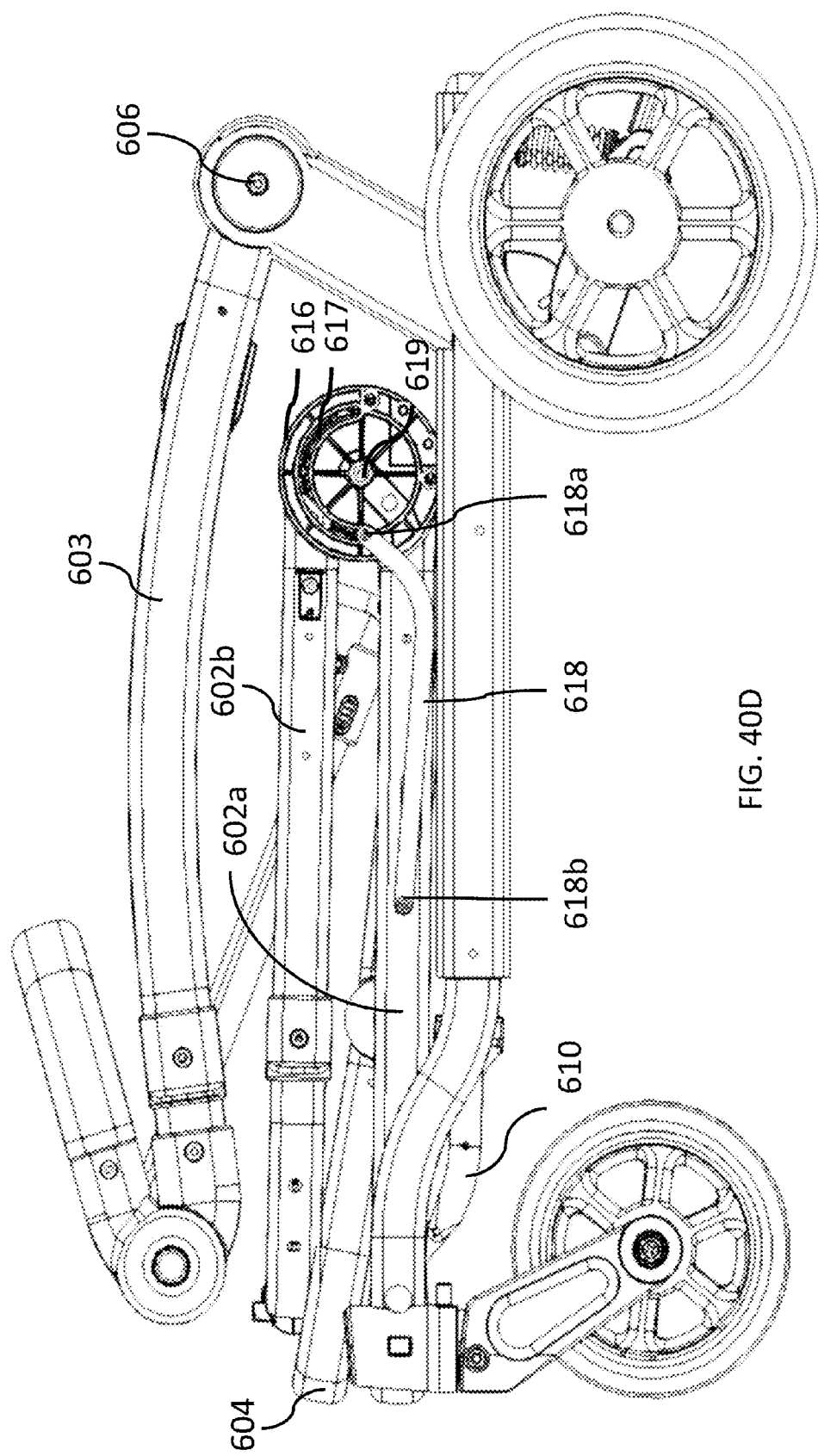
FIG. 40D illustrates a side view of a stroller system (as depicted in FIG. 40A) with a front seat frame fold mechanism in a fourth, fully-folded, position.
Figure 41A:
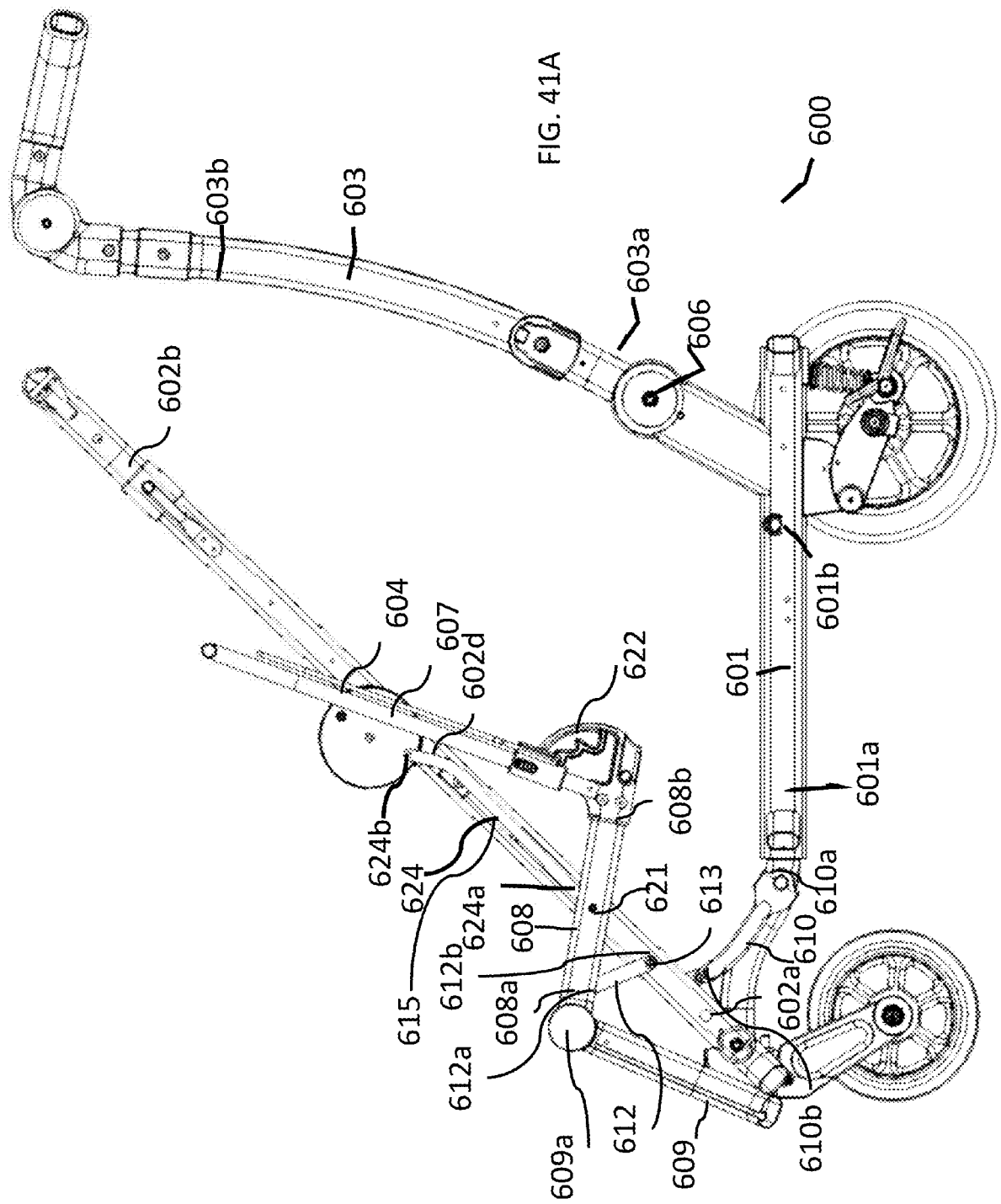
FIG. 41A illustrates a cross-sectional view of the stroller system depicted in FIG. 40A.
Figure 41B:
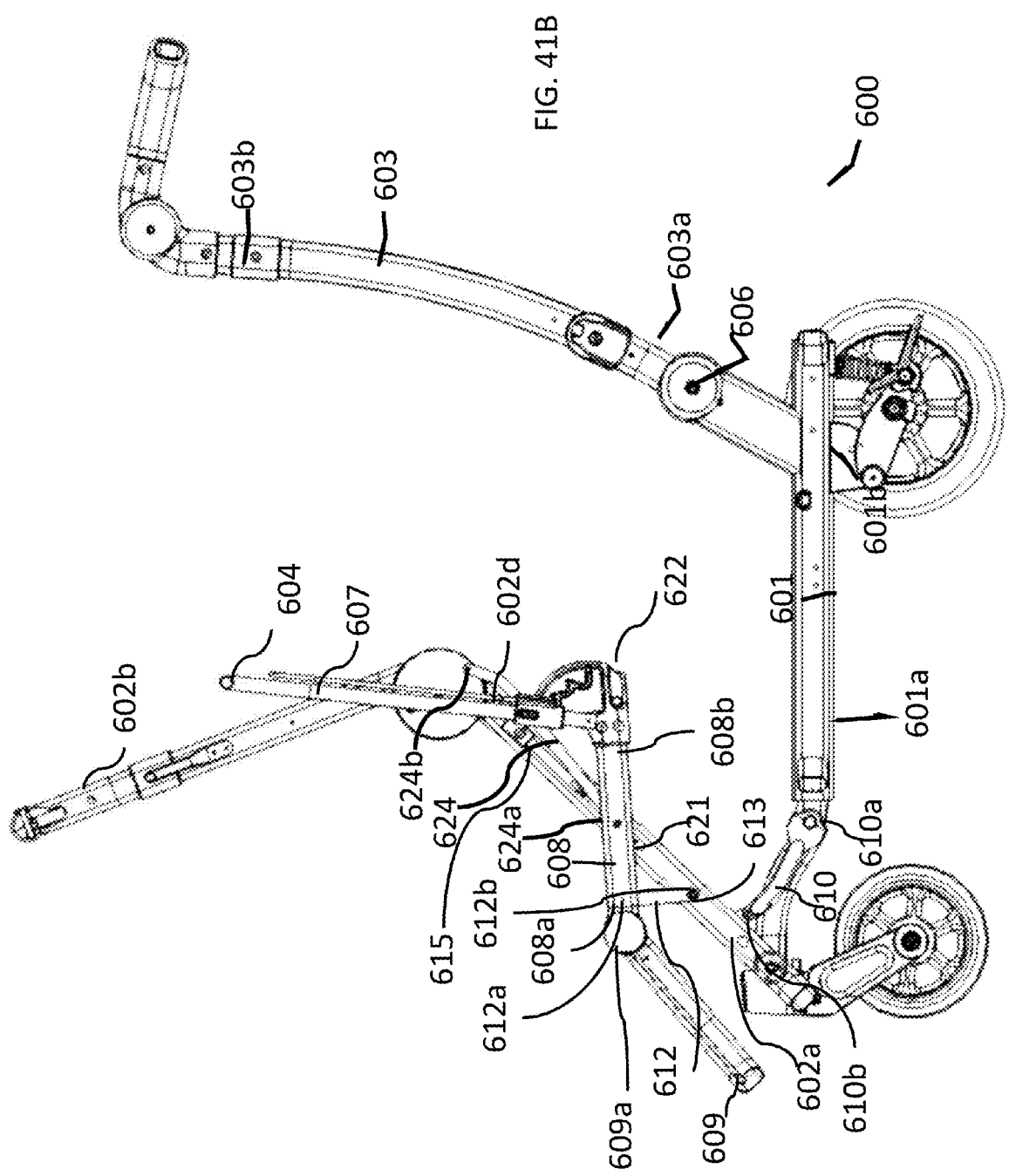
FIG. 41B illustrates a cross-sectional view of the stroller system depicted in FIG. 40B.
Figure 41D:
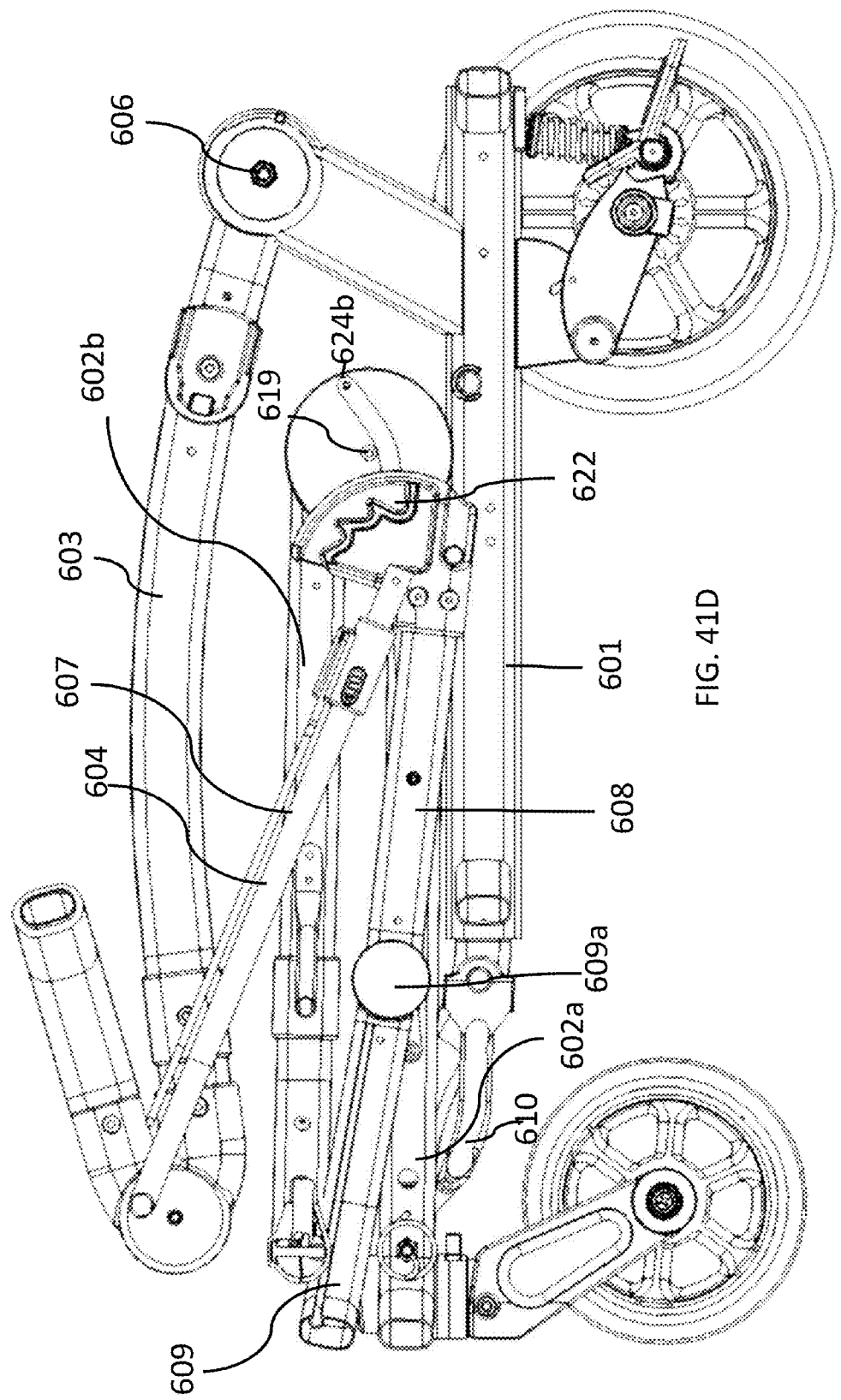
FIG. 41D illustrates a cross-sectional view of the stroller system depicted in FIG. 40D.

As the second distal portion 602b of the first frame member moves to fold upon the first proximal portion of the first frame member 602a, the frame support member 610 pivots downwards such that it is now located generally coplanar to the base 601. This may allow the first portion of the first frame member 602a to move such that the first frame portion 602a and the second frame portion 602b are folded upon each other at the connector 616, such that the second end of the second frame portion 602b is disposed adjacent the first end of the base 601a (as shown in FIG. 40D).

The stroller seat 604 may be adjustable from a first position (shown in FIG. 40A) to a second position (shown in FIG. 40D), with the progression therebetween shown in FIGS. 40B and 40C. In the first position, the seat 604 is deployed such that the seat bottom 608 is positioned to accommodate a user sitting thereon. In a second position, the seat 604 may be folded such that the first frame member 602 is disposed generally parallel to the seat bottom 608. As illustrated in FIGS. 40A-40D, as the stroller is adjusted from the first position to the second position, a seat mount pivot 621 may move along the inner elongated aperture 615 in a direction away from the pivot point of the seat base link 612 and towards the second distal end of the first frame member 602b (see FIGS. 41A-41D). The inner elongated aperture 615 may be located on the interior surface of the frame member. As the seat folds to the second position, the calf support 609 may pivotally move to a position such that it is generally coplanar with the seat bottom 608.

FIGS. 41A-41D provide a cross-sectional view of the stroller illustrated in FIGS. 40A-40D. Accordingly, the positions depicted in FIGS. 41A-D correspond to those illustrated in FIGS. 40A-40D. The cross-section is taken along the longitudinal plane of the stroller, and the observer is positioned on the interior of the stroller facing outwards.

As depicted in FIG. 41A-41D, as the seat frame member folds, so does the seat 604 comprising the seat back 607, seat bottom 608, and calf support 609. The seat 604 may be covered in padded fabric or other soft goods to further define the seat and support a person therein. The seat base 608 may have front 608a and rear 608b ends. The seat back 607 may be pivotally connected to the seat base 608 at the rear end 608b of the seat base at a seat back recline mechanism 622. In one embodiment, the seat back recline mechanism 622 may utilize a hinge. The seat back 607 may be disposed at an angle generally acute to the seat base 608. As illustrated in FIGS. 41A-D, a seat link 612 may have a first end 612a pivotally mounted to the seat bottom 608 and a second end 612b pivotally mounted to the first frame member 602 at a pivot point 613 located between the inner elongated aperture 615 and the first end of the first frame member 602a. The seat 604 may further comprise a seat base pivot 621 mounted to the seat bottom 608 and slideably disposed within the inner elongated aperture 615. A second link 624 (see FIGS. 41A-D) is pivotally attached to the seat base pivot 621 at a first end 624a and pivotally attached to the connector 616 at a second end 624b.

Figure 42:
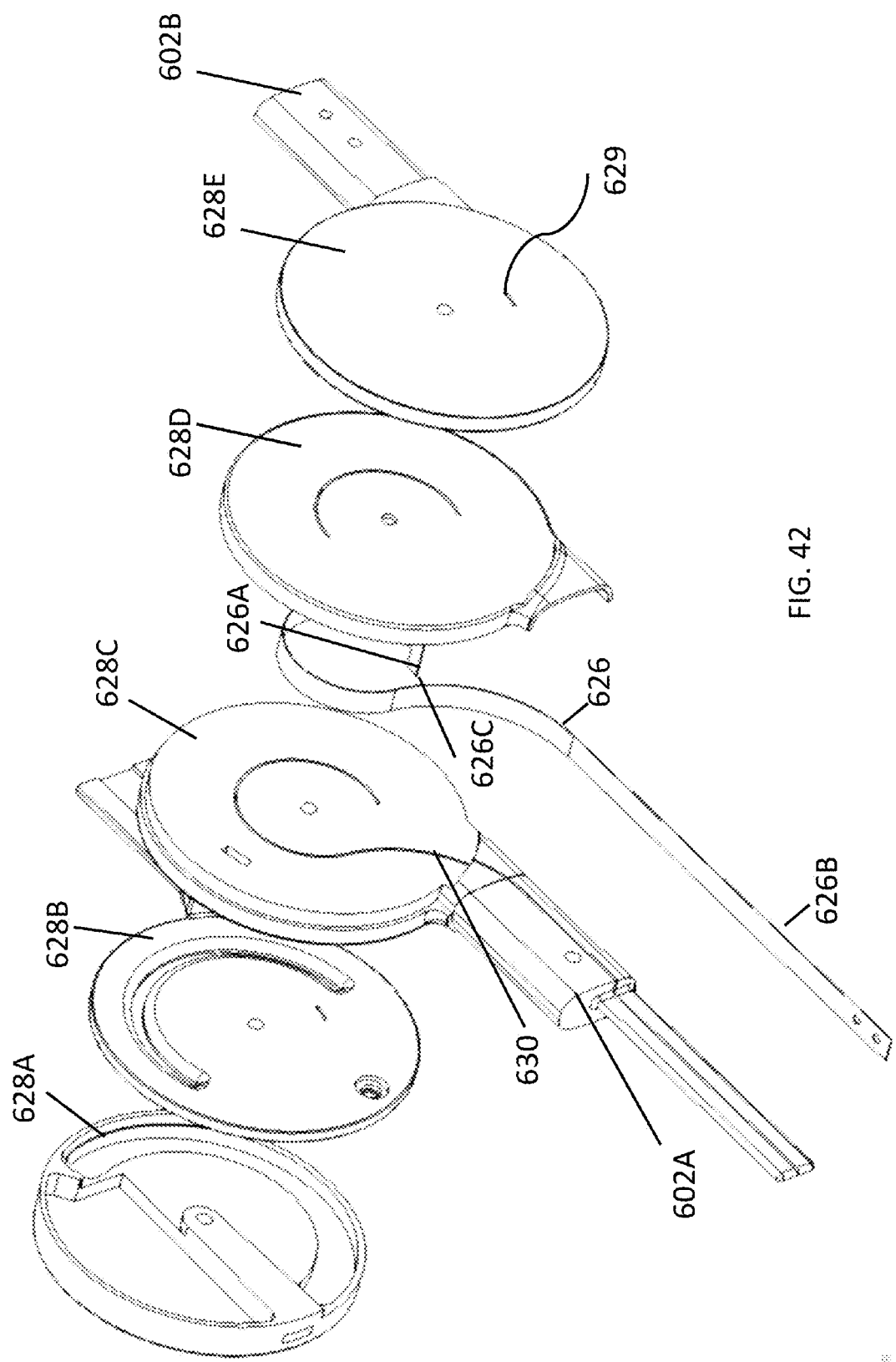
FIG. 42 illustrates an exploded view of a connection hub.
Figure 43:
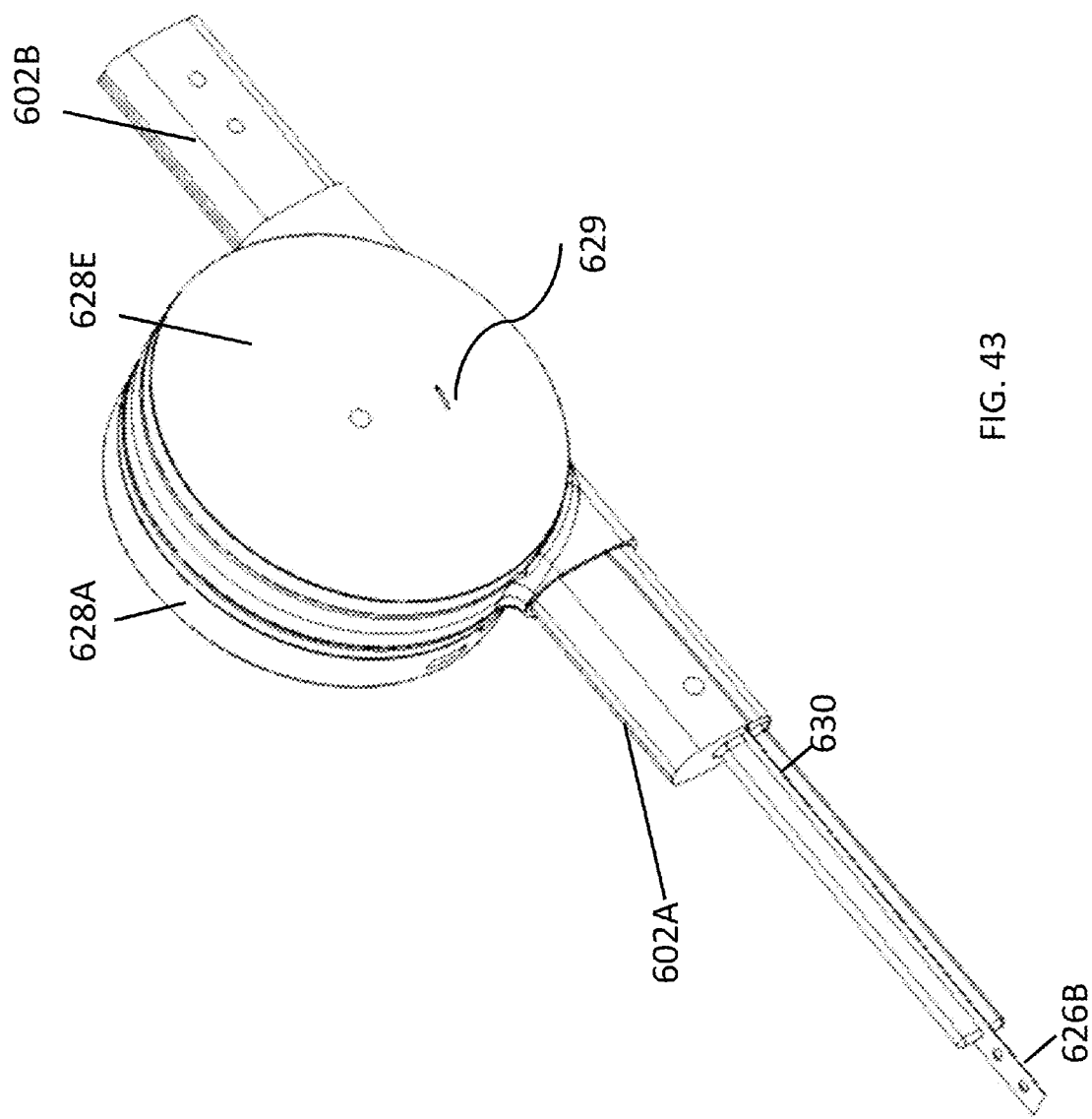
FIG. 43 illustrates a connection hub.
Figure 44:
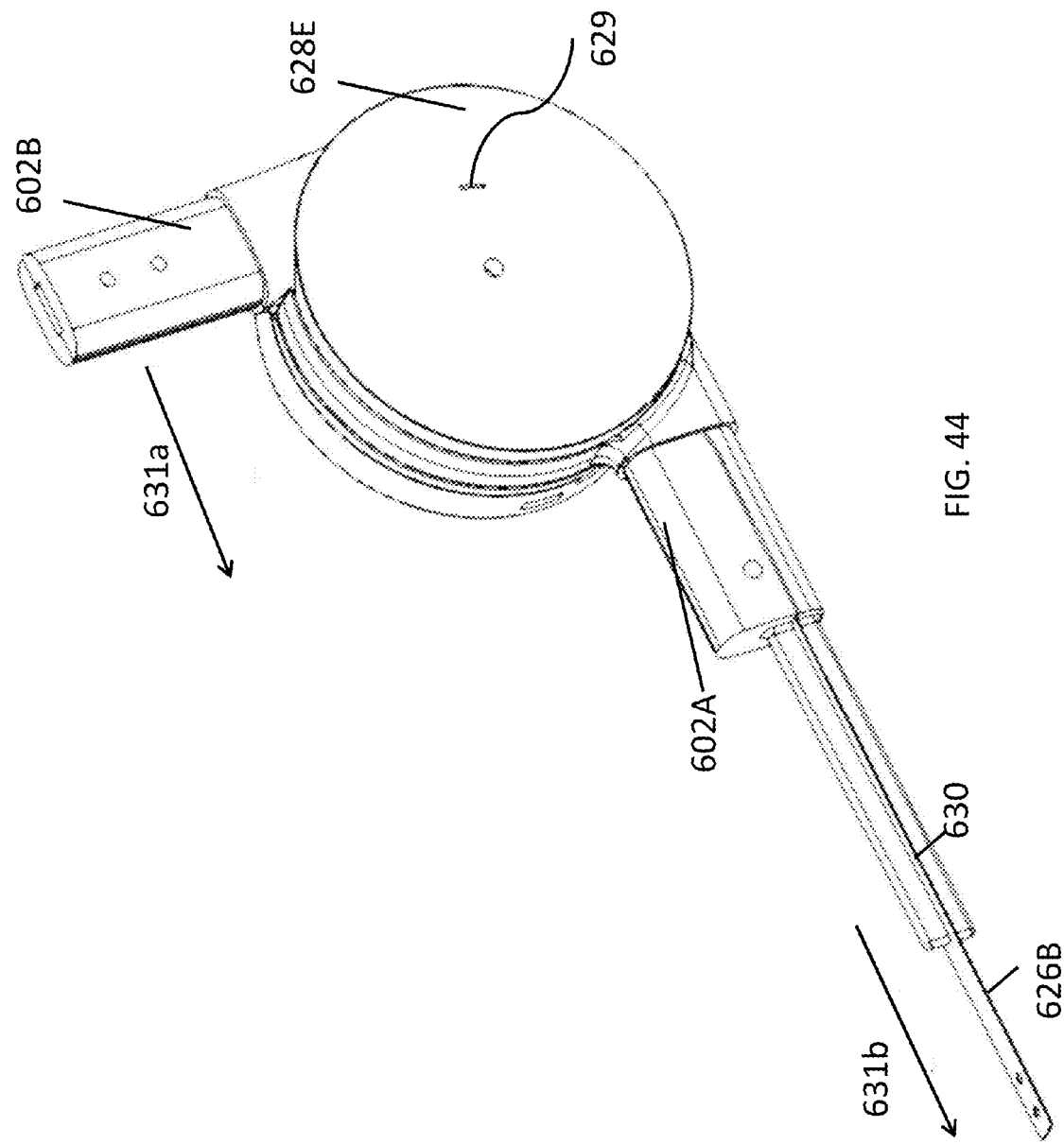
FIG. 44 illustrates a connection hub as the front frame member is folded.

In a further alternative embodiment, as illustrated in FIGS. 42-45, the stroller 600 may comprise a flexible link 626 which facilitates lowering of the frame support member 610 to a position generally parallel to the base member 601 as the seat is folded forward. FIG. 42 provides an exploded view of a connector using a flexible link. The fully assembled connector 616 comprising multiple plates is shown in a non-exploded view in FIG. 43. In this embodiment, the flexible link 626 may comprise a first end 626a mounted to a portion of the connector 616 and a second end 626b disposed within the elongated void 614 of the first portion of the first frame member 602a. In such an embodiment the connector 616 may comprise multiple levels, such as the plates 628a-e configured in a stacked configuration to form the connector 616 when concentrically aligned about an axis of rotation defined by a pivot point 619 and secured, for example by an axis hub, bolt or other structure adapted to facilitate rotation of portions of the connector with respect to each other. The connector plates may have additional functionalities such as connecting to an armrest, tray, or car seat adapter. For example, plates 628a-628b may be used to support an armrest in the upright and collapsed positions of the stroller. As illustrated in FIG. 42, a central plate of the connector 628c may have a track 630 on which the flexible link 626 may be engaged. The first end 626a of the flexible link 626 may have a protrusion 626c, such that the protruding first end 626a does not stay flush within the plate 628c. The protruding first end 626a of the flexible link 626 may be held in a groove 629 on the external plate 628e which is connected to the second portion of the first frame member 602b. The central plate of the connector 628c may be fixed to the lower, first portion of the first frame member 602a. Accordingly, when the second portion of the first frame member 602b is folded forwards 631a towards the first portion of the first frame member 602a, plate 628e rotates with respect to plate 628c and the flexible link 626 moves along the track 630 in a generally downwards direction 631b towards the elongated void on the first portion of the first frame member 602a as illustrated by FIG. 44.

Figure 45:
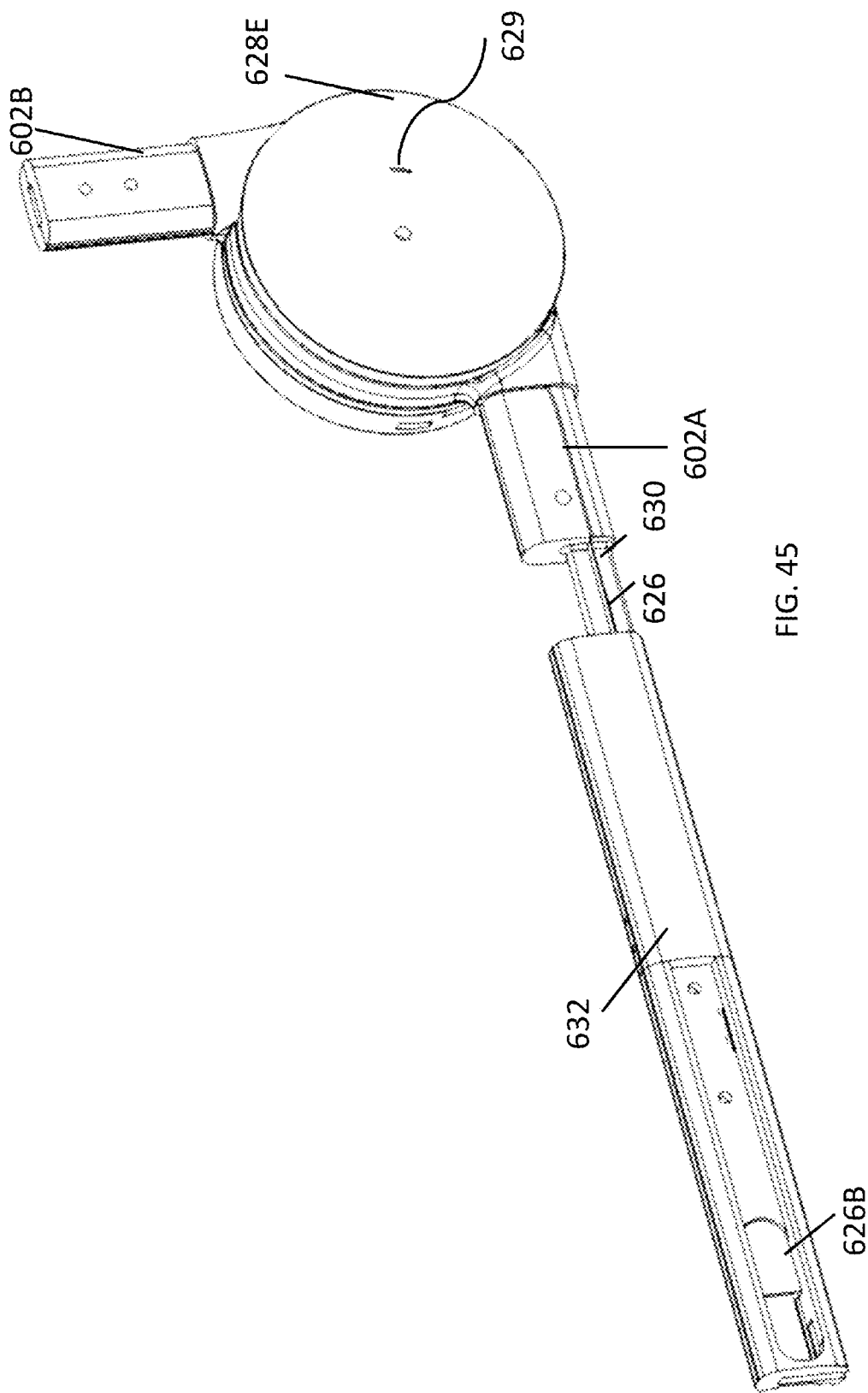
FIG. 45 illustrates the attachment of the connection hub to the second portion of the first frame member.

In the embodiment illustrated in FIG. 45, the second end of the flexible link 626 may be encased by a housing 632 of fixed length which spans the void 620 located within first end of the first frame member 602a. In such an embodiment, when the flexible link 626 moves downwards towards the elongated void in the first portion of the first frame member, the housing 632 helps maintain the flexible link in a generally unbent configuration as it moves downwards and disengages the frame support member.

Figure 46:
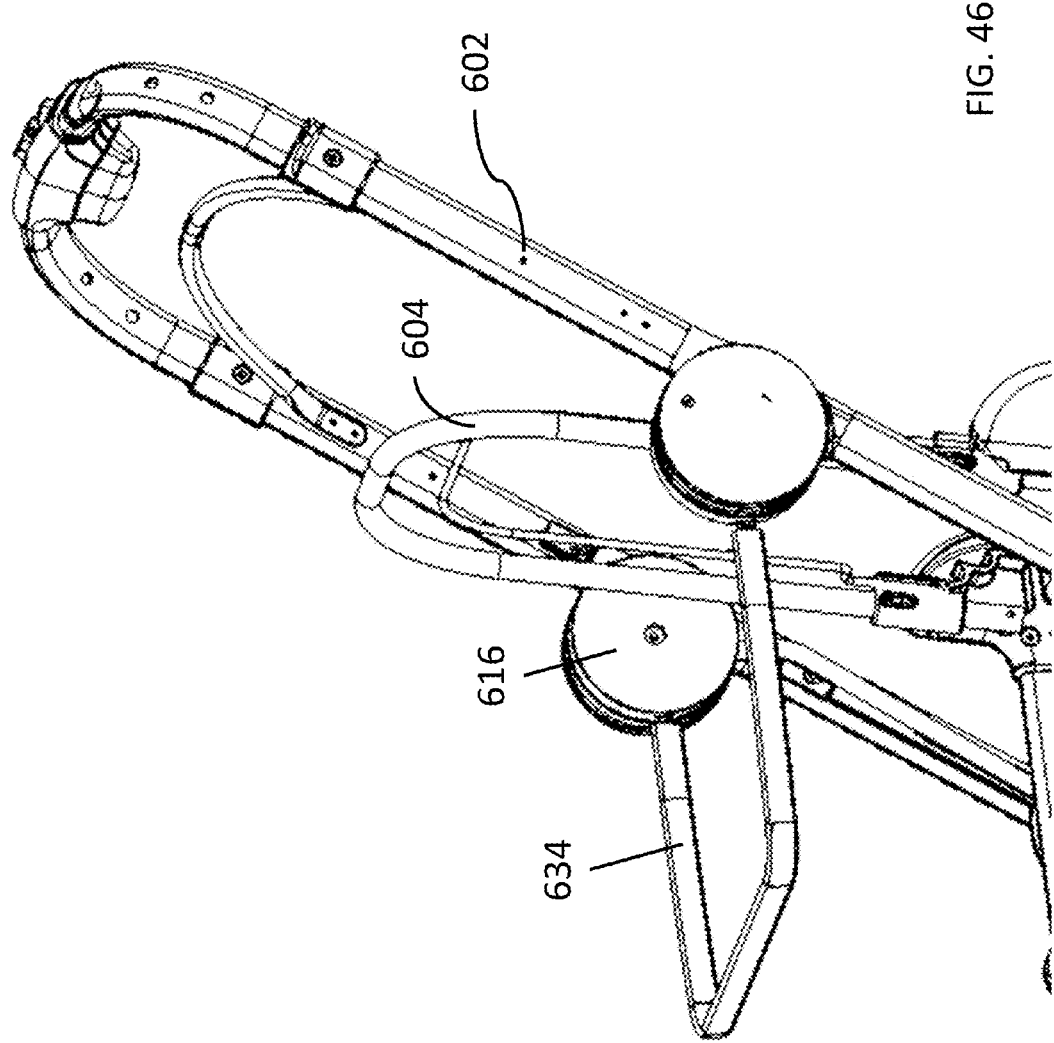
FIG. 46 illustrates an embodiment of the stroller system with an armrest.
Figure 47:
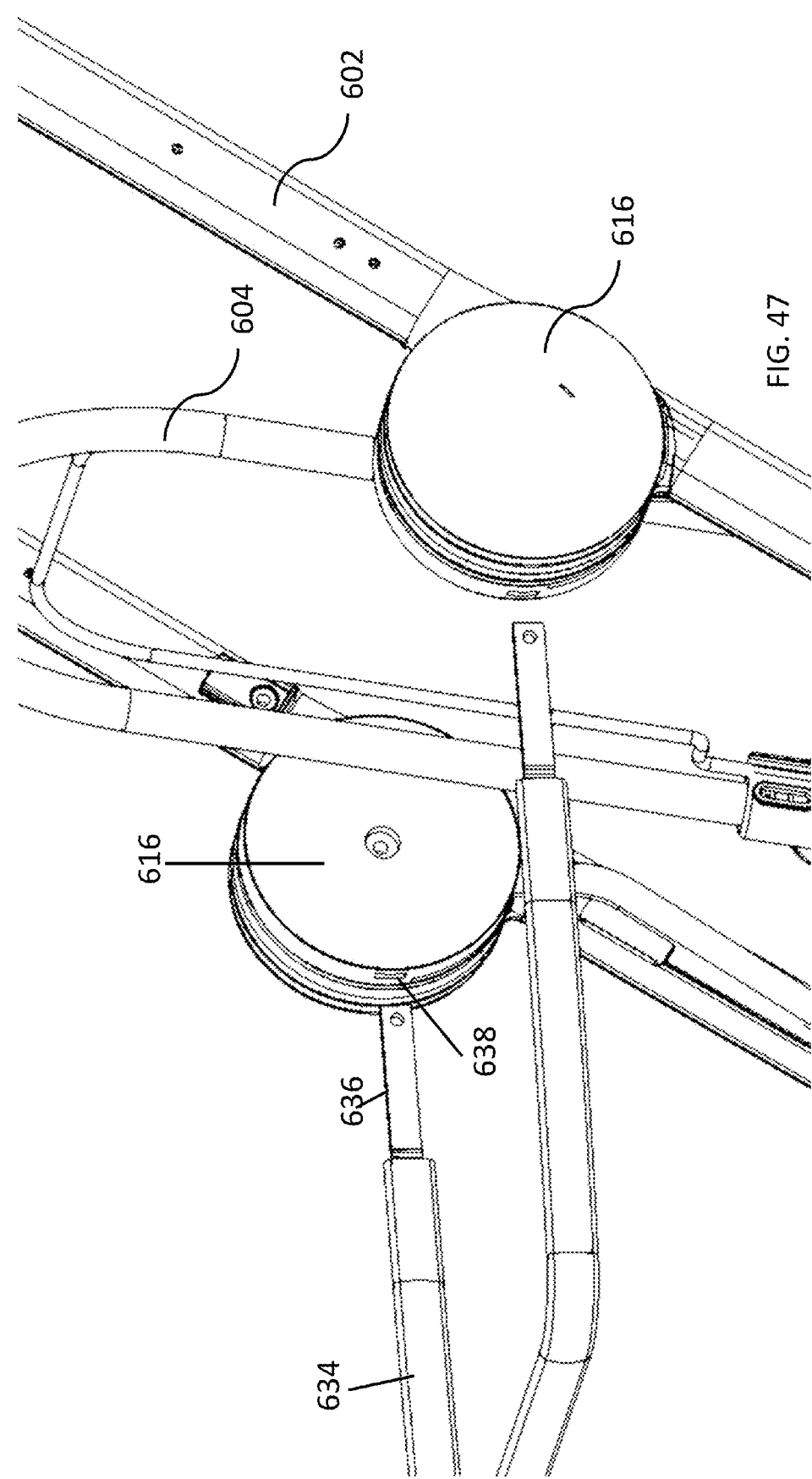
FIG. 47 further illustrates an embodiment of the stroller system with an armrest.

FIGS. 46-50D depict an embodiment of the stroller comprising an armrest 634. FIG. 46 provides a side perspective view of the armrest 634 attached to a connector 616. As shown in FIG. 47, one or more plates 628a-628e which form the connector 616, may contain a groove 638 for the attachment end of the armrest 636. While an armrest is discussed, it is contemplated that a tray, car seat adapter or other similar structure may attach to the frame of the stroller in a similar manner.

Figure 48:
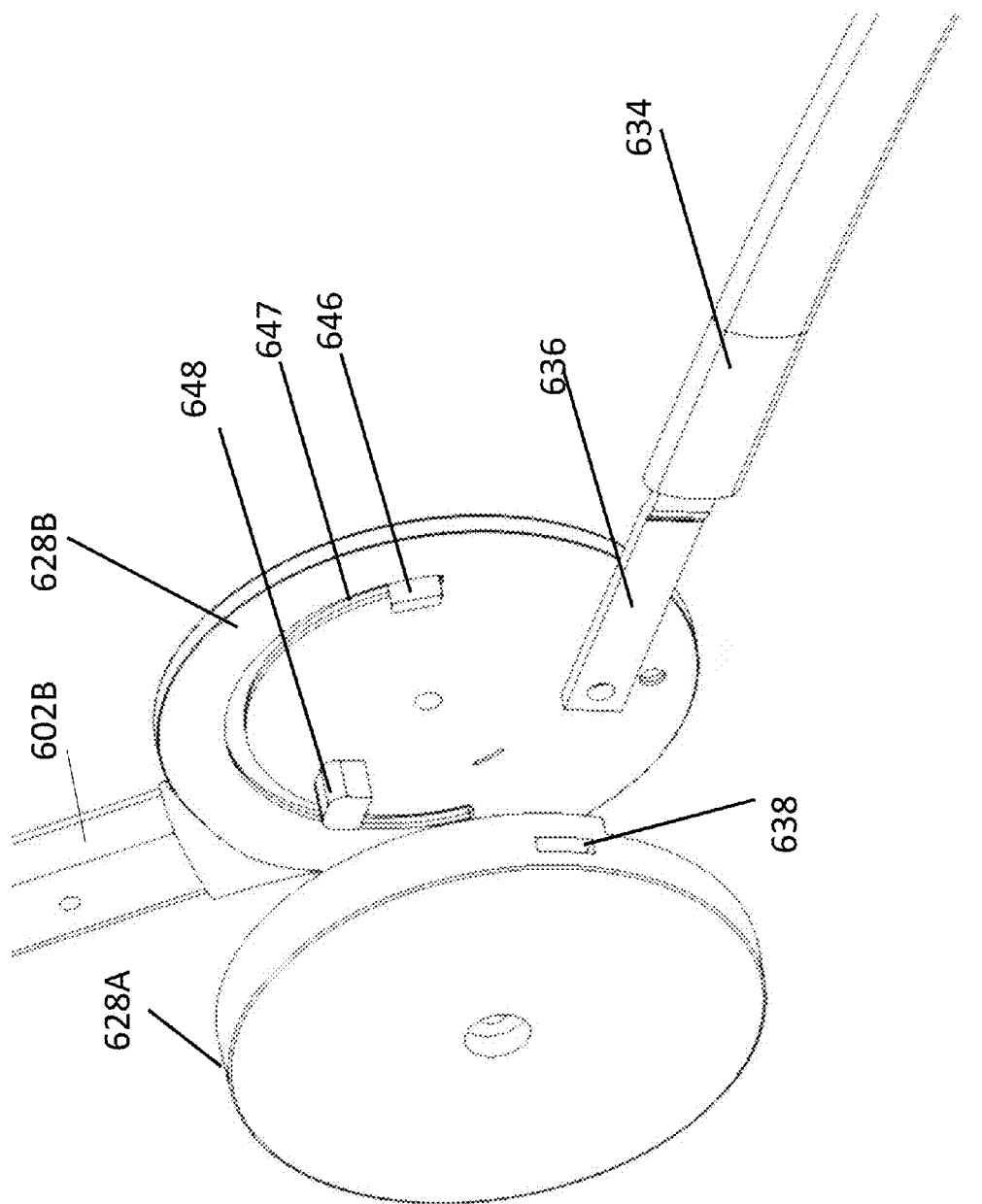
FIG. 48 illustrates the attachment of the armrest to the connection hub.

FIG. 48 shows an attachment end of an armrest 636 positioned in front of a groove 638 on a plate 628a (see FIG. 42). The plate containing the groove is aligned to be engaged with a second alignment plate 628b which is fixedly connected to the second portion of the first frame member 602b. The central plate 628c (not shown in FIG. 48) contains a protruding stop element 646 which is configured to travel along a track 647 on the second alignment plate 628b. The central plate 628c, may be fixedly connected to the first frame portion of the first frame member 602a. The plates 628a-628e forming the connector 616 may be configured such that when the second portion of the first frame member 602b is folded towards the first portion of the first frame member 602a, plate 628b rotates with respect to plate 628c and the protruding stop element 646 travels along the track 647 to align the armrest groove 638 to an in-use or stowed position.

FIG. 49A shows plate 628b in a side view of the connector system. The armrest attachment 634 is configured to enter the groove 638. Once inside the groove 638, the armrest attachment 636 is held in place by the protruding stop element 646 (a protruding member that is preferably fixed to plate 628c) and a second protruding stop element 648 (a protruding member that is preferably fixed to plate 628b) connected to the second portion of the first frame member 602b.

Figure 49C:
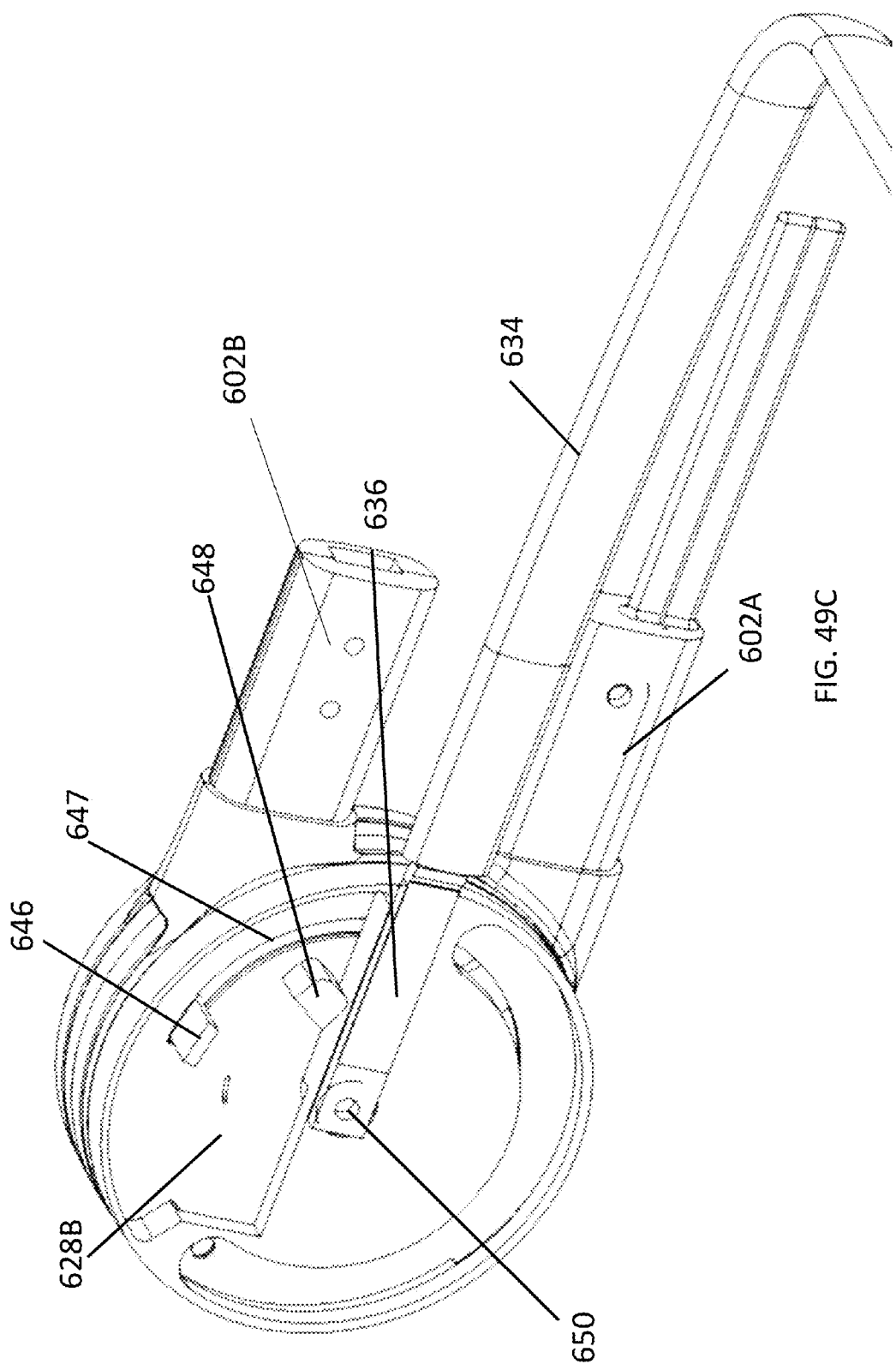
FIG. 49C illustrates a perspective view of an embodiment of the stroller system (as depicted in FIG. 47) with the armrest in a fully folded state in connection with the folding of the front frame.
Figure 50A:
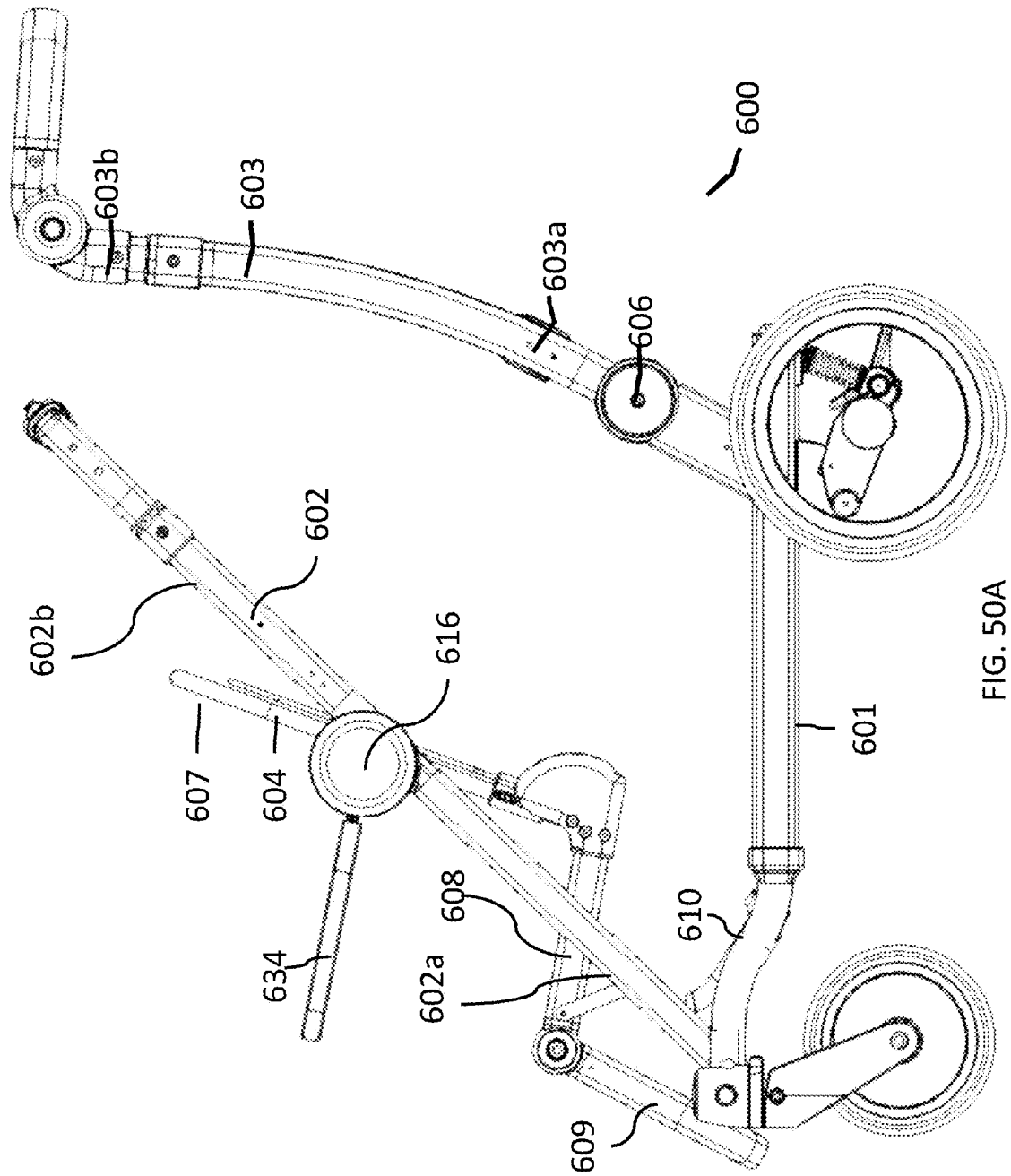
FIG. 50A illustrates a side view of a stroller system with an armrest (as depicted in FIG. 46) in a first position.
Figure 50B:
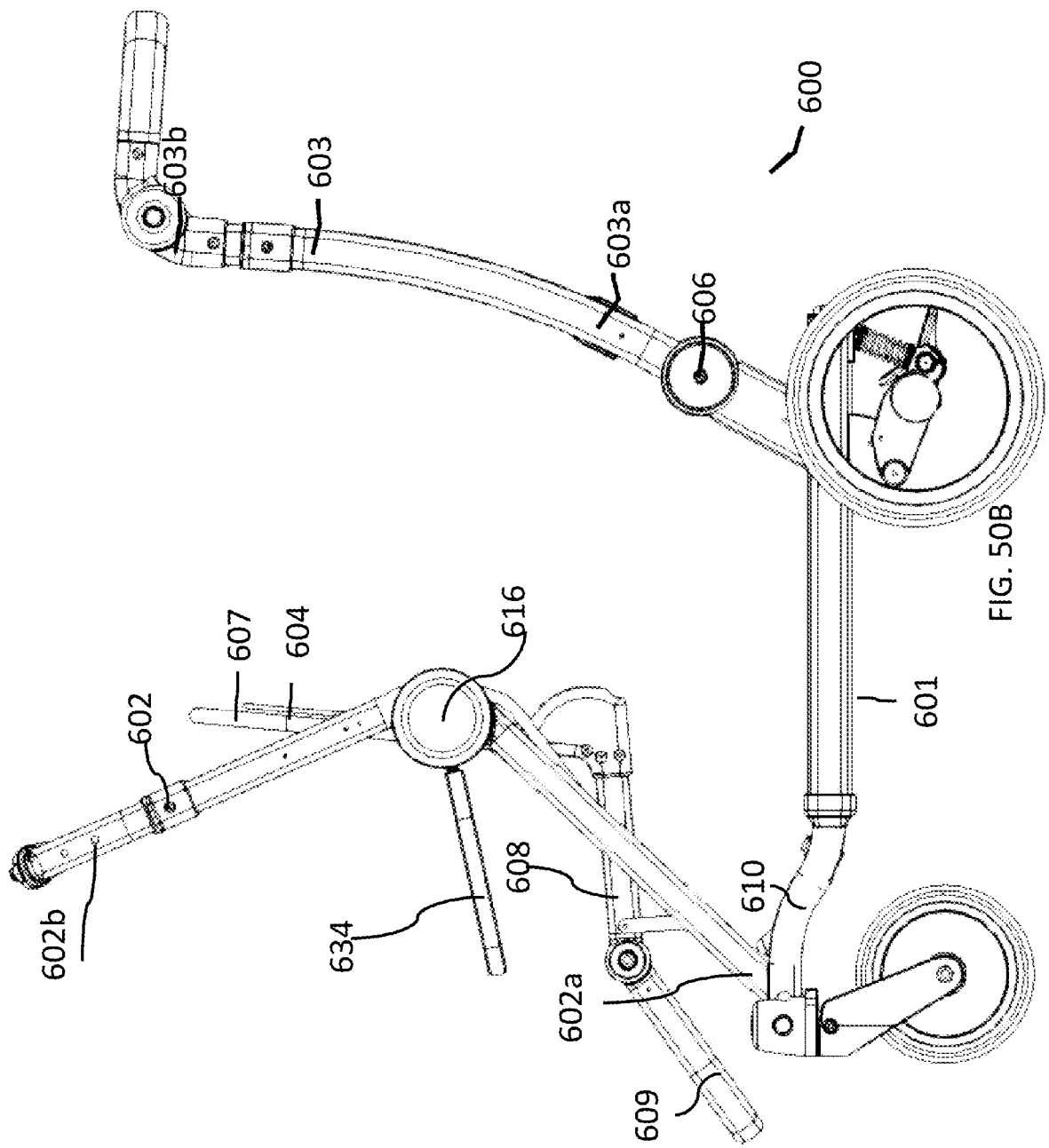
FIG. 50B illustrates a side view of a stroller system with an armrest (as depicted in FIG. 46) in a second, partially-folded, position.
Figure 50C:
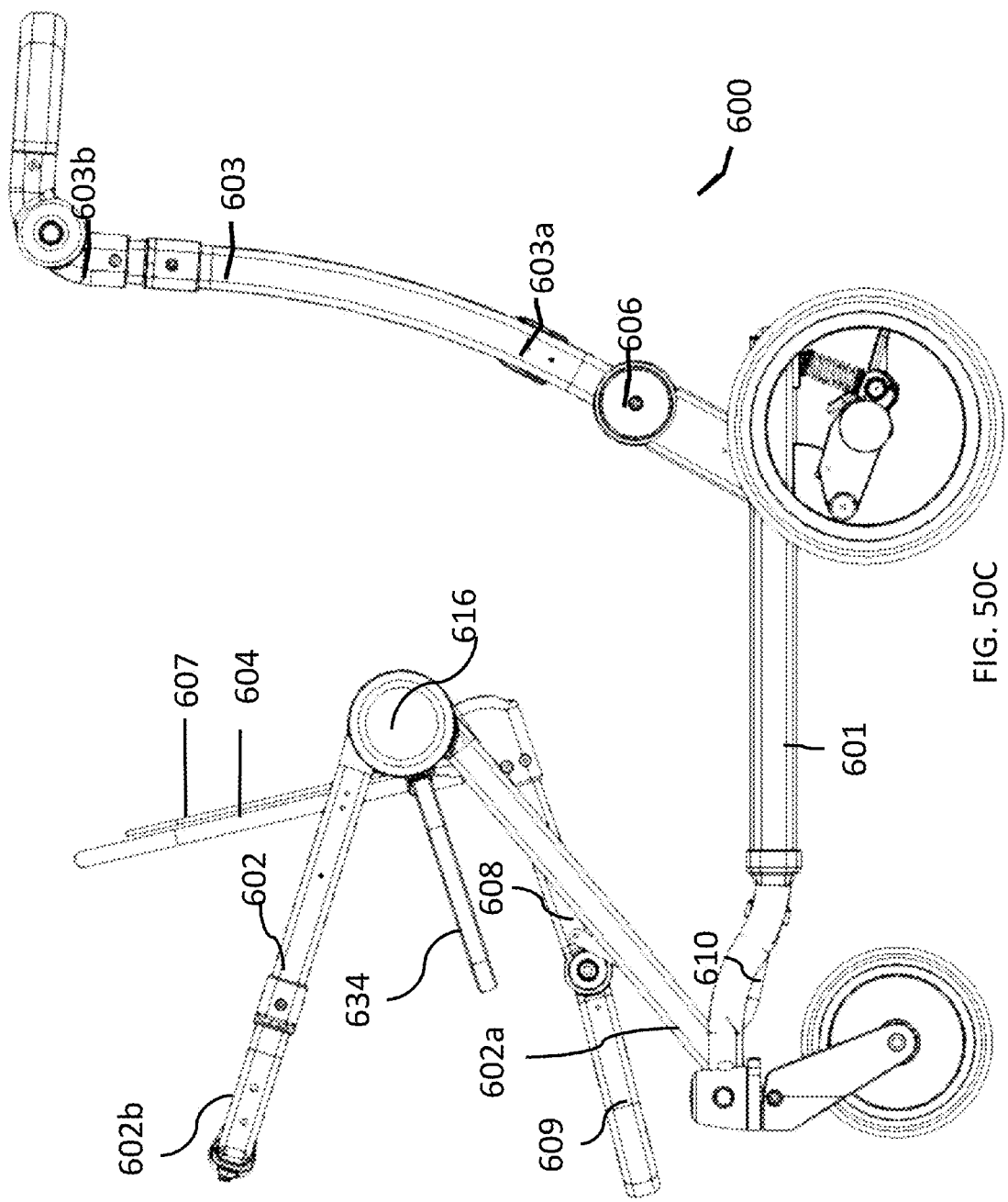
FIG. 50C illustrates a side view of a stroller system with an armrest (as depicted in FIG. 46) in a third, partially-folded, position.
Figure 50D:
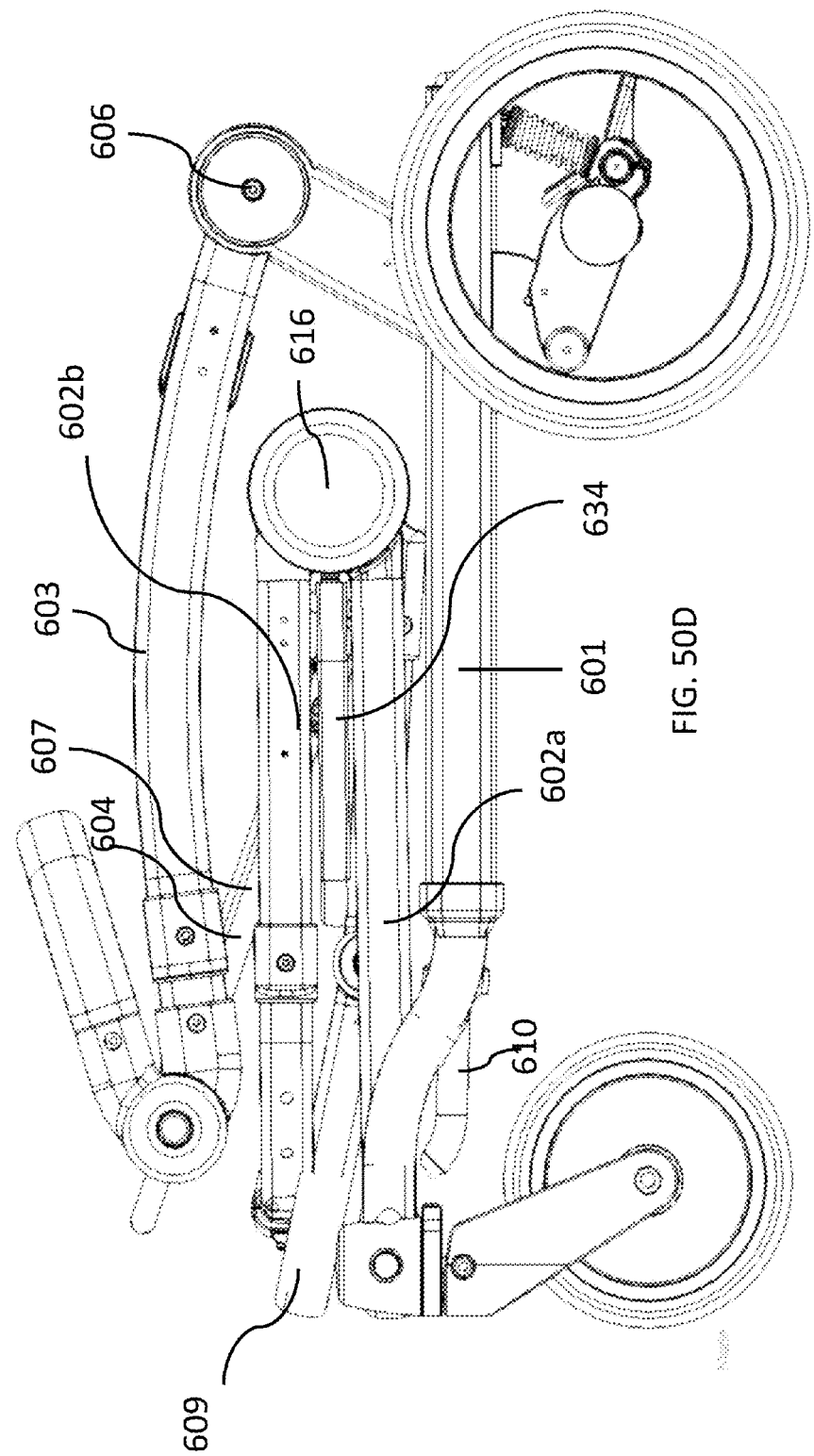
FIG. 50D illustrates a side view of a stroller system with an armrest (as depicted in FIG. 46) in a fourth, fully-folded, position.

FIGS. 49A-C illustrate the movement of the armrest from a first deployed position where it is generally parallel to the seat base 608 and available for use by a passenger to a second folded position where it is generally parallel to the first portion of the first frame member. In FIG. 49A, the armrest is held in a substantially horizontal position by the protruding stop element 646 and a second protruding stop element 648. The armrest is pivotally 650 connected to the connector system. As illustrated by FIG. 49B, as the second portion of the first frame member 602b is folded downwards towards the first portion of the first frame member 602a the second protruding stop element (which is connected to the second portion of the first frame member) moves along the plate 628b in a manner that allows for the armrest to pivot about its pivot axis 650 in a downwards motion. Similarly as further illustrated in FIG. 49C, the first protruding stop element 646 moves upwards along a track 647 located on the plate 640b. This may continue, until the armrest is in a substantially folded position.

FIGS. 50A-50D provide a side view of the stroller 600 with an armrest in deployed (FIG. 50A), mid-fold (FIG. 50B, FIG. 50C), and fully folded (FIG. 50D) states. Similar to previously discussed embodiments, the stroller may be folded to a stowed state with or without the attached armrest 634.

Figure 51A:
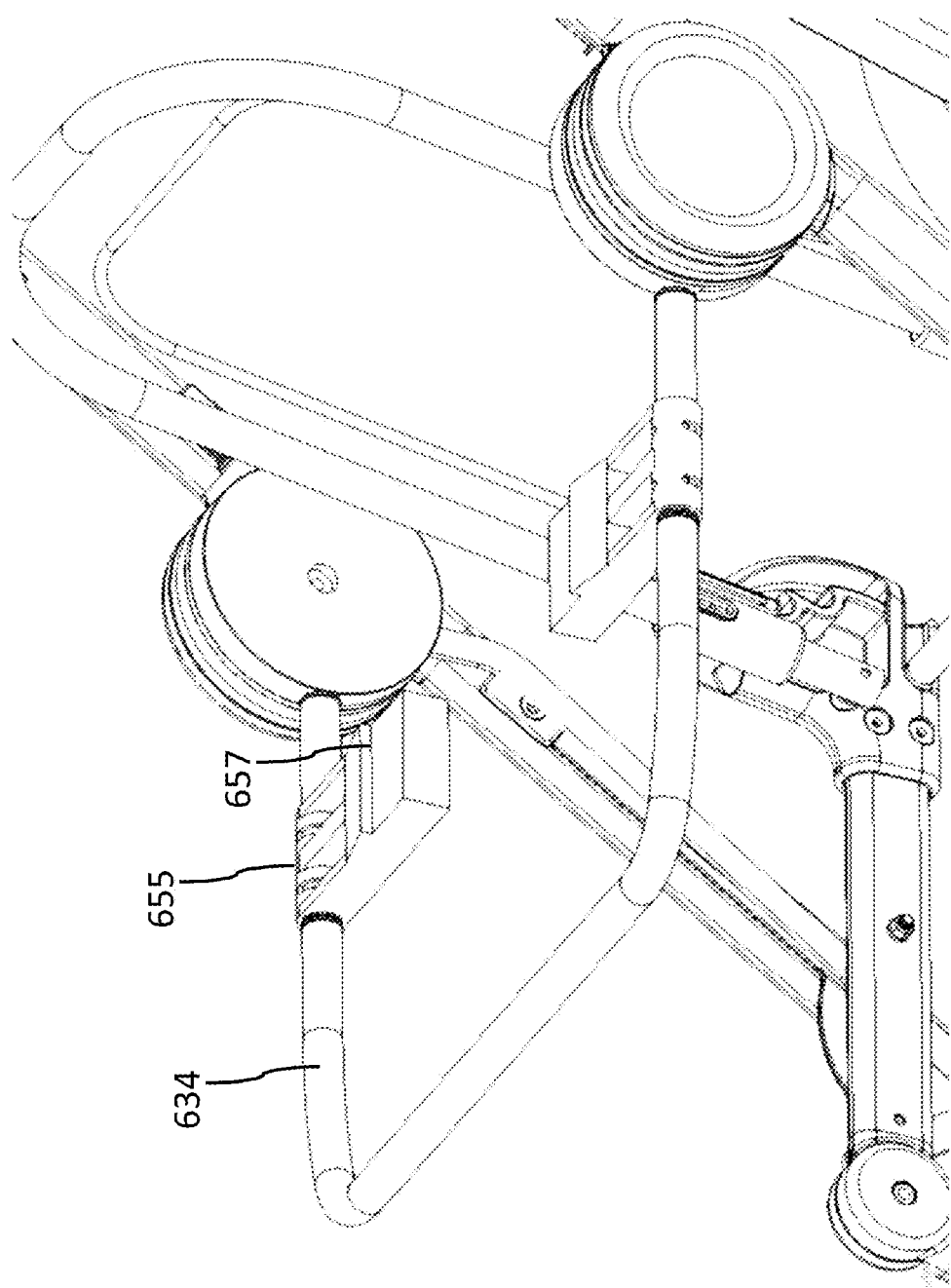
FIG. 51A illustrates a side perspective view of an embodiment of the stroller with an infant car seat adapter in a first position.
Figure 51C:
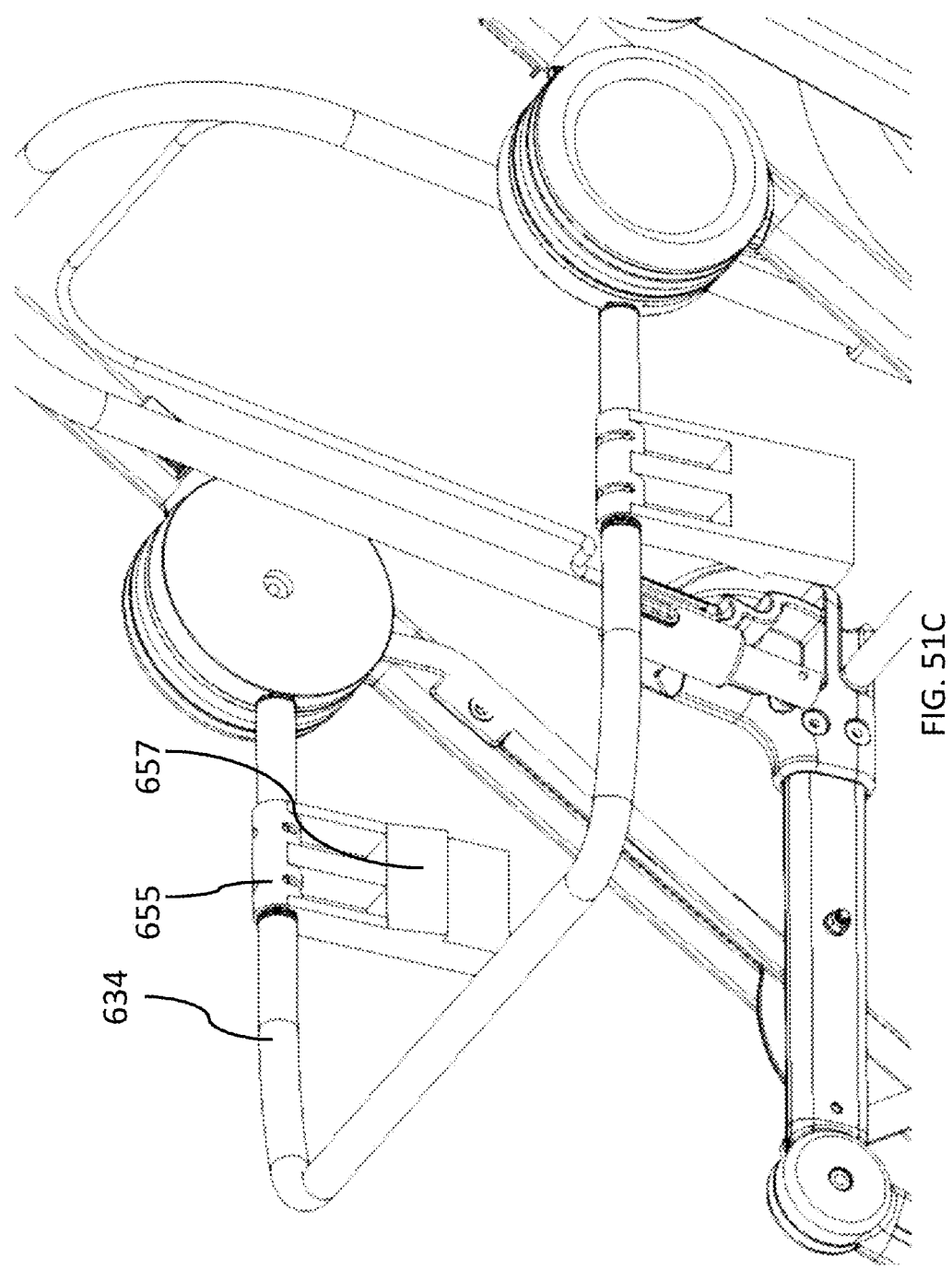
FIG. 51C illustrates a side perspective view of an embodiment of the stroller with an infant car seat adapter in a third position.

As illustrated in FIG. 51, in another exemplary embodiment, the stroller 600 may further comprise an adapter 655 structured to engage a seating device such as an infant car seat. The adapter 655 may be attached to the armrest 634 structure, or replace the armrest structure 634 as attached to the connector 616. As depicted, the adapter 655 comprises locking protrusions 657. The locking protrusions 657 may be biased to rotate upwards and towards the interior of the stroller 600 to a position generally parallel to the armrest 634 using spring-loaded pins or similar mechanisms. Accordingly, in a first position, where an infant car seat is not attached to the stroller, the locking protrusions 657 are generally parallel to the armrest 634. As illustrated in FIG. 51B, when an infant car seat is attached to the stroller, the locking protrusions 657 are pushed in a generally downwards direction until the locking protrusions 657 are generally perpendicular to the armrest 634 and face the interior of the stroller (see FIG. 51C). The top portion 659 of the adapter 655 may rotate about the axis formed by the armrest 634. In the position illustrated by FIG. 51C, the locking protrusions 657 may attach to one or more surfaces or attachment mechanisms of the infant car seat (not shown). The configuration of the locking protrusions 657 may vary according to the infant car seat the adapter 655 is configured to attach to. FIG. 52 provides a side perspective view of the stroller 600 with an adapter 655 in a position capable of attaching to an infant car seat.

Figure 53B:
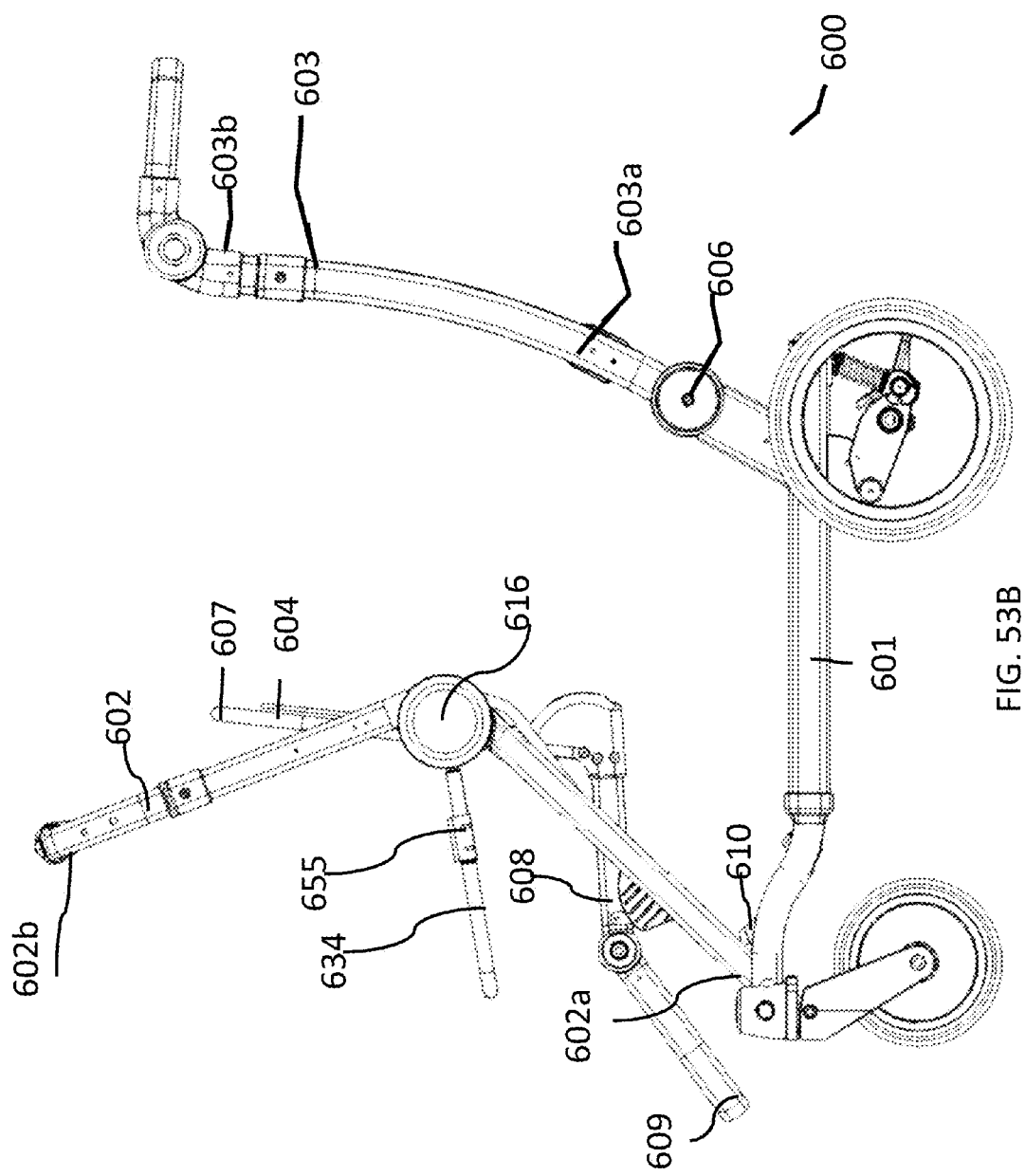
FIG. 53B illustrates a side view of a stroller system with an infant car seat adapter (as depicted in FIG. 52) in a second, partially-folded, position.
Figure 53C:
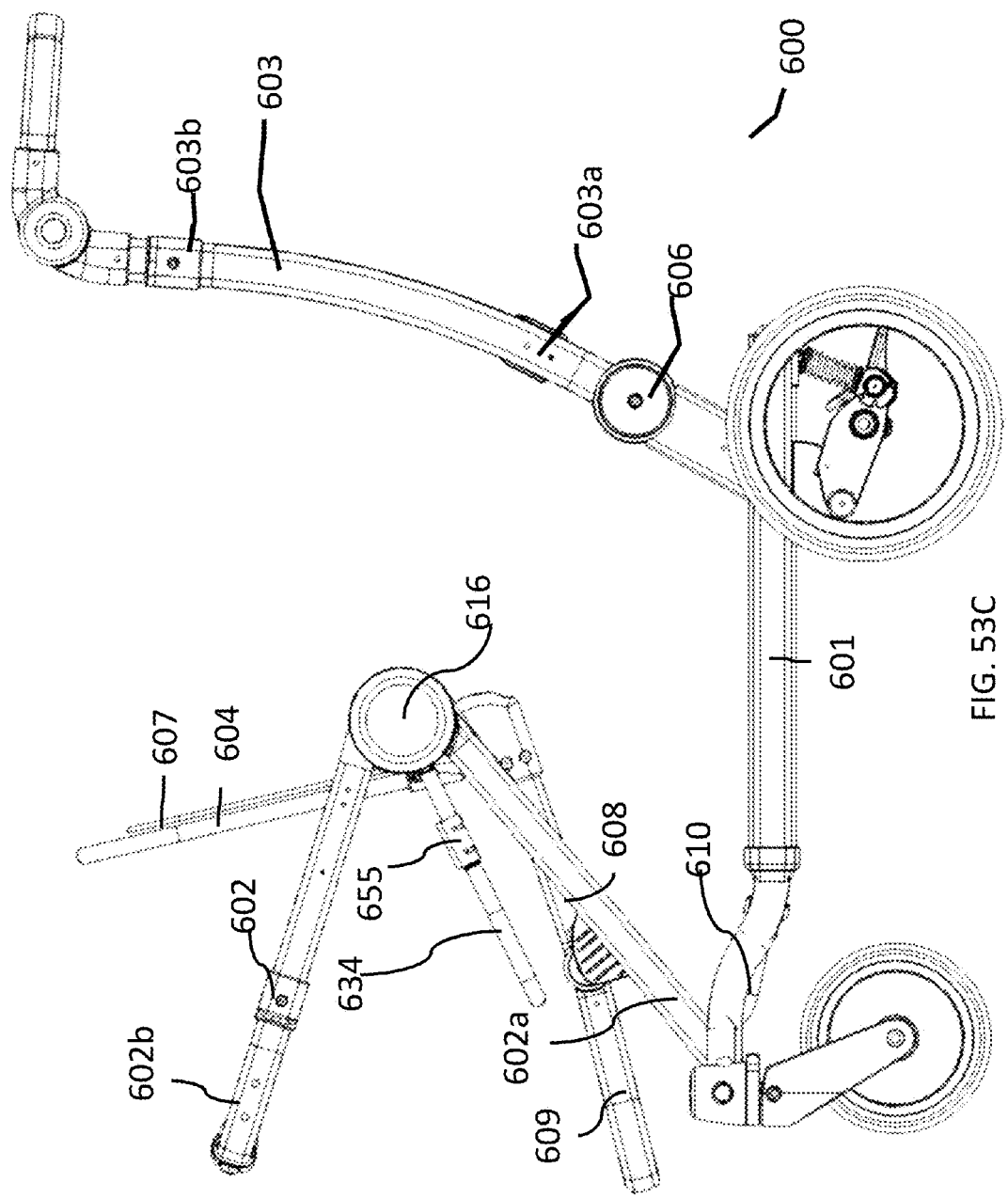
FIG. 53C illustrates a side view of a stroller system with an infant car seat adapter (as depicted in FIG. 52) in a third, partially-folded, position.
Figure 53D:
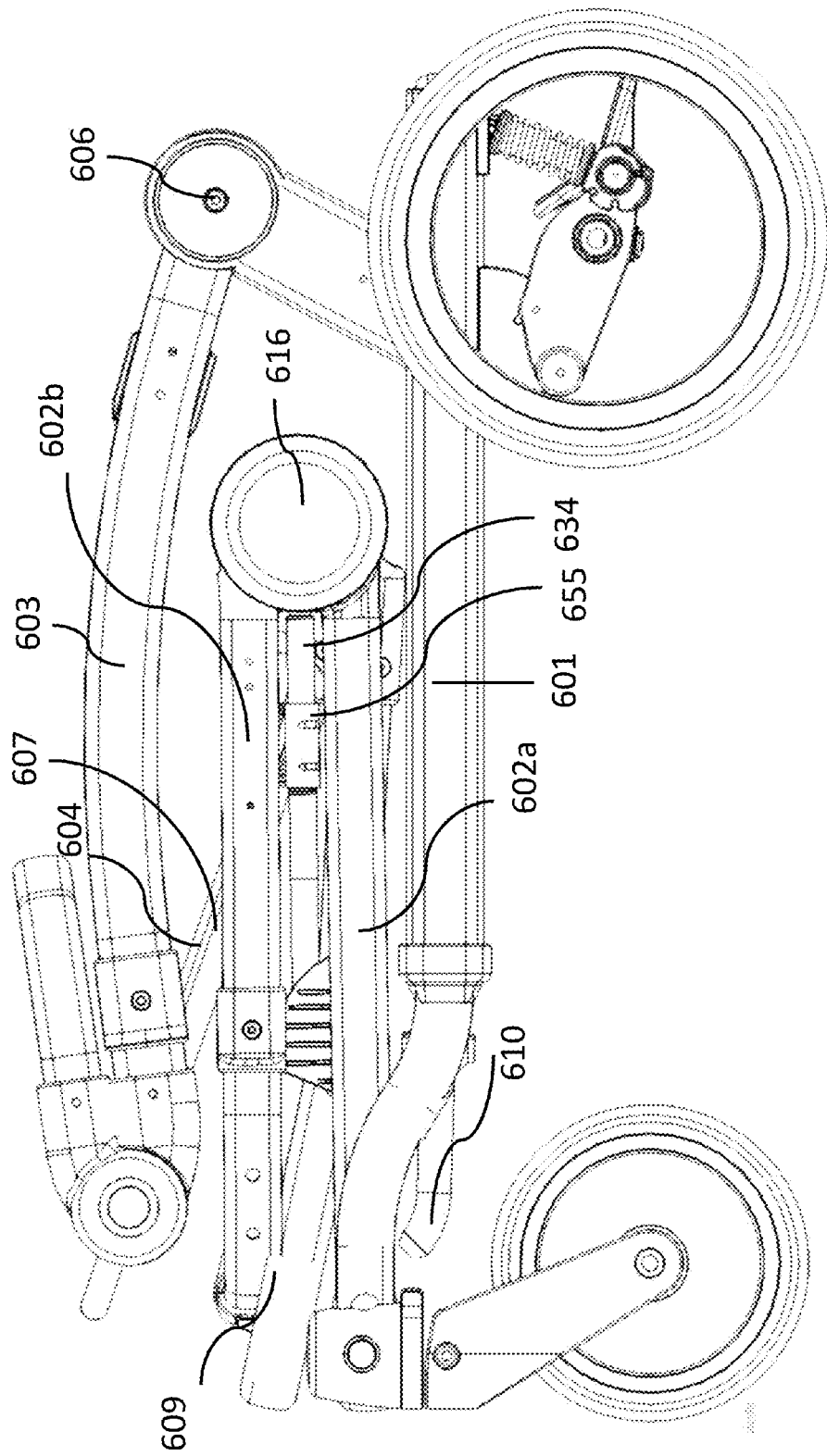
FIG. 53D illustrates a side view of a stroller system with an infant car seat adapter (as depicted in FIG. 52) in a fourth, fully-folded, position.

As illustrated by FIGS. 53A-53D, the stroller 600 is capable of folding to a stowed state with or without the adapter 655 attached. FIG. 53A presents a side view of the stroller 600 with adapter 655 in a substantially parallel position to the armrest 634. In FIGS. 53B-53C, the stroller is in mid-fold. In FIG. 53D, the stroller is fully folded with the armrest 634 and adapter 655 attached.

Figure 54:
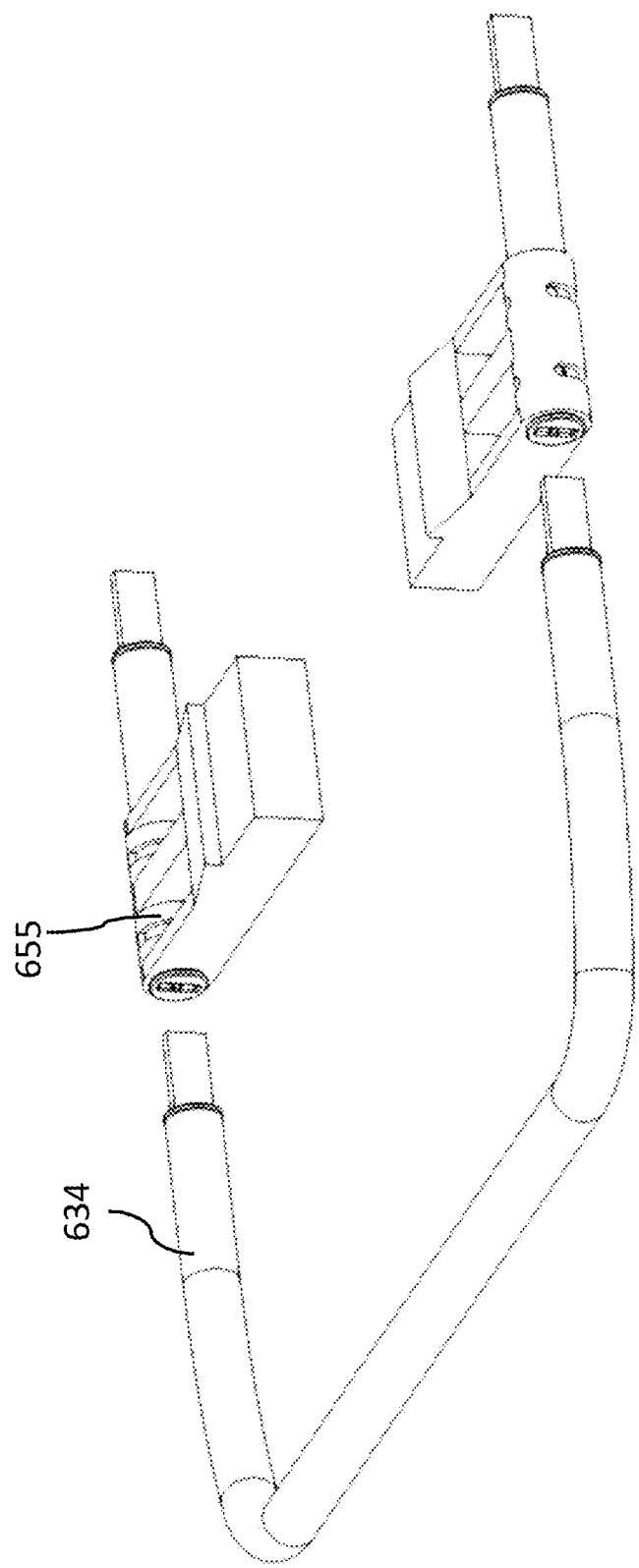
FIG. 54 illustrates an exploded view the modular arrangement of the infant car seat adapter and armrest.
Figure 55:
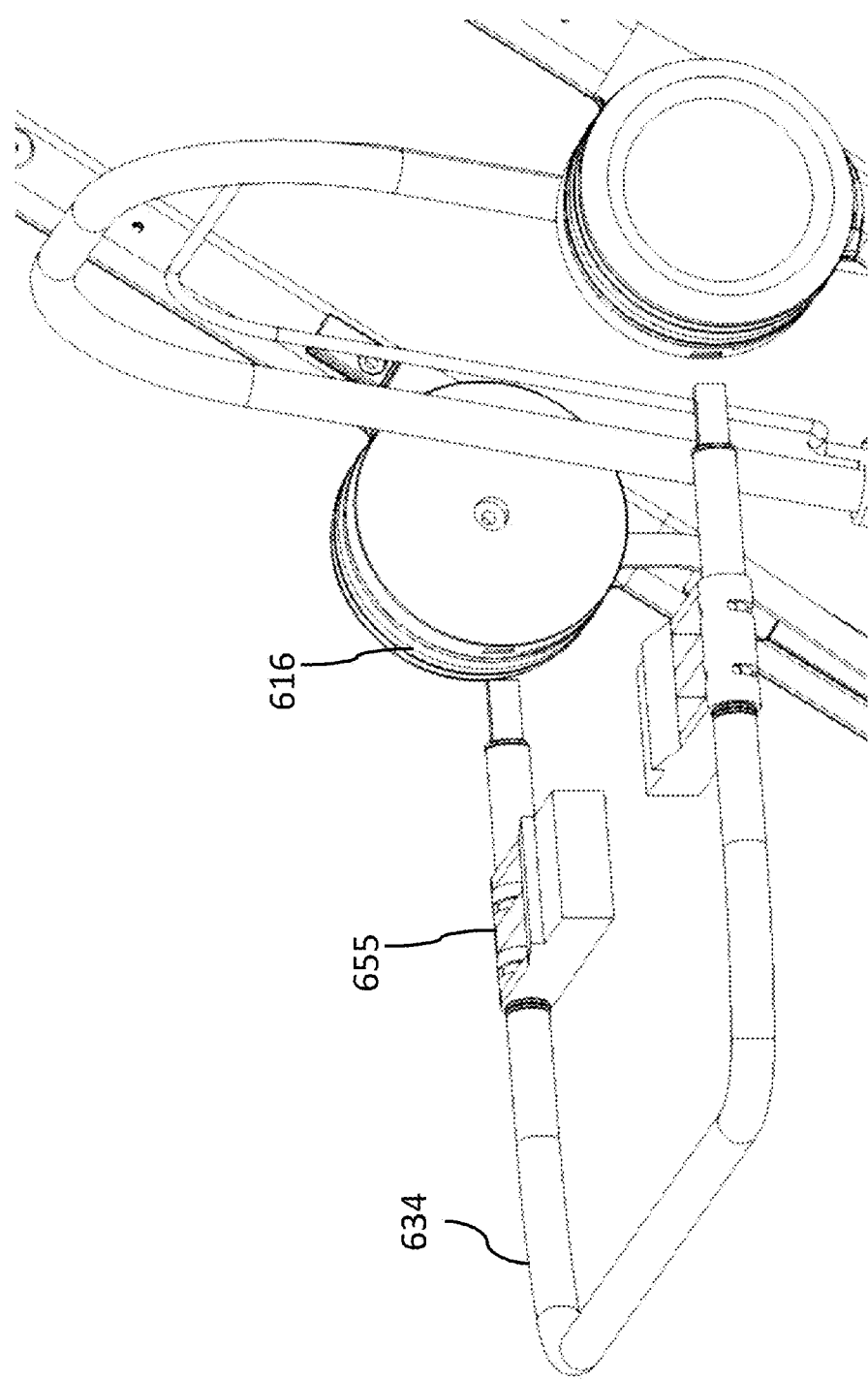
FIG. 55 illustrates the modular arrangement of the infant car seat adapter and armrest in connection with the portion of a frame member of a stroller.
Figure 56:
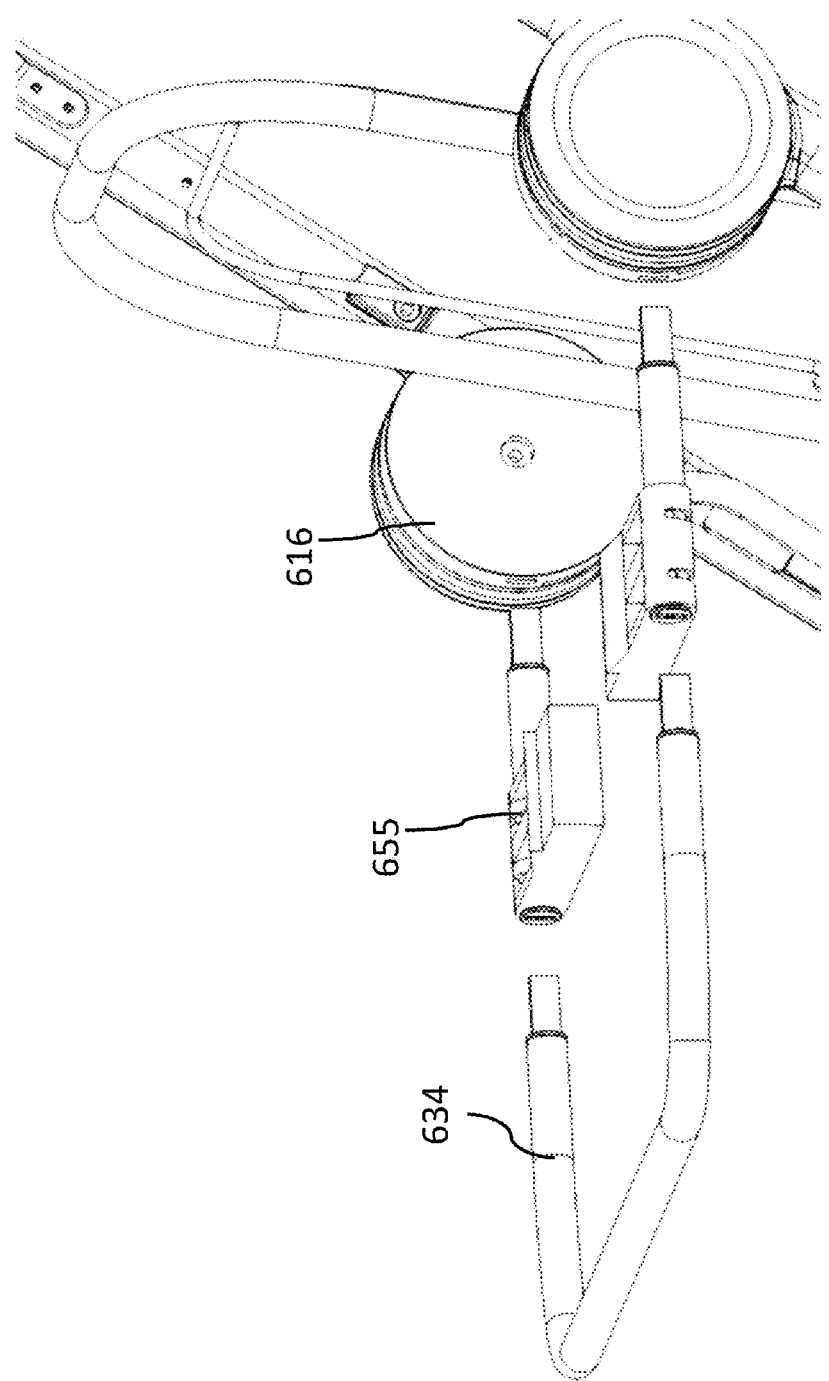
FIG. 56 further illustrates the modular arrangement of the infant car seat adapter and armrest.

In one embodiment, as illustrated in FIG. 54, the discussed armrest 634 and adapter 655 may be modular in nature. As depicted, an armrest 634 may be removably attached to an adapter 655, which is removably attached to the connector (see FIG. 55). In such an embodiment the adapter 655 may attach to the connector 616 in a similar manner to what is described in relation to the armrest 634 in FIGS. 46-49C (see FIG. 56).

Figure 57:
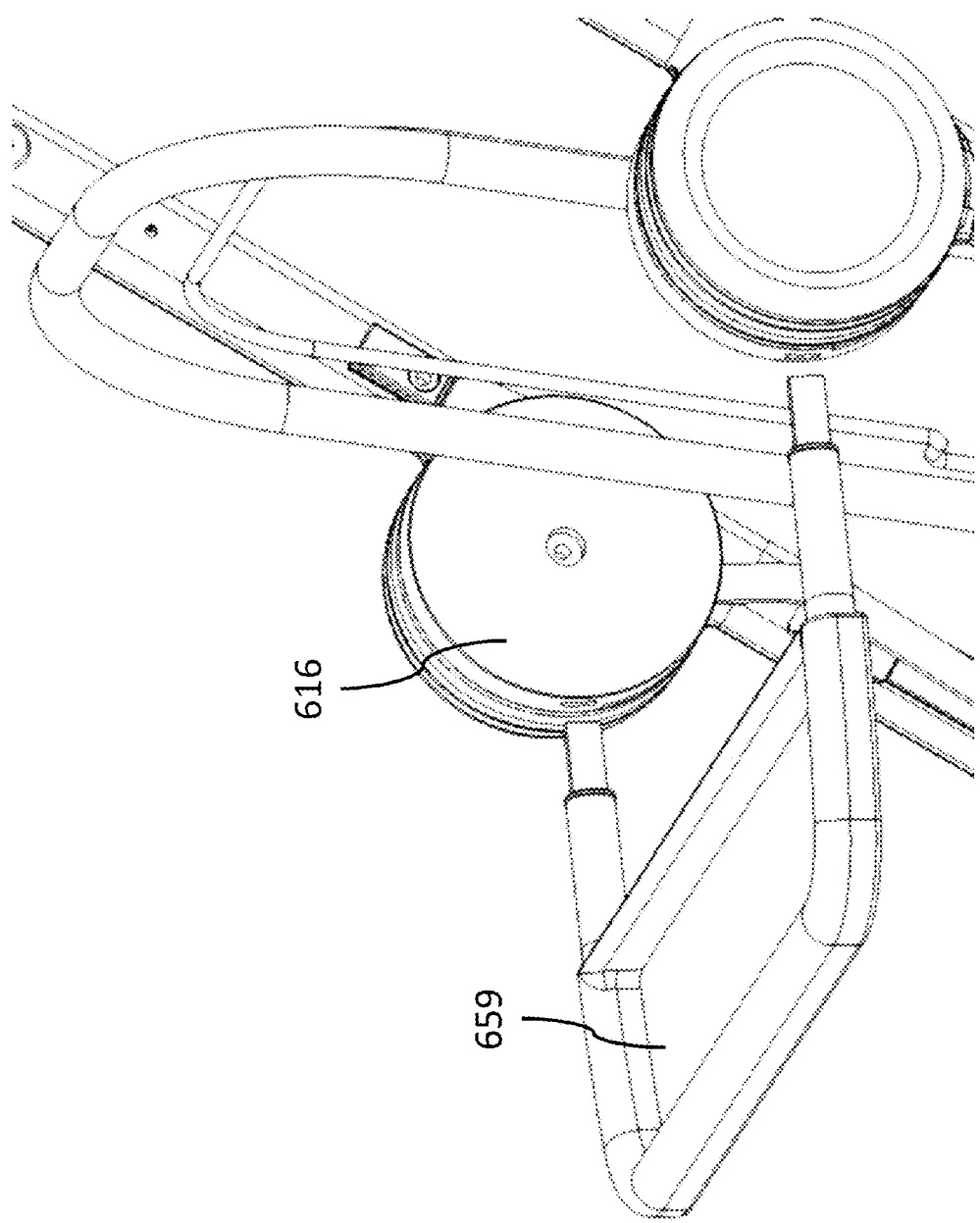
FIG. 57 illustrates a side perspective view of an embodiment of the stroller system with a tray attachment.

As illustrated in FIG. 57, in another embodiment, the stroller 600 may comprise a tray 659 also removably attached to the connector and capable of folding with the stroller 600 to a stowed state.

Figure 58B:
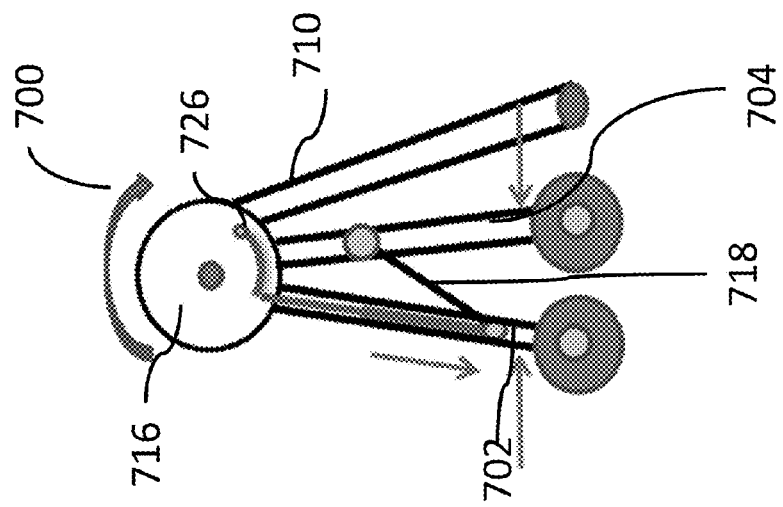
FIG. 58B illustrates an alternative embodiment of the stroller system (as depicted in FIG. 58A) with an A-frame structure and flexible link in a second, stowed, configuration.
Figure 58A:
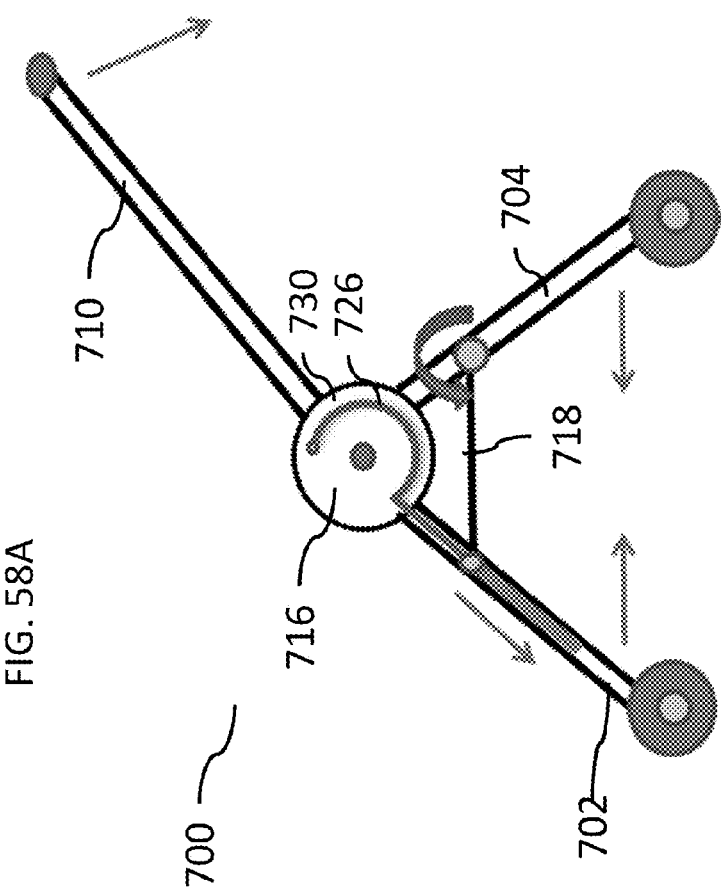
FIG. 58A illustrates an alternative embodiment of the stroller system with an A-frame structure and flexible link in a first, "in-use", configuration.

Although the flexible link 626 is discussed in relation to a stroller with two frame members connected to a common base, it is contemplated that the mechanisms of the flexible link discussed thus far can be applied to strollers with alternative frame structures. For example, as depicted in FIGS. 58A and 58B, a flexible link 726 can be configured to manipulate the frame members of an A-frame stroller 700. In an A-frame stroller, two frame members (terminating in wheels) and one or more handles all connect via central connector. The folding of the one or more handles typically moves the frame members to a position generally parallel the handle.

In such an embodiment, the flexible link 726 may be mounted inside the central connector 716, in a similar configuration discussed above, with respect to connector 616 and flexible link 626. The central connector 716 may have a pivot 750 which allows the handle 710 to move with respect to the first and second frame members 702 and 704. In the embodiment shown, the handle 710 pivots towards the second frame member 704, as the stroller 700 is moved from an "in-use" configuration (58A) to a "collapsed" or "stowed" configuration 58B. The flexible link 726 may be mounted within the central connector 716 such that movement of the handle 710 moves the flexible link 726 along a track 730 (within the central connector) and causes a frame link 718 to move away from the connector 716, thereby translating one or more of the frame members 702 and 704 to move from a first to a second position with respect to each other.

Alternatively, in a further embodiment depicted in FIGS. 59A and 59B, the handle 710 is rotated towards the first frame member 702 (rather than the second frame member 704, as depicted in FIGS. 58A and 58B), to facilitate the same transition from an "in-use" configuration to a "collapsed" or "stowed" configuration 59B.

Alternatively, in a further embodiment depicted in FIGS. 59A and 59B, it is contemplated that the flexible link 726 may be configured to attach to one or more secondary support members of the two or more frame members of the stroller. In such an embodiment, the secondary support member may comprise a first end connected to the flexible link 726 and a second end connected to the central connector. In such an embodiment, the handle may move the flexible link 726 such that the secondary support members facilitate the movement of the frame members. For example, in an embodiment of a stroller with two frame members, the secondary support member may be pivotally attached to one of the frame members, and slideably coupled to a second frame member.

In a further embodiment, it is contemplated that the flexible link 726 may be used in a stroller, where the frame members are configured to pivot about the central connector or in a stroller where the frame members are affixed to one or more plates which are rotatably connected.

These embodiments utilizing the flexible link can be configured to allow the stroller to stand when folded, and/or collapse to a more compact and portable state.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

The invention claimed is:

1. A stroller comprising:
a base having a first end, a second end, and an elongated portion extending therebetween;
a frame support member having a first end and a second end and a length extending therebetween, and wherein the first end is rotatably attached to the base at a point between the first and second ends of the base;
a first frame member comprising first and second ends and an elongated portion extending therebetween, the first frame member being adapted to retain a first seat thereon and comprising:
a first frame portion comprising a first end pivotally connected to the base proximate the first end of the base, and a second end located at an opposing end of the first frame portion, the first frame portion further comprising a longitudinal void disposed therein and extending along at least a portion of the length of the first frame portion between the first and second ends thereof;

a second frame portion comprising a first end and a second end located at an opposing end of the second frame portion from the first end;

a connector pivotally connecting the second end of the first frame portion and the first end of the second frame portion; and a link comprising a first end mounted to a portion of the connector and a second end disposed within the longitudinal void, and a generally elongated portion extending therebetween; wherein the second end of the link is rotatably connected to the second end of the frame support member and both the second end of the frame support member and the second end of the link are adapted to travel along the first frame portion;

wherein, in a first position, the first frame portion and the second frame portion form a generally elongated first frame extending from the first end of the first frame member to the second end of the second frame member; and wherein, in a second position, the first frame portion and the second frame portion are folded upon each other at the connector, such that the second end of the second frame portion is disposed adjacent the first end of the base.

2. The stroller of claim 1, further comprising a second frame member comprising means for retaining a second seat.

3. The stroller of claim 1, wherein the base is expandable.

4. The stroller of claim 1, wherein rotation of the connector during translation of the first frame member from the first to second position causes the second end of the link and the second end of the frame support member to move within the longitudinal void of the first frame portion in a direction towards the first end of the first frame member.

5. The stroller of claim 1, wherein the connector is rotatably mounted to the first frame portion, having a first axis of rotation, and the first end of the link is rotatably mounted to the connector, such that the first end of the link translates about the axis of rotation of the connector.

6. The stroller of claim 1, wherein the elongated portion of the link is substantially rigid.

7. The stroller of claim 1, wherein the elongated portion of the link is flexible.

8. The stroller of claim 1, wherein when the first frame member is in the first position, the first frame portion and the second frame portion form a longitudinal axis and such longitudinal axis forms an angle of between 10 and 90 degrees with respect to the base.

9. The stroller of claim 1, wherein the stroller is configured to have a folded state, wherein the first frame portion of the first frame member is located generally parallel to the base and the second frame portion of the first frame member is located generally parallel to the first frame portion of the first frame member.

10. The stroller of claim 9, wherein a support member is located generally parallel to the first frame portion of the first frame member.

11. The stroller of claim 1, the first frame member further comprising one or more actuators, wherein the first frame member is lockable in the first position, and operable to the second position only after actuation of one or more the actuators.

12. The stroller of claim 1, wherein the second end of the link is adapted to travel longitudinally within the elongated void of the first frame portion.

13. The stroller of claim 1, wherein, in the first position, the first frame portion and the second frame portion are generally coplanar.

14. The stroller of claim 1 further comprising an armrest.

15. A stroller comprising:

a base having a first end, a second end, and an elongated portion extending therebetween;

a frame support member having a first end and a second end and a length extending therebetween, and wherein the first end is rotatably attached to the base at a point between the first and second ends of the base;

a first frame member comprising first and second ends and an elongated portion extending therebetween, the first frame member being adapted to retain a first seat thereon and comprising:

a first frame portion comprising a first end pivotally connected to the base proximate the first end of the base, and a second end located at an opposing end of the first frame portion, the first frame portion further comprising a longitudinal void disposed therein and extending along at least a portion of the length of the first frame portion between the first and second ends thereof;

a second frame portion comprising a first end and a second end located at an opposing end of the second frame portion from the first end;

a connector pivotally connecting the second end of the first frame portion and the first end of the second frame portion; and a flexible link comprising a first end mounted to a portion of the connector and a second end disposed within the longitudinal void, and a generally elongated portion extending therebetween; wherein the second end of the link is connected to the second end of the frame support member and at least a portion of the flexible link and the second end thereof travels longitudinally along the first frame portion;

wherein, in a first position, the first frame portion and the second frame portion form a generally elongated first frame extending from the first end of the first frame member to the second end of the second frame member; and wherein, in a second position, the first frame portion and the second frame portion are folded upon each other at the connector, such that the second end of the second frame portion is disposed adjacent the first end of the base.

16. The stroller of claim 15, further comprising a second frame member comprising means for retaining a second seat.

17. The stroller of claim 15, wherein the base is expandable.

18. The stroller of claim 15, wherein rotation of the connector during translation of the first frame member from the first to second position causes the second end of the link and the second end of the frame support member to move within the longitudinal void of the first frame portion in a direction towards the first end of the first frame member.

19. The stroller of claim 15, wherein the connector is rotatably mounted to the first frame portion, having a first axis of rotation, and the first end of the link is mounted to the connector, such that the first end of the link translates about the axis of rotation of the connector.

20. The stroller of claim 15, wherein the elongated portion of the link is substantially rigid.

21. The stroller of claim 15, wherein the elongated portion of the link is flexible.

22. The stroller of claim 15, wherein when the first frame member is in the first position, the first frame portion and the second frame portion form a longitudinal axis and such longitudinal axis forms an angle of between 10 and 90 degrees with respect to the base.

23. The stroller of claim 15, wherein the stroller is configured to have a folded state, wherein the first frame portion of the first frame member is located generally parallel to the base and the second frame portion of the first frame member is located generally parallel to the first frame portion of the first frame member.

24. The stroller of claim 15, the first frame member further comprising one or more actuators, wherein the first frame member is lockable in the first position, and operable to the second position only after actuation of one or more the actuators.

25. The stroller of claim 15, wherein the second end of the link is adapted to travel longitudinally within the elongated void of the first frame portion.

26. The stroller of claim 15, wherein, in the first position, the first frame portion and the second frame portion are generally coplanar.

27. The stroller of claim 15, wherein a support member is located generally parallel to the first frame portion of the first frame member.

28. The stroller of claim 15 further comprising an armrest.

29. A stroller comprising:
- a base having first and second ends and a generally elongated portion extending therebetween;
- a first frame member having a first end pivotally connected to the base proximate the first end of the base, a second end and a generally elongated portion extending therebetween, wherein the generally elongated portion of the first frame includes an elongated aperture disposed between the first and second ends of the first frame member,
- the first frame member comprising: a first frame portion comprising a first end and a second end located at an opposing end of the first frame portion, and a second frame portion comprising a first end and a second end located at an opposing end of the second frame portion from the first end;
- a first seat mounted on the first frame member, said first seat comprising:
  - a seat base portion having front and rear ends and a seat back portion pivotally connected to the rear end of the seat base portion,
  - a first seat base link having a first end pivotally mounted to the seat base and a second end pivotally mounted to the first frame member at a pivot point located between the elongated aperture of the first frame member and the first end of the first frame member,
  - the seat further comprising a seat base pivot mounted to the seat base and being slidably disposed within the elongated aperture; wherein a second link is pivotally attached to the seat base pivot at a first end, and a second end which is pivotally attached to a connector which pivotally connects the second end of the first frame portion to the first end of the second frame portion; and
- the stroller seat being adjustable from a first position to a second position, wherein the first position the seat is deployed such that the seat base is positioned to accommodate a user sitting thereon, to a second position, wherein the first frame member is disposed generally parallel to the seat base portion
- wherein as the stroller is adjusted from the first position to the second position, the seat base pivot moves within the elongated aperture in a direction away from the pivot point of the seat base link and towards the second end of the first frame member.

30. The stroller of claim 29, wherein the seat back portion is disposed at an angle generally acute to the seat base.

31. The stroller of claim 29, wherein the first seat further comprises a leg support.

32. The stroller of claim 29, wherein the leg support folds generally parallel to the base when the stroller is adjusted from the first position to the second position.

\* \* \* \* \*